(12) United States Patent
Heath, Jr. et al.

(10) Patent No.: US 9,210,709 B2
(45) Date of Patent: *Dec. 8, 2015

(54) SPATIAL MULTIPLEXING IN A CELLULAR NETWORK

(71) Applicant: INTEL CORPORATION, Santa Clara, CA (US)

(72) Inventors: Robert W. Heath, Jr., Los Altos, CA (US); Peroor K. Sebastian, Mountain View, CA (US); Rahul Chopra, Campbell, CA (US); Arogyaswami J. Paulraj, Stanford, CA (US)

(73) Assignee: Intel Corporation, Santa Clara, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 13/781,048

(22) Filed: Feb. 28, 2013

(65) Prior Publication Data
US 2013/0176968 A1 Jul. 11, 2013

Related U.S. Application Data

(60) Continuation of application No. 13/684,010, filed on Nov. 21, 2012, now Pat. No. 9,137,799, which is a continuation of application No. 12/823,057, filed on Jun. 24, 2010, now Pat. No. 8,339,934, which is a (Continued)

(51) Int. Cl.
*H04W 4/00* (2009.01)
*H04W 72/04* (2009.01)
(Continued)

(52) U.S. Cl.
CPC ........... *H04W 72/046* (2013.01); *H04B 7/0613* (2013.01); *H04B 7/2612* (2013.01);
(Continued)

(58) Field of Classification Search
CPC ..... H04L 5/0007; H04L 27/206; H04L 47/10;
H04L 47/22; H04L 47/2441; H04L 12/5602;
H04L 2012/568; H04L 47/50; H04J 11/00;
H04B 7/18582; H04B 7/18584
USPC .............. 370/203, 208, 310.2, 319, 321, 322,
370/328, 335, 337, 338, 342, 344, 347
See application file for complete search history.

(56) References Cited

U.S. PATENT DOCUMENTS 5,345,599 A 9/1994 Paulraj et al.
5,504,936 A 4/1996 Lee
(Continued)

FOREIGN PATENT DOCUMENTS

WO WO 98/09381 3/1998
WO WO 98/09385 3/1998
WO WO 98/34424 8/1998

OTHER PUBLICATIONS

Paulraj, A.J., et al., "Taxonomy of space-time processing for wireless networks", (Feb. 1998), 25-30.

(Continued)

*Primary Examiner* — Brenda H Pham
(74) *Attorney, Agent, or Firm* — Blakely, Sokoloff, Taylor & Zafman LLP

(57) ABSTRACT

The present invention provides methods and apparatus for implementing spatial multiplexing in conjunction with the one or more multiple access protocols during the broadcast of information in a wireless network. A subscriber unit for use in a cellular system is disclosed. The subscriber unit includes: spatially separate receivers, a spatial processor, and a combiner. The spatially separate receivers receive the assigned channel composite signals resulting from the spatially separate transmission of the subscriber downlink datastream(s). The spatial processor is configurable in response to a control signal transmitted by the base station to separate the composite signals into estimated substreams based on information obtained during the transmission of known data patterns from at least one of the base stations. The spatial processor signals the base stations when a change of a spatial transmission configuration is required. The combiner combines the estimated substreams into a corresponding subscriber datastream.

20 Claims, 36 Drawing Sheets

Related U.S. Application Data continuation of application No. 10/929,015, filed on Aug. 26, 2004, now Pat. No. 7,773,564, which is a continuation of application No. 09/564,770, filed on May 3, 2000, now Pat. No. 6,757,265, which is a division of application No. 09/545,434, filed on Apr. 7, 2000, now Pat. No. 6,678,253, which is a continuation-in-part of application No. 09/364,146, filed on Jul. 30, 1999, now Pat. No. 6,067,290.

(51) Int. Cl.

| | | |
|---|---|---|
| *H04H 20/71* | (2008.01) | |
| *H04B 7/06* | (2006.01) | |
| *H04B 7/26* | (2006.01) | |
| *H04W 16/02* | (2009.01) | |
| *H04W 16/12* | (2009.01) | |
| *H04W 28/12* | (2009.01) | |
| *H04W 88/08* | (2009.01) | |
| *H04W 16/24* | (2009.01) | |
| *H04W 16/28* | (2009.01) | |
| *H04W 74/04* | (2009.01) | |
| *H04W 80/00* | (2009.01) | |
| *H04W 84/04* | (2009.01) | |
| *H04W 88/02* | (2009.01) | |

(52) U.S. Cl.
CPC ............ *H04H 20/71* (2013.01); *H04W 16/02* (2013.01); *H04W 16/12* (2013.01); *H04W 28/12* (2013.01); *H04W 88/08* (2013.01); *H04W 16/24* (2013.01); *H04W 16/28* (2013.01); *H04W 74/04* (2013.01); *H04W 80/00* (2013.01); *H04W 84/042* (2013.01); *H04W 88/02* (2013.01)

(56) References Cited

U.S. PATENT DOCUMENTS

| | | | |
|---|---|---|---|
| 5,515,378 | A | 5/1996 | Roy, III et al. |
| 5,534,911 | A | 7/1996 | Levitan |
| 5,566,209 | A | 10/1996 | Forssen et al. |
| 5,592,471 | A | 1/1997 | Briskman |
| 5,592,490 | A | 1/1997 | Barratt et al. |
| 5,614,914 | A | 3/1997 | Bolgiano et al. |
| 5,642,353 | A | 6/1997 | Roy, III et al. |
| 5,729,825 | A | 3/1998 | Kostreski et al. |
| 5,732,075 | A | 3/1998 | Tangemann et al. |
| 5,815,488 | A | 9/1998 | Williams et al. |
| 5,828,658 | A | 10/1998 | Ottersten et al. |
| 5,841,971 | A | 11/1998 | Longginou et al. |
| 5,933,421 | A | 8/1999 | Alamouti et al. |
| 5,960,039 | A | 9/1999 | Martin et al. |
| 6,058,105 | A | 5/2000 | Hochwald et al. |
| 6,064,662 | A | 5/2000 | Gitlin et al. |
| 6,067,290 | A * | 5/2000 | Paulraj et al. ................. 370/329 |
| 6,097,771 | A | 8/2000 | Foschini |
| 6,108,565 | A * | 8/2000 | Scherzer ................... 455/562.1 |
| 6,144,711 | A | 11/2000 | Raleigh et al. |
| 6,275,345 | B1 | 8/2001 | Petrus et al. |
| 6,275,543 | B1 | 8/2001 | Petrus et al. |
| 6,317,466 | B1 | 11/2001 | Foschini et al. |
| 6,351,499 | B1 | 2/2002 | Paulraj et al. |
| 6,377,631 | B1 | 4/2002 | Raleigh |
| 6,609,039 | B1 | 8/2003 | Schoen |
| 6,678,253 | B1 * | 1/2004 | Heath et al. .................. 370/265 |
| 6,757,265 | B1 * | 6/2004 | Sebastian et al. ............ 370/319 |
| 7,773,564 | B2 * | 8/2010 | Heath et al. .................. 370/334 |

OTHER PUBLICATIONS

Paulraj et al., Taxonomy of Space-Time Processing for Wireless Networks, Feb. 1, 1998, IEEE Proceedings: Radar, Sonal, & Navigation, GB, Institution of Electrical Engineers, vol. 145, No. 1.

Paulraj et al., "Space-Time Processing for Wireless Communications", Nov. 1997, IEEE Signal Processing Magazine.

* cited by examiner

SPATIAL MULTIPLEX

Space-Time Processor FIG. 7C

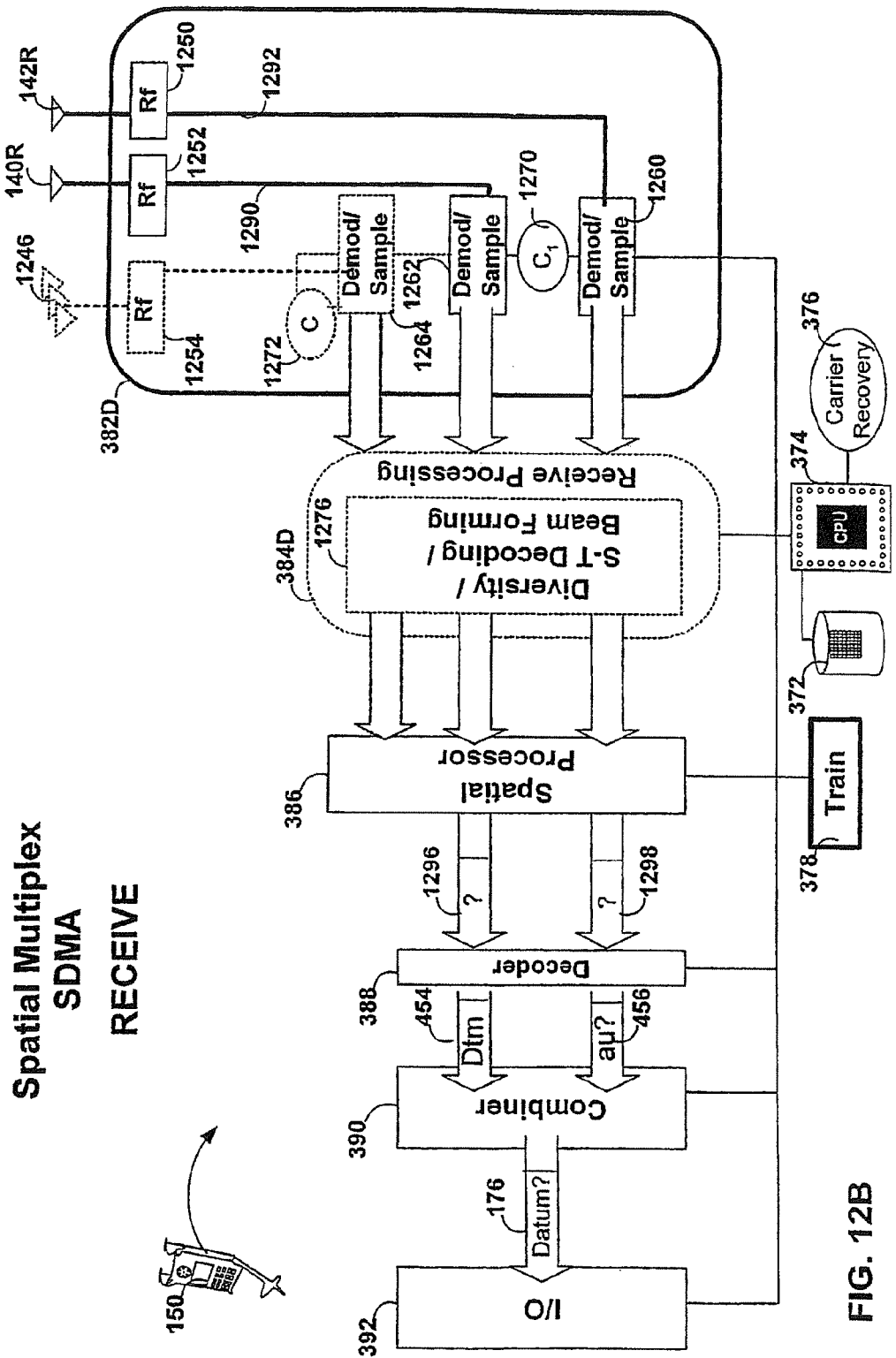

SPATIAL MULTIPLEXING IN A CELLULAR NETWORK

CROSS-REFERENCE TO RELATED APPLICATIONS

This application is a Continuation of application Ser. No. 13/684,010, filed on Nov. 21, 2012, which is a Continuation of application Ser. No. 12/823,057, filed on Jun. 24, 2010, which is a Continuation of application Ser. No. 10/929,015 filed on Aug. 26, 2004, which is a Continuation of application Ser. No. 09/564,770 filed on May 3, 2000 now U.S. Pat. No. 6,757,265, which is a Division of application Ser. No. 09/545,434 filed on Apr. 7, 2000 now U.S. Pat. No. 6,678,253 which is a Continuation-in-Part of application Ser. No. 09/364,146 filed on Jul. 30, 1999 now U.S. Pat. No. 6,067,290 all of which are incorporated herein by reference herein.

BACKGROUND OF THE INVENTION

Copyright Authorization

A portion of the disclosure of this patent document contains material which is subject to copyright protection. The copyright owner has no objection to the facsimile reproduction by any one of the patent disclosure, as it appears in the U.S. Patent and Trademark Office patent files or records, but otherwise reserves all copyright rights whatsoever.

FIELD OF INVENTION

The field of the present invention relates in general to the field of wireless broadcast of information using one or more multiple access protocols and in particular to methods and apparatus for implementing spatial multiplexing in conjunction with the one or more multiple access protocols during the broadcast of information.

DESCRIPTION OF THE RELATED ART

In wireless broadcast systems, information generated by a source is transmitted by wireless means to a plurality of receivers within a particular service area. The transmission of such information requires a finite amount of bandwidth, and in current state of the art transmission of information from different sources, must occur in different channels.

Since there are quite a few services (e.g. television, FM radio, private and public mobile communications, etc.) competing for a finite amount of available spectrum, the amount of spectrum which can be allocated to each channel is severely limited. Innovative means for using the available spectrum more efficiently are of great value. In current state of the art systems, such as cellular telephone or broadcast television, a suitably modulated signal is transmitted from a single base station centrally located in the service area or cell and propagated to receiving stations in the service area surrounding the transmitter. The information transmission rate achievable by such broadcast transmission is constrained by the allocated bandwidth. Due to attenuations suffered by signals in wireless propagation, the same frequency channel can be re-used in a different geographical service area or cell. Allowable interference levels determine the minimum separation between base stations using the same channels. What is needed is a way to improve data transfer speed in the multiple access environments currently utilized for wireless communications within the constraints of available bandwidth.

SUMMARY OF THE INVENTION

The present invention provides methods and apparatus for implementing spatial multiplexing in conjunction with the one or more multiple access protocols during the broadcast of information in a wireless network.

In an embodiment of the invention, a wireless cellular network for transmitting subscriber datastream(s) to corresponding ones among a plurality of subscriber units located within the cellular network is disclosed. The wireless cellular network includes base stations and a logic. The base stations each include spatially separate transmitters for transmitting in response to control signals and selected substreams of each subscriber datastream on an assigned channel of a multiple access protocol. The logic communicates with each of the base stations. The logic assigns an available channel on which to transmit each subscriber datastream. The logic routes at least a substream of each datastream to at least a selected one of the base stations. The logic also generates control signals to configure at least a selected one of the base stations to transmit the selected substreams to a corresponding one among the plurality of subscriber units on the assigned channel.

In an embodiment of the invention, a subscriber unit for use in a cellular system with base stations, each including spatially separate transmitters for transmitting selected substreams of at least one of a plurality of subscriber downlink datastream(s) on an assigned channel of a multiple access protocol, is disclosed. The subscriber unit includes: spatially separate receivers, a spatial processor, and a combiner. The spatially separate receivers receive the assigned channel composite signals resulting from the spatially separate transmission of the subscriber downlink datastream(s). The spatial processor is configurable response to a control signal transmitted by the base station to separate the composite signals into estimated substreams based on information obtained during the transmission of known data patterns from at least one of the base stations or by using blind training techniques. The spatial processor signals the base stations when a change of a spatial transmission configuration is required in order to resolve the composite signals into estimated downlink datastream(s). The combiner combines the estimated substreams into a corresponding subscriber datastream.

In another embodiment of the invention, a wireless cellular network for transmitting subscriber downlink datastream(s) from a first network to subscribers located within the wireless cellular network is disclosed. The wireless cellular network includes: base stations, subscriber units and a logic. The base stations are each configured for spatially separate transmission of selected substreams of each subscriber downlink datastream on an assigned channel of a multiple access protocol. The subscriber units are each configured for spatially separate reception on the assigned channel of the selected substreams, for combining the substreams into the corresponding subscriber datastream and for initiating a change signal to at least one of the base stations when a change of a spatial transmission configuration is required in order to separate the selected substreams. The logic communicates with each of the base stations and to the first network. The logic is configured to route at least a substream of each subscriber downlink datastream to at least a selected one of the base stations and further configured to vary the routing between a single base station and multiple base stations to vary a spatial transmission configuration of the selected substreams.

In another embodiment of the invention, a wireless cellular network for receiving subscriber datastreams at corresponding ones among a plurality of base stations located within the cellular network is disclosed. The wireless cellular network includes: subscriber units and logic. The subscriber units each include spatially separate transmitters for transmitting, in response to control signals, selected substreams of each subscriber datastream on an assigned channel of a multiple access protocol. The logic communicates with each of the base stations. The logic generates control signals to configure selected ones of the base stations to receive composite signals resulting from the spatially separate transmission of the selected substreams from a corresponding one among the plurality of subscriber units on the assigned channel. The logic also converts the composite signals into estimate substreams and combines the estimated substreams of each subscriber datastream into each subscriber datastream.

In another embodiment of the invention, a wireless cellular network for transmitting subscriber downlink datastream(s) from a first network to subscribers located within the wireless cellular network is disclosed. The wireless cellular network includes base stations and logic. The base stations include at least one transmitter, for transmitting in response to control signals selected substreams of each subscriber datastream on an assigned channel of a multiple access protocol. The logic communicates with each of the base stations. The logic for assigns an available channel on which to transmit each subscriber datastream. The logic routes at least a substream of each datastream to at least a selected one of the base stations. The logic further generates control signals to configure the at least a selected one of the base stations to transmit the selected substreams to a corresponding one among the plurality of subscriber units on the assigned channel.

In an embodiment of the invention, a method for transmitting subscriber downlink datastream(s) from base stations to corresponding ones among a plurality of subscriber units is disclosed. The method includes the acts of: routing at least a substream of each subscriber downlink datastream to selected one of the base stations; transmitting the at least a substream of each subscriber downlink datastream from the selected one of the base stations on an assigned channel of a multiple access protocol; and re-routing at least a substream of each subscriber downlink datastream between a single base station and multiple base stations responsive to a determination that a change of a spatial transmission configuration of the at least a substream of each subscriber downlink datastream signal is required.

In another embodiment of the invention, a method for receiving subscriber downlink datastream(s) transmitted from a plurality of spatially separate transmitters is disclosed. The method includes the acts of: receiving signals generated from at least one of the plurality of spatially separate transmitters; determining a number of substreams to be derived from the signals; separating the signals into the number of substreams determined in said act of determining; and combining the substreams into a corresponding subscriber downlink datastream.

In another embodiment of the invention, a wireless cellular network for transmitting subscriber datastream(s) to corresponding ones among a plurality of subscriber units located within the cellular network is disclosed. The wireless cellular network includes: means for routing at least a substream of each subscriber downlink datastream to selected ones of the base stations; means for transmitting the at least a substream of each subscriber downlink datastream from the selected ones of the base stations on an assigned channel of a multiple access protocol; and means for re-routing the at least a substream of each subscriber downlink datastream between a single base station and multiple base stations responsive to a signal from a corresponding one of the subscriber units requesting a change of spatial transmission configuration.

In another embodiment of the invention, a subscriber unit for use in a cellular system with base stations each including spatially separate transmitters for transmitting selected substreams of at least one of a plurality of subscriber downlink datastream(s) on an assigned channel of a multiple access protocol is disclosed. The subscriber unit includes: means for receiving signals generated from at least one of the plurality of spatially separate transmitters; means for determining a number of substreams to be derived from the signals; means for separating the signals into the number of substreams determined in said act of determining; means for combining the substreams into a corresponding subscriber downlink datastream; and means for signaling the base when a change of a spatial transmission configuration is required in order to resolve the composite signals into estimated substreams.

BRIEF DESCRIPTION OF THE DRAWINGS

These and other features and advantages of the present invention will become more apparent to those skilled in the art from the following detailed description in conjunction with the appended drawings in which:

FIGS. 7C-D show detailed hardware block diagrams of a configurable space and space-time processor associated with the configurable spatial receiver according to an embodiment of the current invention.

FIGS. 12A-B are respectively detailed hardware block diagrams of a spatially multiplexed transmitter and receiver implementing a space-division multiple access protocol (SDMA), according to an embodiment of the current invention.

DETAILED DESCRIPTION OF THE EMBODIMENTS

Figure 1A:
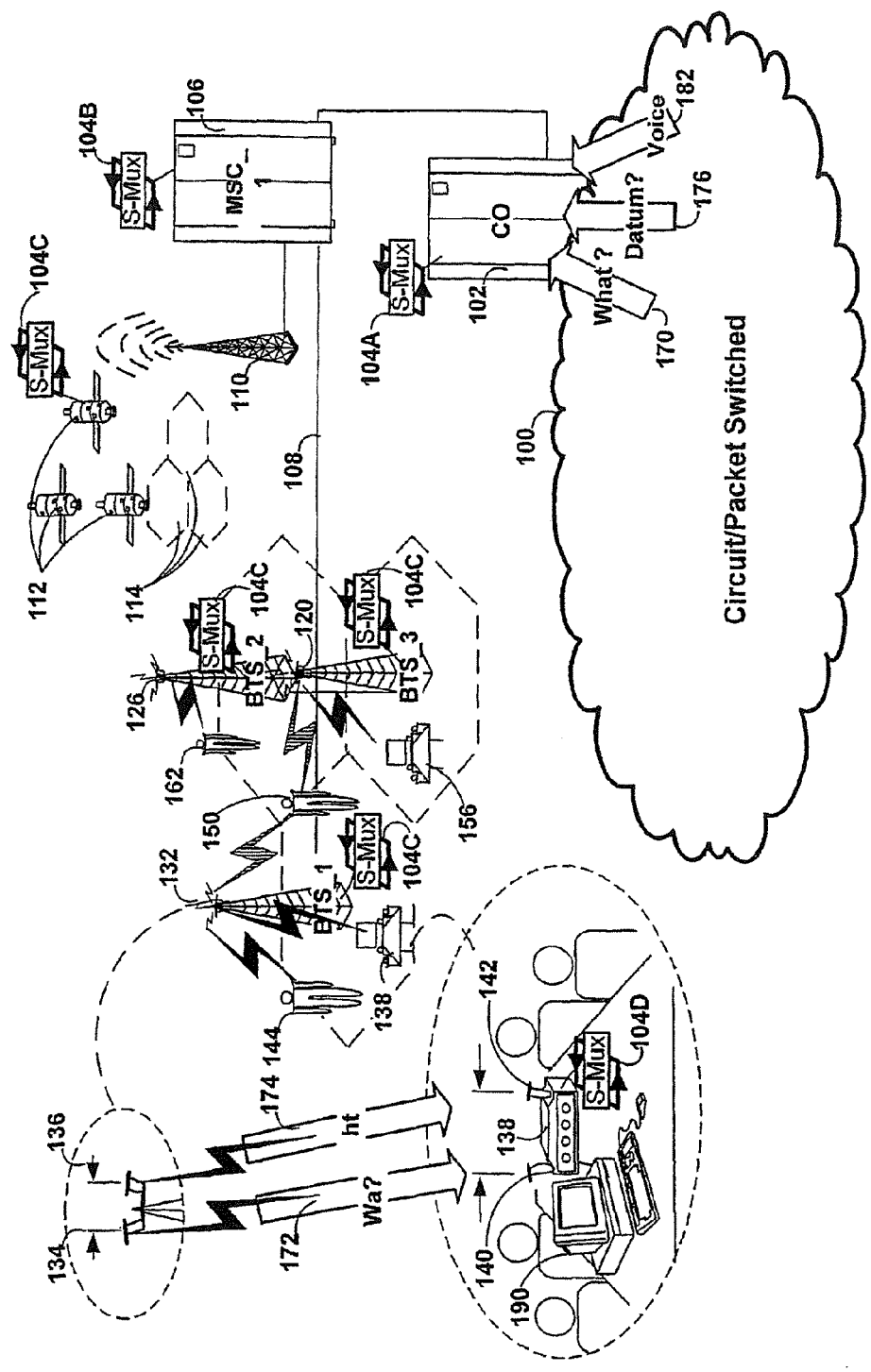
FIG. 1A shows a wireless cellular network incorporating spatial multiplexing and multiple access according to the current invention.

A method and apparatus is disclosed which allows for both spatial multiplexed and non-spatial wireless communications between portable units and corresponding selected ones among a plurality of base stations. The methods and apparatus of the current invention may be implemented on a dedicated wireless infrastructure or may be superimposed on existing wireless communications systems, such as cellular telephone and paging services, which are currently in place around the world. The methods and apparatus include implementation in any of a number of multiple access protocols.

Spatial Multiplexing and Multiple Access

Spatial multiplexing (SM) is a transmission technology which exploits multiple antennas at both the base station(s) and at the subscriber units to increase the bit rate in a wireless radio link with no additional power or bandwidth consumption. Under certain conditions, spatial multiplexing offers a linear increase in spectrum efficiency with the number of antennas. Assuming, for example, N=3 antennas are used at the transmitter and receiver, the stream of possibly coded information symbols is split into three independent substreams. These substreams occupy the same channel of a multiple access (MA) protocol, the same time slot in a time-division multiple access (TDMA) protocol, the same frequency slot in frequency-division multiple access (FDMA) protocol, the same code/key sequence in code-division multiple access (CDMA) protocol or the same spatial target location in space-division multiple access (SDMA) protocol. The substreams are applied separately to the N transmit antennas and launched into the radio channel. Due to the presence of various scattering objects (buildings, cars, hills, etc.) in the environment, each signal experiences multipath propagation. The composite signals resulting from the transmission are finally captured by an array of receive antennas with random phase and amplitudes. For every substream the set of N received phases and N received amplitudes constitute its spatial signature.

At the receive array, the spatial signature of each of the N signals is estimated. Based on this information, a signal processing technique is then applied to separate the signals, recover the original substreams and finally merge the symbols back together. Linear or nonlinear receivers can be used providing a range of performance and complexity trade-offs. A linear spatial multiplexing receiver can be viewed as a bank of superposed spatial weighting filters, where every filter aims at extracting one of the multiplexed substreams by spatially nulling the remaining ones. This assumes, of course, that the substreams have different signatures.

If the transmitter is equipped with M antennas, while the receiver has N antennas, the rate improvement factor allowed by spatial multiplexing is the minimum of these two numbers. Additional antennas on the transmit or receive side are then used for diversity purposes and further improve the link reliability by improving, for example, the signal-to-noise ratio or allowing for smaller fading margins, etc. Effectively spatial multiplexing allows a transmitter receiver pair to communicate in parallel through a single MA channel, hence allowing for a possible N-fold improvement of the link speed. More improvement is actually obtained if we take into account the diversity gain offered by the multiple antennas (for instance, in a Raleigh fading channel). Such performance factors are derived ideally under the assumption that the spatial signatures of the substreams are truly independent from each other. In reality, the level of independence between the signatures will determine the actual link performance. The performance, however, usually exceeds that obtained by a single antenna at the transmitter and receiver. For example, at two GHz, assuming the base station and the subscriber unit are spaced apart by one mile and using three antennas at each end of the link, a scattering radius of about 30 feet (both ends) is enough to achieve maximum performance.

FIG. 1A shows a plurality of subscriber units wirelessly coupled over a cellular network to a network 100. Network 100 may include: a local area network (LAN), a wide area network (WAN), a public switched telephone network (PSTN), Public Land Mobile Network (PLMN), an adhoc network, a virtual private network, an intranet or the internet. The wireless system includes: a central office (CO) 102, a master switch center (MSC) 106, a ground based relay station 110, satellites (112), base stations 120, 126 and 132 (BTS) and subscriber units 156, 138, 144, 150 and 162. The subscriber units may be mobile, fixed or portable. The base stations may be fixed or mobile. The base stations may include: a tower, satellites, balloons, planes, etc. The base station may be located indoors/outdoors. The cellular network includes one or more base stations, where each base station includes one or more spatially separate transmitters.

The central office 102 is coupled to the network 100. Network 100 may be circuit switched (e.g. point-to-point) or packet switched network. The central office is coupled to a master switching center 106. The MSC in traditional cellular systems is alternately identified as: a mobile telephone switching office (MTSO) by Bell Labs, an electronic mobile Xchange (EMX) by Motorola, an AEX by Ericcson, NEAX by NEC, a switching mobile center (SMC) and a master mobile center (MMC) by Novatel. The MSC is coupled via data/control line 108 to the satellites via relay station 110 and to the base stations. In an alternate embodiment of the invention, base station controllers (BSC) may serve as intermediary coupling points between the MSC and the base stations. In the embodiment shown, each of the BTS includes an array of spatially separate antennas for transmission and/or reception. The BTS may also include traditional antenna for whichever of the receive/transmit side of its communication capability lacks spatially separate antenna and associated circuitry. Antennas of a transmitter/receiver are defined to be spatially separate if they are capable of transmitting/receiving spatially separate signals. Physically separate antenna may be used to transmit/receive spatially separate signals. Additionally, a single antenna may be used to transmit/receive spatially separate signals provided it includes the ability to transmit/receive orthogonal radiation patterns. Hereinafter, the phrase "spatially separate" shall be understood to include any antenna or transmitter or receiver capable of communicating spatially separate signals. The base stations are configured to communicate with subscriber units of a traditional type, i.e. those lacking either spatially separate transmission/reception as well as spatially enabled subscriber units, i.e. those including either or both spatially separate reception and transmission capabilities.

In operation, distinct subscriber datastream(s) 170, 176 and 182 are received by CO 102. The CO performs the initial routing of the data streams to the appropriate one of a plurality of MSCs which may be located across the country. The MSC performs several functions. It controls the switching between the PSTN or network 100 and the BTSs for all wireline-to-subscriber, subscriber-to-wireline and subscriber-to-subscriber calls. It processes/logic data received from BTSs concerning subscriber unit status, diagnostic data and bill compiling information. In an embodiment of the invention, the MSC communicates with the base stations and/or satellites with a datalink using the X.25 protocol or IP protocol. The MSC also implements a portion of the spatial multiplexing and multiple access processes/logic (SM_MA) 104B of the current invention. Each BTS operates under the direction of the MSC. The BTS and satellites 112 manage the channels at the site, supervise calls, turn the transmitter/receiver on/off, inject data onto the control and user channels and perform diagnostic tests on the cell-site equipment. Each BTS and satellite also implement a portion of the SM MA processes/logic 104C. The subscriber units may be both traditional and spatially enabled and may still communicate over the system. Those subscriber units that are spatially enabled on either/both the transmit/receive side of communications implement SM_MA processes/logic 104D as well.

The SM_MA processes/logic allow high bit rate communications with any of the SM_MA enabled subscriber units within existing bandwidth constraints and within any of the multiple access (MA) protocols common to wireless communications or combinations thereof. Those MA protocols include: time-division multiple access (TDMA), frequency-division multiple access (FDMA), code-division multiple access (CDMA), space-division multiple access (SDMA) and many other multiple access protocols known to those skilled in the art. The SM_MA processes/logic include the ability to selectively allocate spatially separate downlink or uplink capability to any spatially enabled subscriber within a multiple access environment. This capability allows, as to that subscriber, the elevation of bit rates well above those currently available. Thus, a whole new range of subscribers can be anticipated to take advantage of this capability. Utilizing this invention, it will be possible to provide a wireless medium for connecting workstations, servers and tele-video conferences using the existing cellular infrastructure with the adaptations provided by this invention. The SM_MA processes/logic involve splitting subscriber datastream(s) destined for spatial multiplexing into substreams and intelligently routing and re-routing the substreams during a call session so as to maintain consistent quality of service (QoS). The substreams are communicated on the same channel using the same access protocol, thus not requiring additional resources or bandwidth to implement. The processes/logic include: access protocol assignment, channel assignment, monitoring of spatial separation, determination/redetermination of spatial signatures for each communication link, routing/re-routing between single-BTS and multi-BTS, handoff and control of substream parsing/combining.

In FIG. 1A, datastream(s) 170, 176 and 182 are shown originating on network 100. The SM_MA processes/logic 104 have parsed and routed subscriber data stream 170 into substreams 172-174, which are transmitted on a single channel of a multiple access protocol over the spatially separate antenna 134-136 of BTS 132. Subscriber unit 138, via spatially separate antenna 140-142, receives composite signals 172-174 resulting from the substream transmission and utilizing SM_MA processes/logic 104D, derives the substream and original datastream 170 therefrom. In the embodiment shown, the data is delivered to the computer 190 to which the fixed subscriber desktop unit 138 is coupled. The cellular environment may also be implemented utilizing aerial equivalents of the base stations. In the embodiment shown, a plurality of satellites 112 generally deliver subscriber datastream(s) via spatially separate antennae on each of the satellites to a cellular network, i.e. 114.

In a circuit-switched embodiment of the invention, a call over a cellular network may require using two channels simultaneously; one called the user channel and one called the control channel. The BTS(s) transmit and receive on what is called a forward/downlink control channel and the forward/downlink voice/data channel and the subscriber unit transmit/receive on the reverse/uplink control and voice/data channels. Completing a call within a cellular radio system is quite similar to the PSTN. When a subscriber unit is first turned on, it performs a series of startup procedures and then samples the received signal strength on all user channels. The unit automatically tunes to the channel with the strongest receive signal strength and synchronizes to the control data transmitted by the BTS(s). The subscriber unit interprets the data and continues monitoring the controlled channels. The subscriber unit automatically re-scans periodically to ensure that it is using the best control channel. Within a cellular system, calls can take place between a wireline party and a subscriber unit or between two subscriber units. For wireline-to-subscriber unit calls, the MSC receives a call from either a wireline party or in the form of a call setup packet from the network 100. The MSC determines whether the subscriber unit to which the call is destined is on/off hook. If the subscriber unit is available, the MSC directs the appropriate BTS to page the subscriber unit. The subscriber unit responds to the BTS indicating its availability and spatial multiplexing capabilities, receive and/or transmit. Following the page response from the subscriber unit, the MSC/BTS switch assigns an idle channel, configures spatial processing capability on both the subscriber unit and BTS(s) if appropriate, and instructs the subscriber unit to tune to that channel. The subscriber unit sends a verification of channel tuning to the BTS(s) and then sends an audible call progress tone to the subscriber I/O unit causing it to ring. The switch terminates the call progress tone when it receives positive indication the subscriber has answered and the conversation or communication has begun.

Calls between two subscriber units are also possible in the cellular radio system. To originate a call to another subscriber unit, the calling party enters the called number into the unit's memory via the touch pad and then presses the send key. The MSC receives the caller's identification number and the called number then determines if the called unit is free to receive the call. The MSC switch sends a page command to all base stations and the called party, who may be anywhere in the service area, receives the page. The MSC determines the spatial multiplexing capability of both subscribers. Following a positive page from the called party, the switch assigns each party an idle user channel and instructs each party to tune into that respective channel. Then the called party's phone rings. When the system receives notice the called party has answered the phone, the switch terminates the call progress tone and a communication can begin between two subscriber units. If spatial multiplexing is enabled, the communication link will include that capability.

One of the most important features of the cellular system is its ability to transfer calls that are already in progress from one cell site/base station to another as a subscriber unit moves from cell to cell or coverage area to coverage area within the cellular network. This transfer process is called a handoff. Computers at the BTS transfer calls from cell to cell with minimal disruption and no degradation in quality of transmission. The handoff decision algorithm is based on variations in signal strength. When a call is in progress, the MSC monitors the received signal strength of each user channel. If the signal level on an occupied channel drops below a predetermined threshold for more than a given time interval, the switch performs a handoff provided there is a vacant channel. In a traditional non-SM cellular system a traditional handoff involves switching the transmission point of a subscriber session (datastream) from one BTS to another. In the current invention various types of handoff, e.g. partial and full may take place. The handoff operation may involve the MSC re-routing the call and the entire datastream or selected sub-streams thereof to different antennas of the same BTS or to a new BTS/BTSs in whole or in part. Where the re-routing is partial, at least one substream communication path is left unchanged while other of the substreams are re-routed to antennas on another BTSs. Where the handoff is full the multiple substreams transmitted from one or more BTSs are re-routed to other BTS(s).

In an embodiment of the invention utilizing a packet switched architecture, call setup may be implemented using protocols including: ALOHA, slotted-ALOHA, carrier sense multiple access (CSMA), TDMA, FDMA, CDMA, SDMA, etc., or any combination thereof.

BTS 132, in the embodiment shown, includes spatially separate antenna array. There may be any number of antennas. In some spatial environments, baud rates for spatially multiplexed communications on a single channel will increase linearly with the number of antennas allocated by subscriber unit and BTSs to a call session. In the embodiment shown, each BTSs array includes at least two antennas 134 and 136. The BTS may include either or both spatial multiplexing capability on the downlink (transmit) or uplink (receive) side. In the embodiment shown, each BTS includes spatial multiplexing capability on both the downlink and uplink. Although each of the following embodiments utilizes two antennas to implement SM, any number of antennas on a single BTS or multiple BTSs may be utilized without departing from the scope of the invention.

Figure 1B:
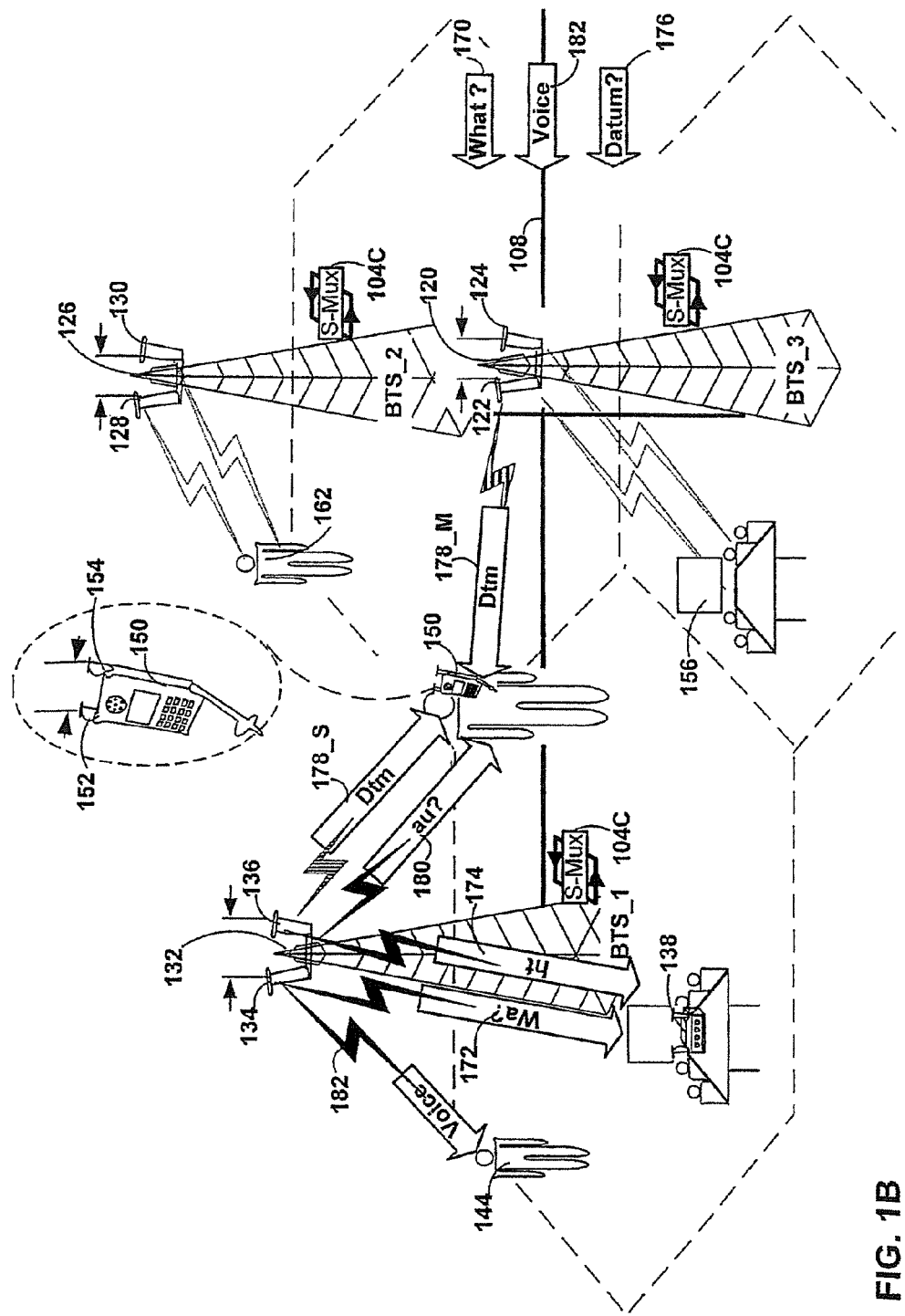
FIG. 1B is a detailed view of selected cells within the cellular network shown in FIG. 1A.

FIG. 1B shows a more detailed view of the BTS and subscriber units shown in FIG. 1A. Each BTS includes two spatially separate antennas. BTS 120 includes antennas 122-124. BTS 126 includes antennas 128-130. BTS 132 includes antennas 134-136. In the embodiment shown, many of the subscriber units also include at least two spatially separate antennas. Subscriber unit 150 includes spatially separate antennas 152-154. In the embodiment shown, the MSC handles the routing of subscriber datastream(s) 170, 176 and 182 from network 100 to the appropriate BTSs for transmission to the appropriate subscriber unit. In an embodiment of the invention, the SM_MA processes/logic include the ability to determine whether to implement or not implement spatial multiplexing (SM), based on either the presence/absence of SM capabilities in the corresponding subscriber unit and/or on the nature of the datastream. If, for example, the subscriber lacks SM capability on either or both the uplink/downlink, then the corresponding datastream will not be parsed into substreams. Alternately, even if the subscriber unit and BTS have SM capability on both downlink and uplink, certain types of datastream(s) may not require SM processing. Examples of these might include: traditional voice call sessions, call sessions which require only low QoS or datastream(s) which require only very low bit rates or are susceptible to buffering and delayed transmission.

In the example shown in FIG. 1B, datastream 182 is traditional mode traffic, e.g. a subscriber telephone call between an upstream subscriber and the subscriber unit 144. Subscriber unit 144 is located within a cell serviced by BTS 132. Under the control of MSC 106, the datastream 182 is transmitted over signal line 108 directly to the corresponding base station 132 without being split or parsed into associated substreams. In the example shown, datastream(s) 182 is transmitted from a single antenna, e.g. antenna 134, without any SM techniques. That transmission is received by the subscriber unit 144. As discussed above, subscriber unit 144 may be a traditional cell phone lacking SM capability. Alternately, subscriber unit 144 may be SM enabled but, nevertheless, receives the call in traditional mode after appropriately configuring itself to opt out of SM receive side processes/logic, electing instead traditional mode.

In the example shown, datastream(s) 170 is handled using SM_MA processes/logic 104_. The datastream 170 and/or substreams thereof, depending on the embodiment, is routed by the MSC to BTS 132. The processes/logic 104 provide to each antenna 134-136 of BTS 132 a single substream derived from the original datastream 170, on a common channel within the appropriate access protocol. Those substreams are received as composite signals by the spatially separate antenna 140-142 (see FIG. 2B) of subscriber unit 138. The subscriber unit 138, utilizing SM-MA processes/logic 104D, derives the substreams from the composite signals and combines these into the initially transmitted datastream(s) 170.

Datastream(s) 176 is also subject to SM_MA processes/logic 104_. The datastream 176 and/or substreams thereof, depending on the embodiment, is routed by the MSC, initially to BTS 132 for single-base transmission to subscriber unit 150. SM-MA processes/logic implemented collectively at the MSC 106 and BTS 132 result in the splitting/parsing of the datastream(s) 176 into substreams 178-180. Initially those substreams are received as composite signals by the spatially separate antenna 152-154 (see FIG. 2C) of subscriber unit 150. The subscriber unit 150, utilizing SM_MA processes/logic 104D, derives the substreams from the composite signals and combines these into the initially transmitted datastream(s) 176.

Implementing SM or SM_MA communications between the BTS and the associated subscriber unit may be either line-of-site (LOS) or multipath. Multipath communications are likely in environments, such as a city, where buildings and other objects deflect signals transmitted from the BTS many times before their arrival at the subscriber unit. Under certain conditions, it may be the case that transmissions originating from spatially separate antennas of a single BTS may arrive at a subscriber unit along signal paths which cannot be spatially separated by the antenna array on the subscriber unit. Where this is the case, it may be necessary for the processes/logic to reconfigure the spatial transmission characteristics of the substreams so that they may be received at the corresponding portable unit in a manner which is spatially separable. In the example shown, the substreams 180 and 178_S are transmitted initially from a single BTS 132. When a determination is made, either by the BTS or subscriber unit that separation of the substreams is not possible, a spatial reconfiguration is initiated by the spatial multiplexing processes/logic 104. The determination might, for example, result from the subscriber unit signaling the BTS or from the BTS determining that the bit error rate (BER) of the transmission exceeded an acceptable level. In an alternate embodiment of the invention in which base and subscriber communicate over a common channel, the signaling from the subscriber to the base station(s) for a change of a spatial transmission configuration is simplified. The BTS may, by analyzing the received signals, determine that they can not be adequately separated and in response, alter the spatial configuration of the transmissions to the subscriber unit with which it shares a channel. In the example shown, this reconfiguration results in a change of spatial configuration to multi-base transmission. Substream 178_M is re-routed through BTS 120 and specifically antenna 122. Because subscriber unit 150 is positioned in an area in which the transmissions from BTS 120 and 132 overlap, the change in spatial configuration is possible. The increased spatial separation on the transmit side increases likelihood that the substreams can be spatially separated by the subscriber unit 150 and its associated SM-MA processes/logic 104D.

Figure 1C:
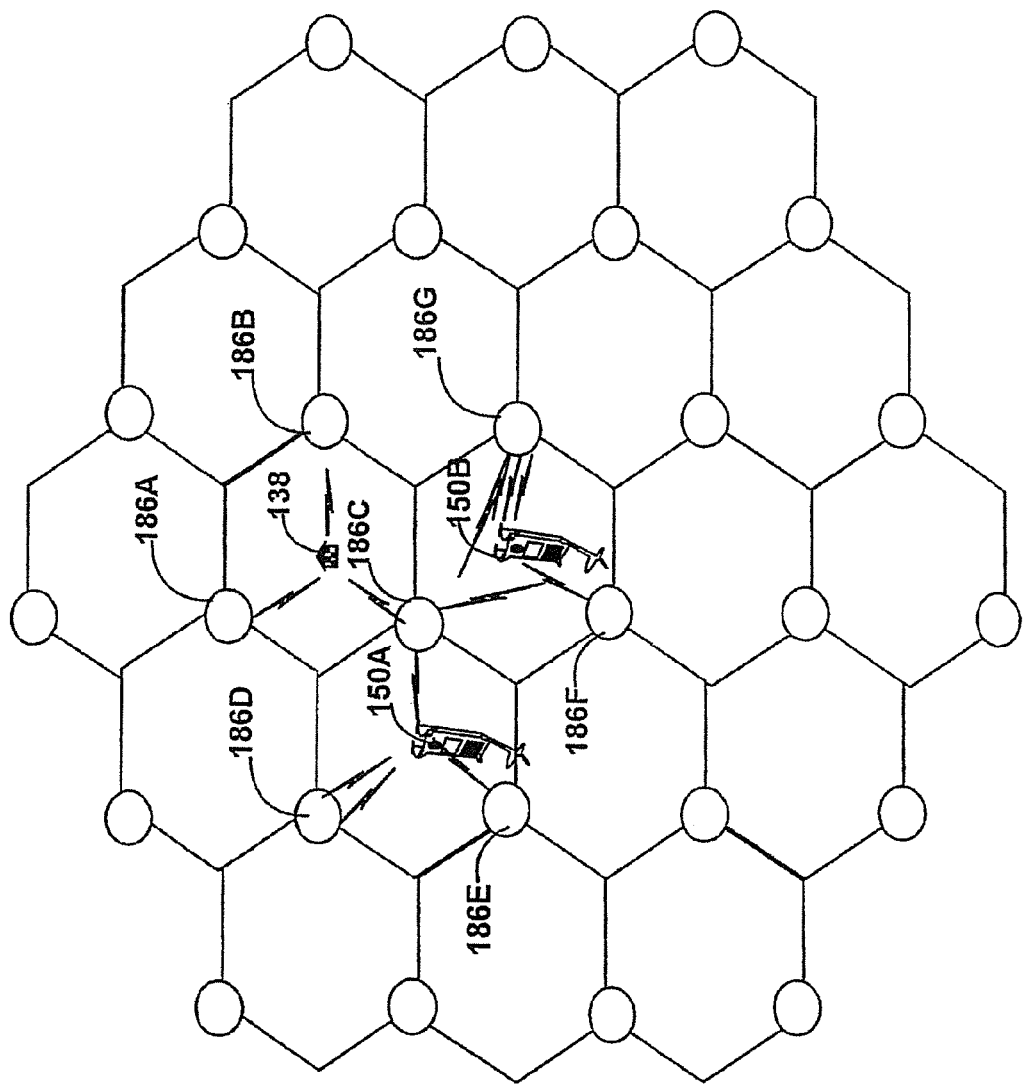
FIG. 1C shows a cell architecture that provides overlapping regions suitable for multi-base spatial multiplexing.

FIG. 1C shows another embodiment of the current invention in which a cell architecture which provides overlapping regions suitable for multi-base spatial multiplexing is shown. As in normal cellular structure, co-channel interference is avoided by ensuring that cells operating in the same frequency are spaced apart. In the example shown, BTSs 186A-C form an overlapping region between them in which they are shown in spatially multiplexed communication with subscriber unit 138. BTSs 186C-E form an overlapping region between them, in which they are shown in spatially multiplexed communication with subscriber unit 150A. BTSs 186C, F-G also form an overlapping region between them, in which they are shown in spatially multiplexed communication with subscriber unit 150B. The communications with subscriber units 138, 150A-B are conducted on separate channels to avoid co-channel interference. Diversity techniques can be simultaneously implemented. More distant cells may re-use the same channels provided co-channel interference is tolerable.

Figure 2D:
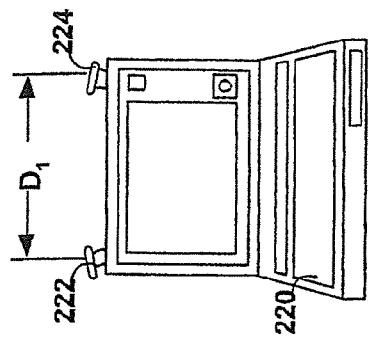
FIGS. 2A-G show alternate embodiments for the subscriber units utilized in the wireless cellular network shown in FIGS. 1A-B.
Figure 2E:
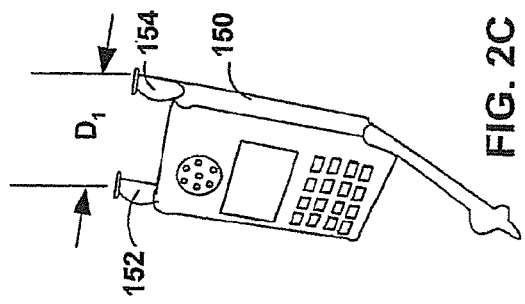
Figure 2F:
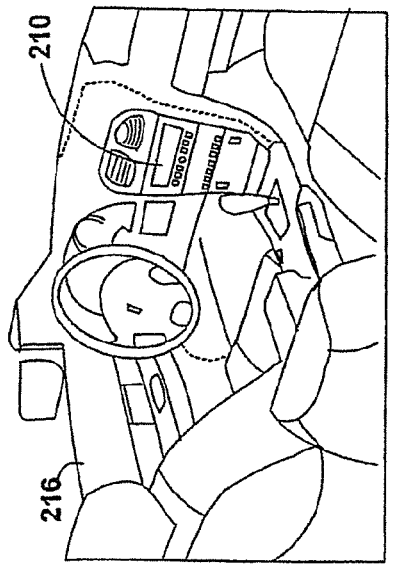
Figure 2B:
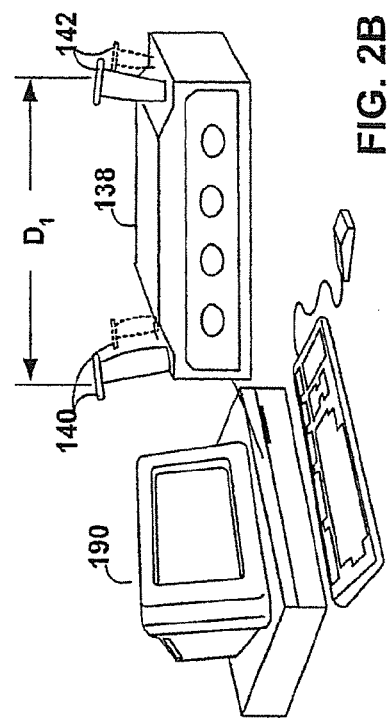
Figure 2A:
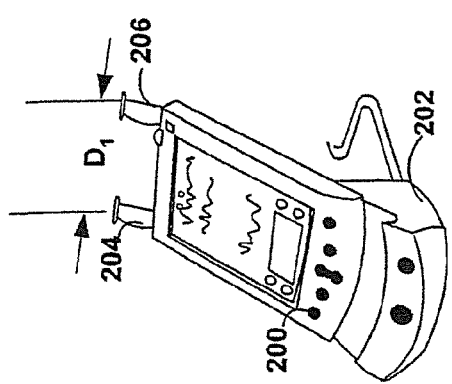

FIGS. 2A-G show alternate embodiments of subscriber units which may be either fixed, portable or mobile. FIG. 2A shows a mobile cellular phone 144 with a single antenna 146. In an embodiment of the invention, the single antenna includes the capability of transmitting and/or receiving spatially separable signals utilizing orthogonal di-poles. In an alternate embodiment of the invention, subscriber unit 144 is a traditional cellular phone which does not have the capability of transmitting/receiving a spatially separable signal. Either embodiment may be compatible with the system shown in FIGS. 1A-B, provided that system includes an embodiment of the invention with the ability to detect the transceiver capabilities of the subscriber units and to configure communications between that unit and the corresponding BTS accordingly.

FIG. 2B shows a fixed subscriber unit 138 coupled to a computer 190. In this embodiment, high-speed data communications between computer 190 and a wireless communication network with spatial multiplexing capabilities is enabled by fixed subscriber unit 138. Fixed subscriber unit 138 is shown with an antenna array including antennas 140-142. In the embodiment shown, additional antennas are provided. These may be utilized either for spatial multiplexing or to implement receive/transmit processing, e.g. diversity techniques, beam forming, interference cancellation, etc., the latter for the purpose of improving communication quality and link budget. The current state of the art requires a minimum separation between antennas 140-142, i.e. D1 equivalent to ½ the carrier wavelength. Further improvements in signal processing may avoid this requirement.

Figure 2C:
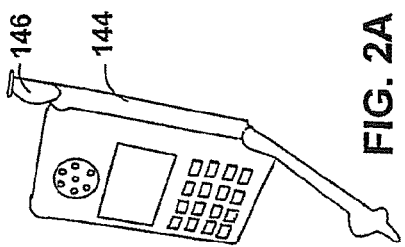

FIG. 2C shows a mobile subscriber unit, i.e. a cellular telephone 150, reconfigured for implementation of SM or SM_MA on either or both of the transmit (uplink) or receive (downlink) side of its communication with the BTSs. To this end, the antennas 152-154 are provided.

FIG. 2D shows a personal digital assistant (PDA) 200 and associated docking station 202 configured to implement SM or SM_MA communications on either or both the transmit and receive portions of its communications. To this end, the antenna array, which in the embodiment shown, includes two antennas 204-206 is provided. An example of personal digital assistants currently on the market that could be configured to utilize the current invention is the Palm Pilot™ product sold by 3Com Corporation.

FIG. 2E shows a mobile subscriber unit 210 implemented as part of an automobile 216. The antenna array associated with this unit is not shown. The use of SM or SM_MA wireless communications between vehicles and base stations can provide such benefits as vehicle navigation, routing, and diagnostics.

FIG. 2F shows a notebook computer 220 configured for SM or SM_MA communication utilizing an antenna array with antennas 222-224 and associated hardware and processes/logic.

Figure 2G:
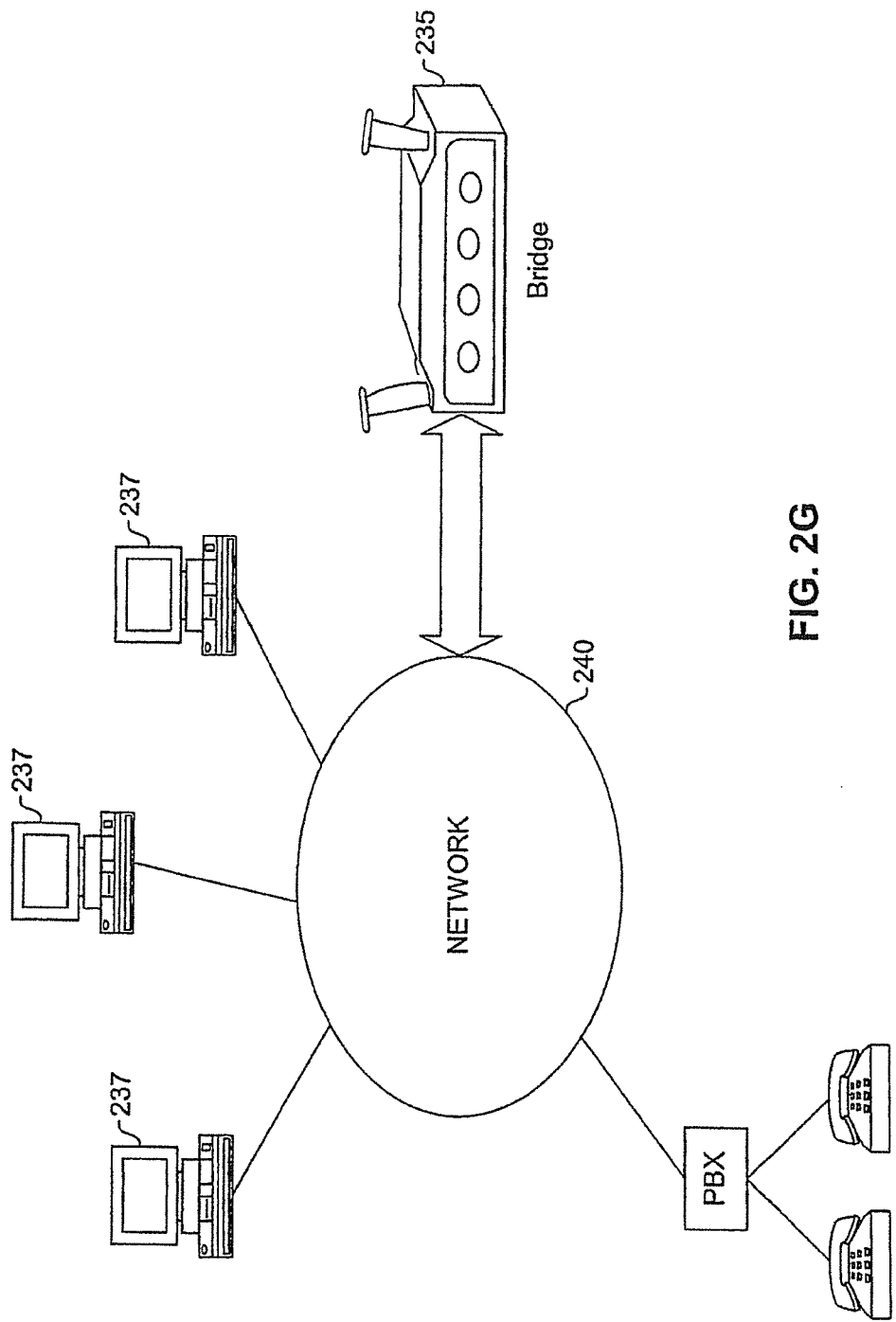

FIG. 2G shows a fixed subscriber unit 138 incorporated into a wireless router or bridge 235, which is coupled to a wired network 240. In this embodiment, the subscriber unit 138 serves as a high speed wireless connection between the wired network and the wireless communication network. The network 240 can take any suitable form including a local area network, a wide area network, an intranet, etc. It should be appreciated that in this arrangement, a wireless link is simply being used to connect two networks and such wireless links can be used in a wide variety of applications. For example, the wireless link can be used to provide high speed Internet access to the network 240. In the embodiment shown, the fixed subscriber unit 138 is shown as being incorporated into a router or bridge 235. However, it should be appreciated that the subscriber unit can readily be incorporated into a variety of network components having a variety of functionalities. For example, the router or bridge can further include firewall capabilities, etc.

Figure 3A:
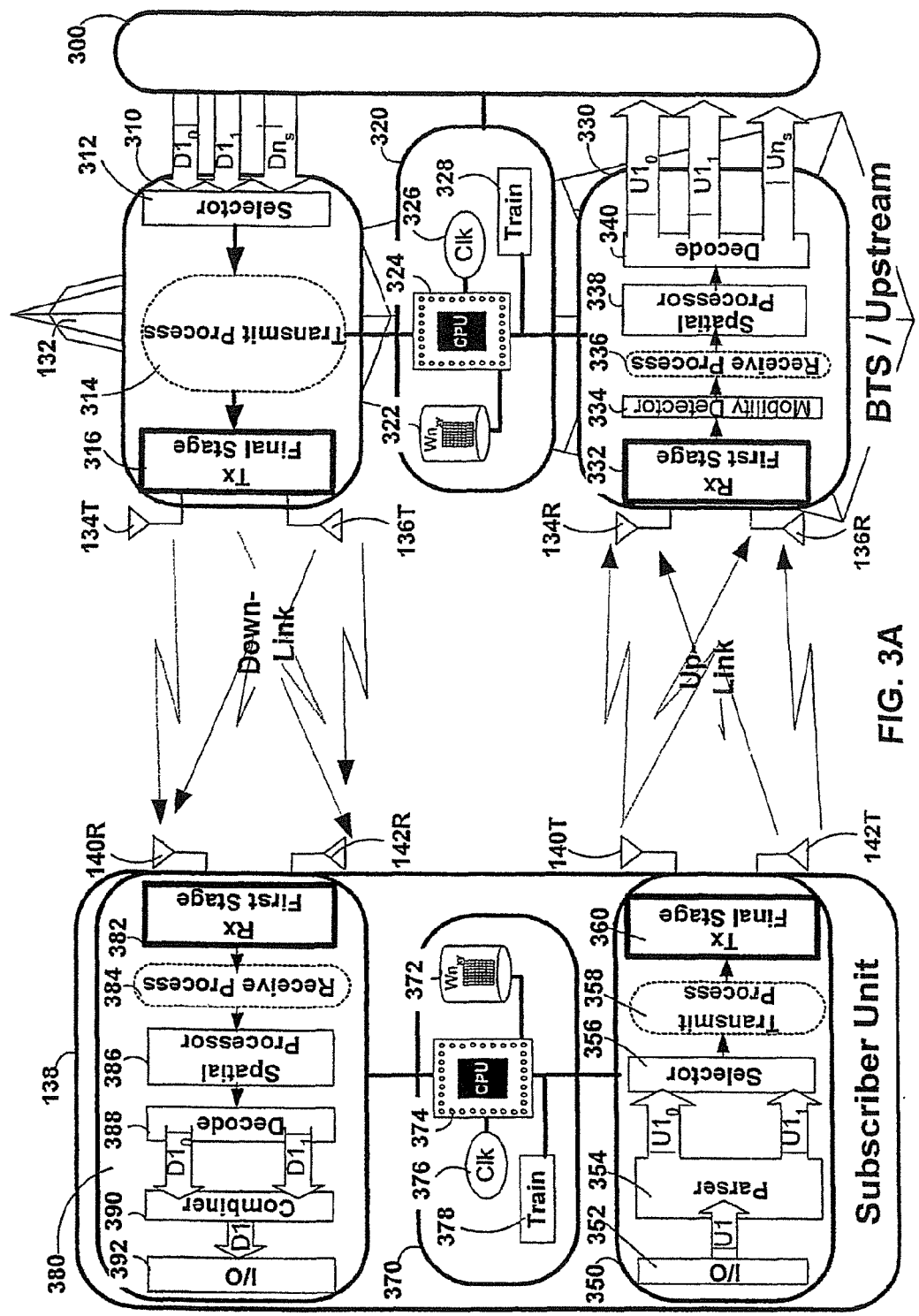
FIG. 3A shows a detailed hardware block diagram of a single base station and subscriber unit for use in the wireless cellular network shown in FIGS. 1A-B.

FIG. 3A is a detailed hardware block diagram of a subscriber unit 138 and a BTS 132. The BTS 132 includes: a multiple access spatial transmitter 310, a multiple access spatial receiver 330, a controller module 320 and upstream processes/logic 300, further details of which are provided in the accompanying FIGS. 4-5. The subscriber unit 138 includes: a multiple access spatially configured receiver 380, a multiple access spatially configured transmitter 350 and a control unit 370. The multiple access spatial transmitter 310 includes: a selector 312, a final transmission stage 316 and optionally may include transmit processes/logic 314. The final stage transmitter 316 is coupled to a spatially separate antenna array which includes antennas 134T-136T.

In operation, the subscriber datastream(s) and/or substreams thereof are provided to the selector 312 from the upstream processes/logic 300. Utilizing either in band or out of band control signals embodied in the datastream(s)/substreams themselves or separately communicated from the SM_MA processes/logic at the MSC 106 or elsewhere, the selector implements the MA protocol utilized by the wireless network. That protocol, as discussed above, may include: TDMA, FDMA, CDMA or SDMA, for example. The selector places each of the datastream(s)/substreams on the appropriate channel. Each of the datastream(s)/substreams are then passed through the optional transmit processes/logic, in which any of a number of well-known prior art signal processing techniques may be implemented to improve the quality of transmission. These techniques include, but are not limited to, diversity processing, space-time coding, and beam forming. The datastream(s)/substreams are then passed to the final transmit stage 316. Traditional mode traffic may be routed by the SM_MA processes/logic 104 to the appropriate antenna 134T-136T for transmission. If diversity processing is implemented, even traditional mode traffic may be transmitted using multiple antennas. Spatial mode traffic, i.e. the individual substreams thereof, will be routed to the appropriate one of the two antennas 134T-136T.

On the receive side, the subscriber unit SM_MA configurable receiver 380 includes: receiver first stage 382, optional receive processes/logic 384, spatial/space-time processor 386, decoder 388, combiner 390 and I/O module 392. The receiver first stage is coupled to a spatially separate antenna array, e.g. antennas 140R-142R. Utilizing in/out of band control signals, the SM_MA configurable receiver 380 of the subscriber unit 138, in the embodiment shown, may be configured for spatial/traditional mode signal reception on the requisite channel within the multiple access protocol. In the case of spatial mode communications, the antenna array, e.g. antennas 140R-142R, detect downlink composite signals derived from the spatially separate transmission of the substreams through antennas 134T-136T. These composite signals are down converted, demodulated and sampled by the receiver first stage 382. The composite signals are then passed to the receive processing module 384 and may be subject to receive side processing if implemented. From the receive processing module, the composite signals are passed to the spatial processor 386. The spatial/space-time processor via in/out band control signals is also configured to derive the appropriate number of substreams, i.e. equivalent to the number transmitted, from the BTS(s). Utilizing logic associated with space/space-time processing (see FIGS. 7A-D), that processor, in conjunction with decoder 388, generates estimated source substreams which are passed to the combiner 390. The combiner 390 via in/out band control signals is also configured to combine the substreams into an estimated subscriber datastream(s) corresponding to that transmitted from the BTS 132. The datastream(s) are passed to the I/O module for presentment/delivery as, e.g., audio, image or data. Where communications are asymmetric, the uplink may, in an embodiment of the invention, not include SM capability, leaving that capability to the downlink alone. This asymmetric capability may be implemented on either the downlink or the uplink without departing from the scope of this invention.

The uplink from the subscriber unit 138 to the BTS 132 may use the same or different hardware/firmware/processes/logic to that utilized for the downlink. In an embodiment of the invention, the uplink is traditional with no SM_MA capability. In the embodiment shown in FIG. 3A, the uplink includes both SM and MA processes/logic. The datastream(s) received by the I/O module 352 are passed to parser 354. In an embodiment of the invention, the parser is configurable to generate a traditional datastream or a variable number of substreams thereof. In another embodiment of the invention, the parser parses all datastream(s) into a fixed number of substreams. Where there are no SM uplink capabilities there is no parser. In other embodiments of the invention, the configurable parser also includes a mode detector to determine whether the datastream(s) should be split into substreams. That determination, as discussed above, may be based on any number of criteria including, but not limited to, traditional vs. spatial mode, QoS, bit rate requirement, feasibility, etc. In such an embodiment, when the mode detector determines that spatial mode transmission of the datastream is appropriate, the parser will split the datastream(s) into a plurality of substreams, the number of which may itself be configurable. These substreams are then passed to the selector 356. The selector responsive to in/out of band control signals implements the appropriate access protocol, including the placement of the datastream(s) and/or substreams onto the appropriate channel within that protocol. The datastream(s) and/or substreams thereof are then optionally passed to transmit processes/logic 358, which may implement any number of well-known prior art signal processing techniques, including the above discussed diversity methodology, to improve signal reception. The substreams and/or datastream(s) are then passed to the final transmit stage 360 where they are encoded, modulated, and up-converted for transmission on a single channel through spatially separate transmit antennas 140T-142T. Composite signals corresponding thereto are received by antennas 134R-136R of the SM_MA configurable receiver 330 of the BTS.

As discussed above, where the uplink is asymmetric, the BTS may not implement or require SM on the uplink Nevertheless, in the embodiment shown, the receiver 330 is SM_MA configurable. The receiver 330 includes a first stage receiver 332, mobility detector 334, receive processes/logic 336, spatial/space-time processor 338 and a decoder 340. The composite signals are passed by antennas 134R-136R to the first stage receiver. This is configurable to receive the communications on the appropriate channel within the MA protocol as determined by SM_MA processes/logic 104. These composite signals are down-converted/demodulated and sampled. In an embodiment of the invention, the mobility detector 334 monitors the composite signals for Doppler shift/spread. Doppler shift/spread of the composite signals correlates with the mobility or lack thereof of the subscriber unit. The absence of a Doppler shift/spread indicates that the subscriber unit is fixed. This determination on the part of the mobility detector may be used to initiate one or more of the following processes/logic: spatial reconfiguration, training/retraining of the spatial/space-time processors and/or handoff. In an embodiment of the invention in which non-blind in band training is implemented, training/retraining may include varying the training interval or duration or selection of a different training sequence. The composite signals are then passed to the optional receiver processes/logic 336. These processes/logic, as described above, may include any of a number of well-known techniques including diversity processing. The composite signals are then passed to the configurable space/space-time processor 338. Utilizing in/out of band control signals from the MSC and/or the subscriber unit, the space/space-time processor configures itself to generate a number of substreams or a single datastream(s) equivalent to those transmitted from the corresponding subscriber unit. These estimated subscriber substreams/datastream(s) are then passed to the decoder 340. The decoder decodes the symbols to their corresponding binary equivalent. The datastream(s) and/or substreams are then passed to upstream processes/logic 300.

Both the subscriber unit 138 and the BTS 132 are shown to include respectively control modules 370 and 320. These control modules implement a subset of the control processes/logic 104 required to implement the SM_MA processes, such as training of the space/space-time processors 338 and 386, etc.

Training

Training refers to the requirement that, in order to implement a space/space-time processing on the receive side of whichever link down/up is implementing SM, it is necessary that the space/space-time processor be equipped with an appropriate model of the spatial characteristics of the environment in which the signals will be passed between the subscriber unit and the associated BTS(s). Different types of training methodology may be appropriate, depending on whether the subscriber units are fixed/mobile, and if mobile, depending on the speed at which they are moving. Where a subscriber unit is fixed, training may be accomplished on installation of the unit, at setup of a call or during a call session. Where a subscriber unit is mobile, training/retraining must take place continuously or intermittently. Training for a fixed subscriber unit may take place intermittently as well, although generally at a lower frequency than that associated with a mobile subscriber unit.

Training is generally categorized as blind or non-blind. Training is non-blind when it is incorporated intermittently/continuously using in/out of band training signals, e.g. known sequences such as Walsh codes, transmitted between subscriber unit and BTS(s). Training is blind when it takes place without such signals, relying instead on non-Gaussianity, CM, FA, cyclostationarity or the spatial structure, such as the array manifold. The performance of blind methods will, of course, be sensitive to the validity of structural properties assumed. An excellent reference on the subject, which is incorporated herein by reference as if fully set forth herein, is found in: "Space-Time Processing for Wireless Communications", Arogyaswami J. Paulraj and Papadias, IEEE Signal Processing Magazine, November 1997, at pages 49-83. In an embodiment of the invention, non-blind training methods are utilized to configure the space/space-time processors. Further details on the space/space-time processor will be provided in the following FIGS. 7A-D and accompanying text.

Control module 320 includes: processor 324, clock 326, training module 328 and memory 322 for the storage of weights/parameters for the space/space-time processor 338. Control module 370 in the subscriber unit 138 includes: processor 374, clock 376, training module 378 and memory 372 for the storage of weights/parameters for the space/space-time processor 386. In the embodiment of the invention shown in FIG. 3, the CPU implements the training portion of the control processes/logic 104. In alternate embodiments of the invention, the CPU may be utilized to implement other of the control processes/logic. In still other embodiments of the invention, the training portion of the control processes/logic is handled upstream at such locations as the MSC or the CO.

In an embodiment of the invention which implements non-blind training, the mobility detector 334 signals the CPU 324 when a subscriber unit exhibits minimal Doppler shift/spread, e.g. is fixed. In an embodiment of the invention, the CPU 324 directs the transmit module 310 to signal subscriber unit 138 at call setup, or at the start of a call session, to use stored parameters from an earlier training session or to process a setup training session transmitted by the BTS. In another embodiment of the invention, the CPU may reduce the frequency or duration of a training sequence responsive to a determination that the Doppler shift/spread is minimal.

On the BTS side, the training module 328 inserts a known training sequence, e.g. Walsh code, into the downlink transmissions and these are processed by the CPU 374 of the subscriber unit and weights derived therefrom which allow the space/space-time processor 386 to separate the training sequence spatially broadcast from the antenna array of the BTS(s). Similarly, where the uplink implements SM, the subscriber unit training module 378 inserts a known training sequence into the uplink transmissions as well. These are in turn processed by the CPU 324 and appropriate weights derived therefrom stored in the spatial processor 338 for use with the uplink communications during the call/data-transfer session. Whenever training/re-training takes place, weights are recalculated and stored for use in subsequent SM communications.

Where the mobility detector 334 determines that the subscriber unit is mobile, an alternate non-blind training methodology may be implemented. In an embodiment of the invention, that methodology shown in FIG. 8 involves inserting into in/out of band downlink communications the known training sequence. This allows updating of the spatial parameters/weights by the corresponding subscriber unit and its space/space-time processor. This capability allows spatial multiplexing to be implemented in both a mobile and a fixed environment. In still another embodiment of the invention, the duration/frequency at which the training intervals are inserted into the up/down link communications may be varied depending on the mobility of the subscriber unit.

In still another embodiment of the invention, blind training methods may be implemented. These unsupervised methods do not need training signals because they exploit the inherent structure of the communication signals.

As will be obvious to those skilled in the art, the processes/logic 104 and the associated modules/blocks discussed above and in the following disclosure may be implemented in hardware, software, firmware or combinations thereof without departing from the teachings of this invention. They may be implemented on a single chip, such as a digital signal processor (DSP), or application specific integrated circuits (ASIC). On the upstream side (i.e., BTS, MSC, CO, etc.), the SM_MA processes/logic 104 may physically reside in any one or all upstream units. The processes/logic may be implemented using master-slave control relationship between CO/MSC and BTS or peer-to-peer control relationship between BTSs alone, or distributed control between CO/MSC and BTS.

Figure 3B:
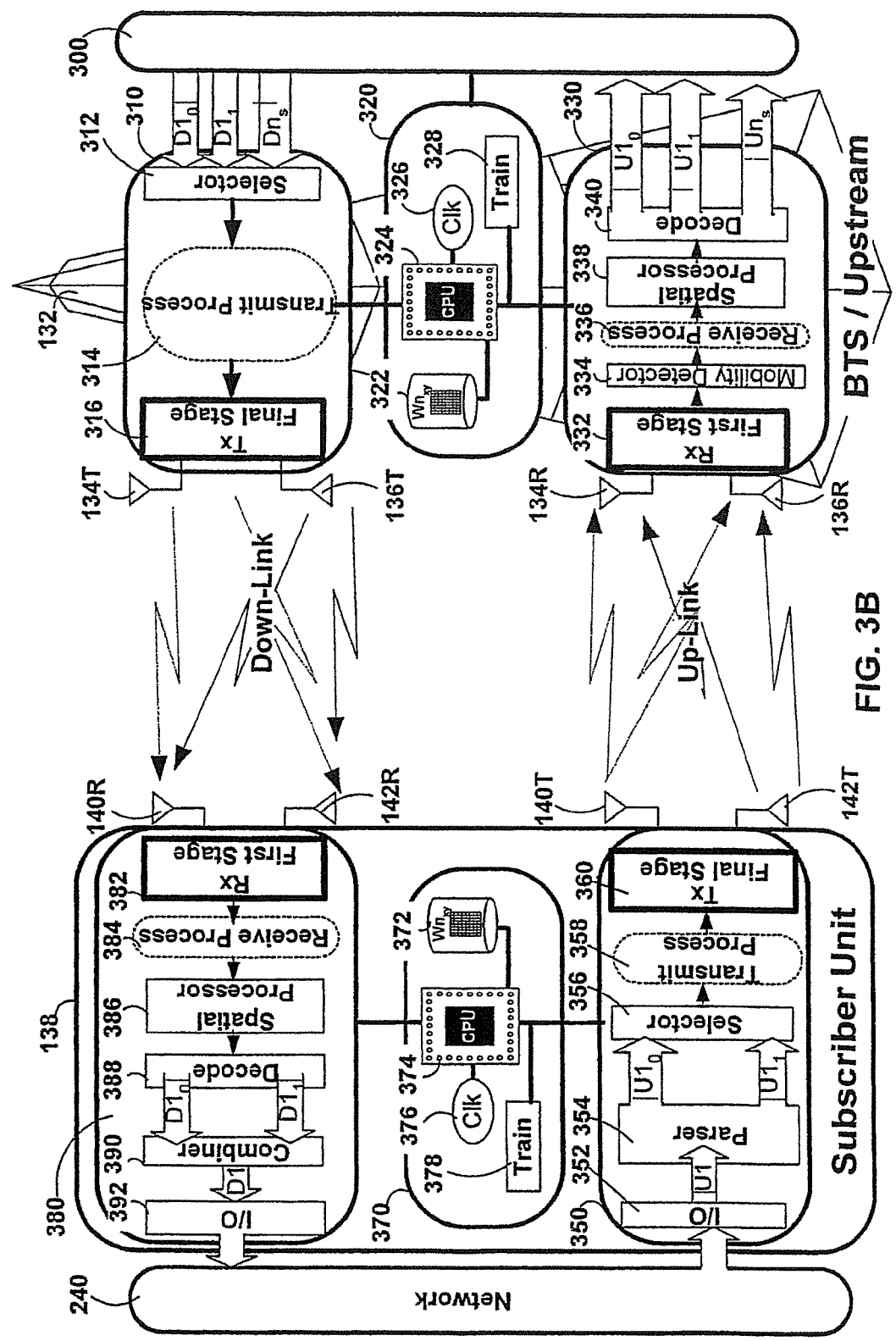
FIG. 3B shows a detailed hardware block diagram of a single base station and subscriber unit as in FIG. 3A, wherein the subscriber unit interfaces with a network.

FIG. 3B illustrates a detailed hardware block diagram of a subscriber unit 138 and a BTS 132 similar to the system described in FIG. 3A. The difference in this embodiment is that the subscriber unit is connected to a network 240 and thus the I/O modules 352 and 392 in the transmitter 350 and receiver 380 respectively are coupled to the network 240. Of course, the subscriber unit could readily communicate with any type of network or network device.

FIGS. 4A-F show an embodiment of the BTS/MSC/CO side of the processes/logic 104_for implementing SM_MA. FIGS. 4A-B and 4D-E show a partial handoff.

Figure 4A:
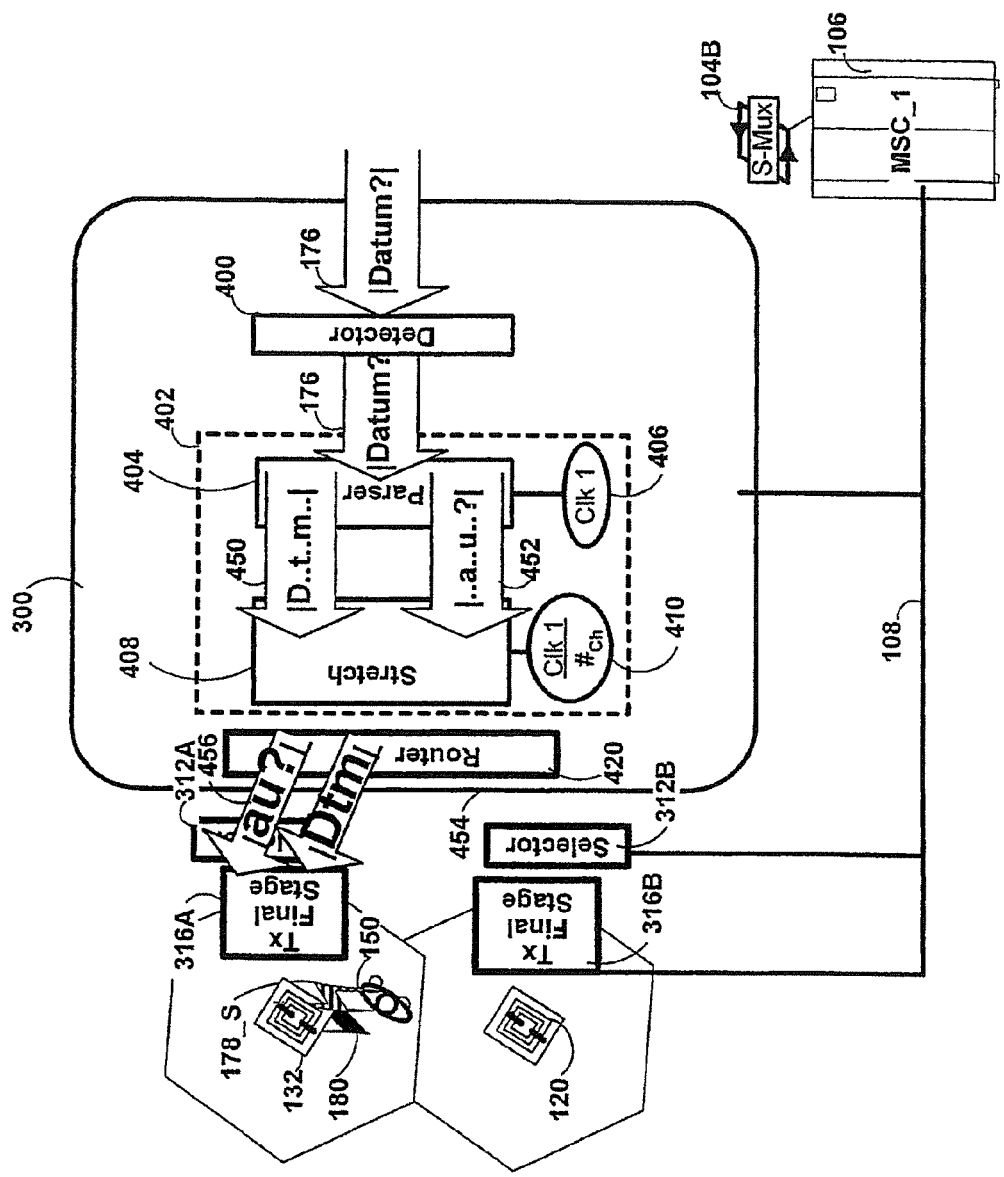
FIGS. 4A-J show detailed hardware block diagrams of the multiple access hardware for controlling the transmission of subscriber datastream(s) from one or more of the base stations within the wireless network.

FIG. 4A shows BTSs 120 and 132 coupled to MSC 106 and to the associated upstream processes/logic 300 of processes/logic 104.sub.13. The BTS 120 is shown with the associated final transmission stage 316B and the selector 312B. The BTS 132 is shown coupled to the final transmission stage 316A and to the selector 312A. The upstream processes/logic 300 include a detector 400, parser unit 402 and router 420. The parser unit 402 includes a parser module 404 and clock 406 as well as a stretcher 408 and its clock 410. The MSC 106 is shown coupled via its data/control line 108 to each of the above-discussed modules.

As will be obvious to those skilled in the art, the coupling between the MSC and each of the above-discussed hardware and software modules represents a master/slave embodiment of the current invention. In alternate embodiments of the invention, peer-to-peer control methodology may be utilized instead. In still another embodiment of the invention, distributed control methodology may be implemented, e.g. each of the above-discussed modules may contain additional intelligence, sufficient to signal downstream/upstream modules as to the appropriate configuration to adopt, responsive to the datastream(s)/substreams being processed, the channel and access methodology to be utilized.

Datastream(s) 176 is delivered to mode detector 400. In this embodiment of the invention, a mode detection is utilized. As discussed above, this module provides the capability of distinguishing datastream(s). Datastream(s) might, as discussed, be categorized as traditional vs. spatial, or on the basis of QoS or bit rate requirement. In the embodiment shown, the detector 400 determines that the datastream(s) 176 is destined for spatial mode processing. Responsive to that determination, the parser 404 is configured to parse the datastream(s) 176 into a plurality of the substreams. In the example shown, the two substreams 450-452 are generated by the parser. The substreams each contain a portion of the actual data from the original datastream(s). The function of the stretcher 408, to which the substreams are passed, is to effectively lower the baud rate at which the substreams are transmitted. Figuratively, this is accomplished by clocks 406 and 410 which are coupled to respectively the parser and the stretcher. Clock 410 operates at a rate which is a fraction of the rate of clock 406. The specific fraction is determined by the number of substreams generated by the parser 404. For example, if parser 404 generates from a single datastream(s) two substreams, then each of the substreams will be transmitted at a baud rate which is effectively ½ that of the original datastream(s). The stretched substreams are then passed to the router 420. In an alternate embodiment of the invention, the substreams need not be stretched, rather buffered and transmitted at the same baud rate in bursts, if the channel will support the resultant communication rate. The router operating, in the embodiment shown, under the control of the MSC 106 sends the selected substreams 454 and 456 to a single BTS 132 for single-base spatial transmission from each of the spatially separate antenna of that BTS. Those substreams passed through the selector 312 are injected on an appropriate channel within the multiple access protocol. The channel determination is made by the SM_MA processes/logic 104 that portion of which may be localized in a master/slave control implementation at the MSC. The substreams are then passed to the final transmission stage 316A for transmission to the subscriber unit 150 (see FIG. 6).

Figure 4B:
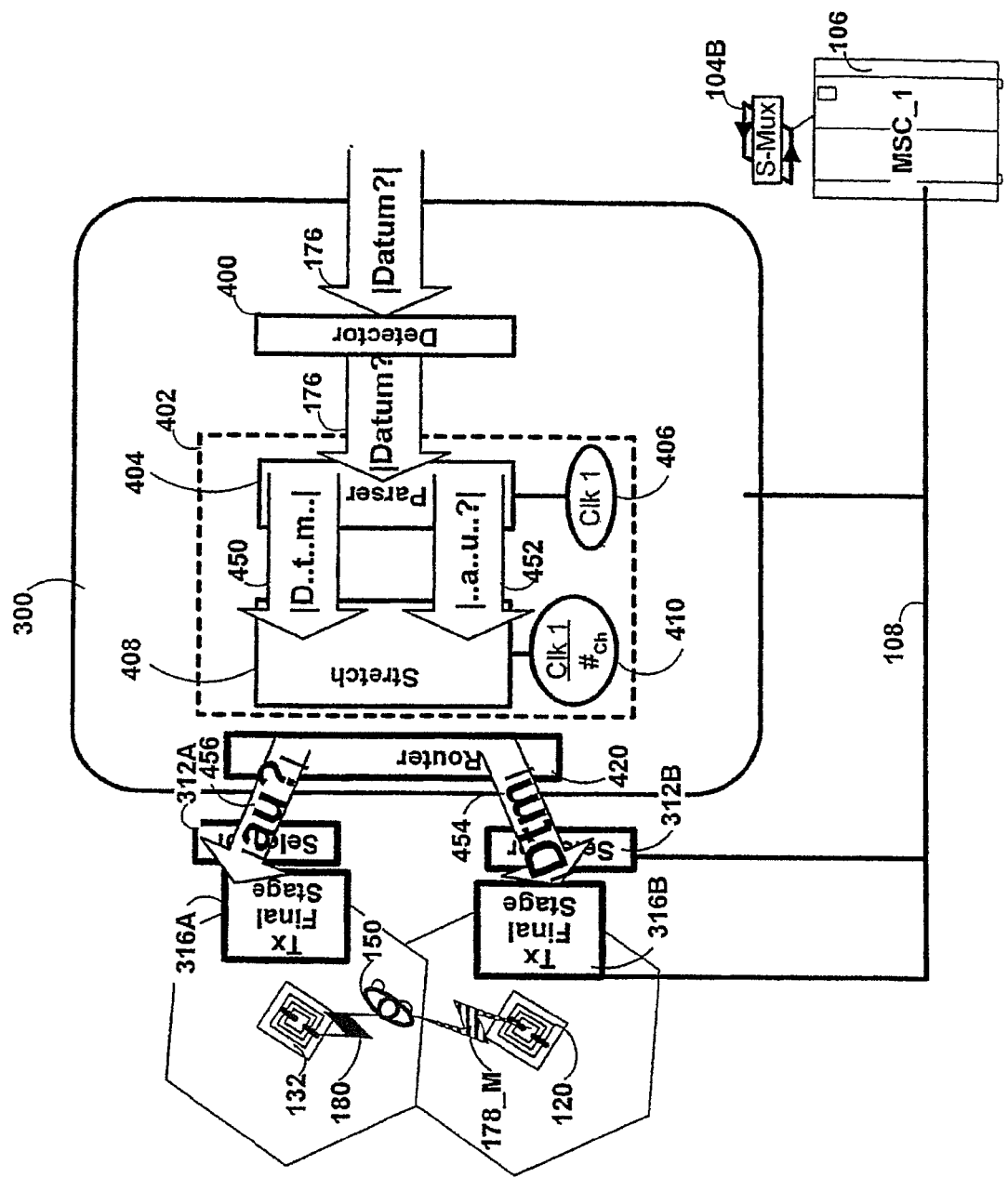

FIG. 4B shows hardware/software modules identical to those discussed above in connection with FIG. 4A. The router 420, responsive to a signal from, for example, the MSC 106 has re-routed one of the substreams to BTS 120. That substream 454 is passed to the selector 312B associated with BTS 120. The corresponding substream 456 is presented to selector 312A associated with BTS 132. Under the control of the MSC, each selector is directed to place the substreams on the same MA channel on each of the base stations. The final transmission stages 316A-B of each BTS places the substreams on one antenna of its spatially separate antenna array for transmission to the subscriber 150. The subscriber 150 is in a location in which the signals from base stations 120 and 132 overlap. The composite signals 180 and 178_M resulting from the transmission of spatially distinct subscriber substreams are received with spatially separable signatures by the subscriber unit 150 which, as discussed above, is equipped with spatially separate antennas.

The determination to move from a single-base spatial transmission (see FIG. 4A) to multi-base spatial transmission, as shown in FIG. 4B, may be made as a result of any one of the number of distinct determination methods. In the first of these methods, an evaluator portion of either the space/space-time processor 386 or the decoder 388 of the subscriber unit 138 determines that an incoming composite signal cannot be spatially separated into the required number of substreams. In response to this determination, the subscriber unit signals the BTS that a change of spatial configuration is required. This signal is processed by the BTS and may be passed to the MSC 106. In response, the MSC directs the router and selected BTSs, e.g. BTSs 120 and 132, to prepare for and transmit the substreams on an assigned channel. This transition from single-base to multi-base spatial transmission is handled transparently to the subscriber, in order to maintain a consistent QoS throughout the transmission by increasing the spatial separation of the transmitted substreams.

Figure 4C:
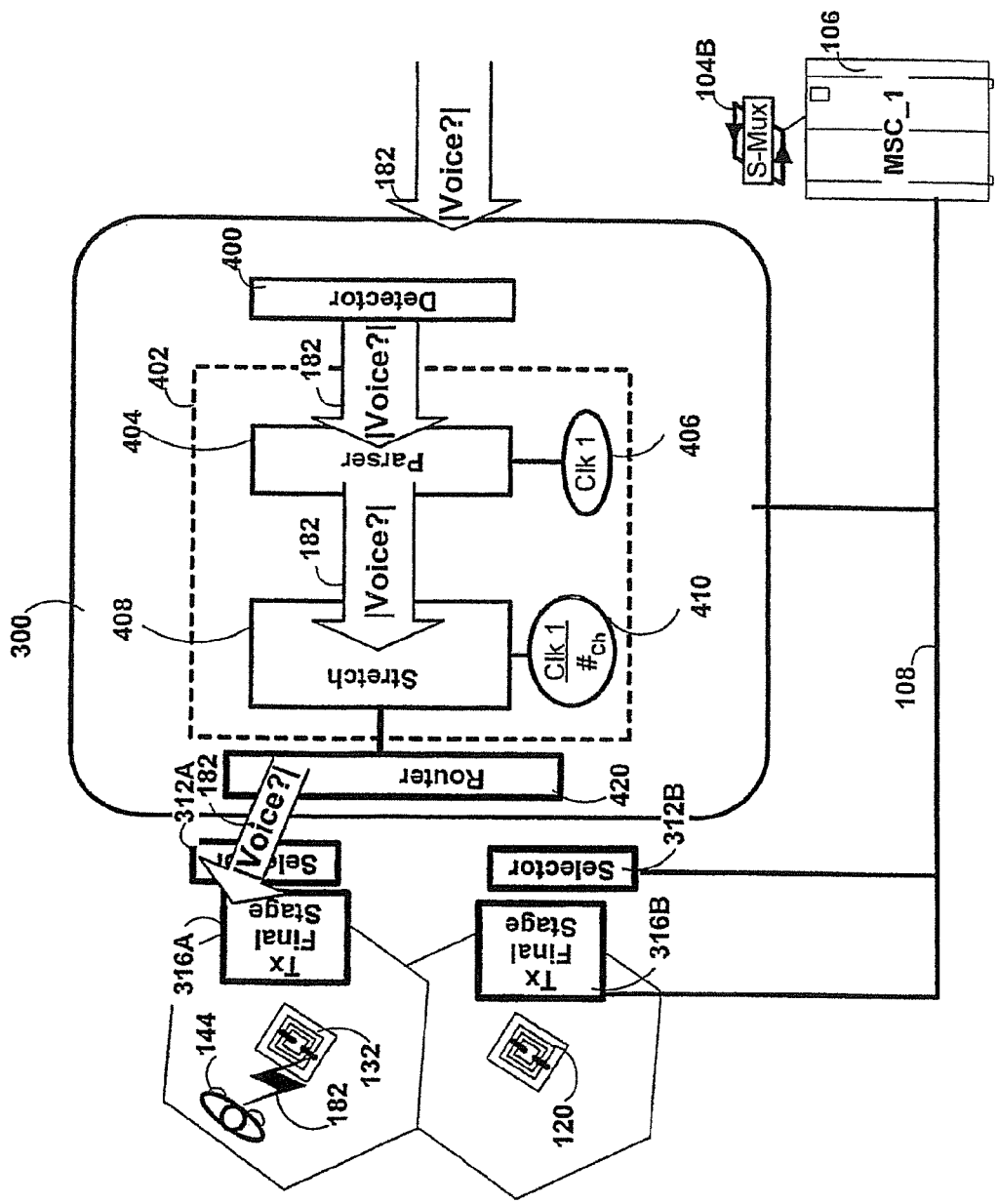

FIG. 4C shows an alternate embodiment of the invention that includes the capability of mode detecting between, for example, traditional and spatial mode datastreams. Datastream(s) 182 is presented to detector 400 via data/control line 108. The datastream(s) might, for example, be a traditional subscriber telephone call or a datastream which has both a low bit rate and QoS requirement. To minimize resources, it may be advantageous for the parser unit 402 to be configurable, so as not to subject all incoming datastream(s) to parsing or, if parsed, so as not to parse into a fixed number of substreams. In the embodiment shown, such capability is implemented. The detector determines that the datastream is traditional mode. That determination may result in the parser avoiding the parsing of the datastream 182. The datastream(s) 182 is passed unparsed to the router 420. The router 420 passes the datastream(s) 182 to the selector 312A of the associated BTS 132. Under the control of the MSC the selector and the final transmissions stage 316A inject the datastream(s) 182 on the appropriate channel of the appropriate multiple access protocol and transmit it via a selected one of the antennas, within the array from which it is received, by subscriber unit 144. That subscriber unit may be a traditional mobile phone lacking any spatial transmission characteristics. Alternately, the subscriber unit may be spatially configurable as well (see FIG. 2A). In this latter case, BTS 132 injects a control signal to the spatially configurable subscriber unit 144 and, in particular, to the configurable space/space-time processor thereof, indicating that the incoming composite signals are to be treated as a single datastream(s). As will be obvious to those skilled in the art, traditional mode datastreams including, for example, traditional voice telephone calls, may be subject to SM.

As will be obvious to those skilled in the art, each of the above-discussed datastream(s) 178, 176, 182 may include multiple subscriber sessions, time-division multiplexed for example. In this case, all the above-mentioned methodology may be practiced successively on each of the subscriber sessions of a single datastream.

Figure 4D:
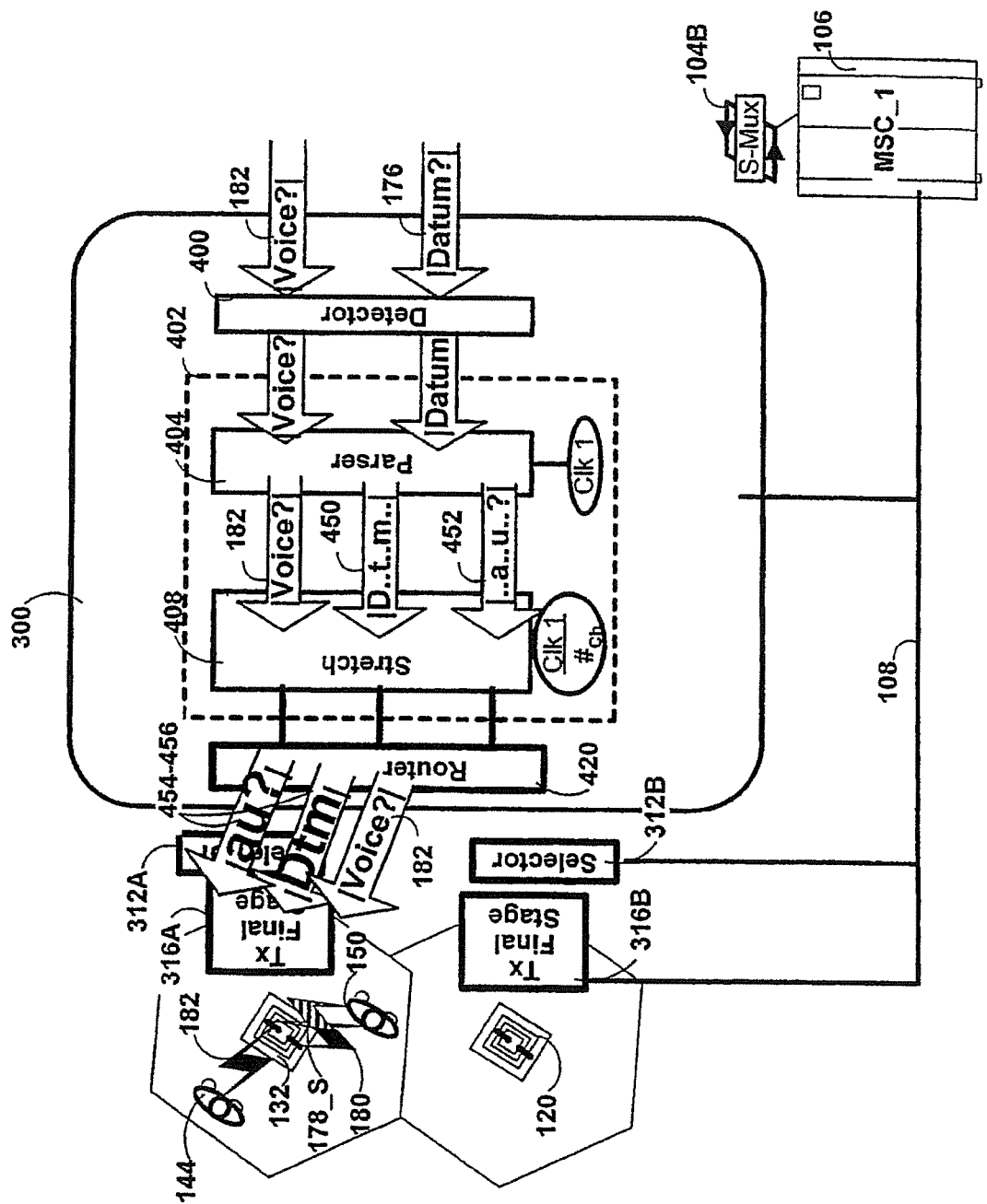

FIG. 4D shows multiple subscriber datastream(s) presented to the detector 400. Specifically datastream(s) 176 and 182 are shown. The first of these datastream(s) is destined for spatial treatment and the second of these datastream(s) 182 is destined for non-spatial treatment. This determination is made by the mode detector 400 based on criteria including, but not limited to, those discussed above. The parsing unit 402 is, in this embodiment of the invention, configurable to concurrently handle multiple subscriber sessions. Upon receipt of control information received either directly from the detector 400 or indirectly from the MSC 106, the parsing module 402 performs the following concurrent operations. The traditional mode datastream(s) 182 is left unparsed and passed directly to the router 420. The spatial mode datastream(s) 176 is parsed by parser 404 into substreams 450-452. These substreams are stretched in stretcher 408, as discussed above, and passed to router 420. The router 420, operating under the control of the MSC, for example, directs each of the datastream(s) and substreams to a single BTS 132 and specifically the associated selector 312A of that BTS.

These substreams generated by the parser are labeled 450-452. The substreams passed by the router are labeled 454-456. This change in reference number is meant to indicate that the initial parsing operation may be accompanied by a lowering of the bit rate or stretching of the clock on which these substreams are transmitted. As will be obvious to those skilled in the art, an alternate methodology for implementing the invention would be to maintain the same the bit rate, provided it was compatible with the bandwidth of the wireless channel on which the transmission was to take place, and to buffer the data accordingly for transmission in bursts, along with other similarly processed datastream(s)/substreams. Under the direction of the MSC, for example, the selector 312A and final transmission stage 316A of BTS 132 transmit the substreams 454-456 on a common channel and, depending on the access methodology, may transmit the datastream(s) 182 on the same or another channel. Signal 182 is transmitted from an antenna of BTS 132 to subscriber unit 144. The individual substreams and the associated signals 180, 178_S of the spatial mode datastream(s) 176 are transmitted to the subscriber unit 150.

Figure 4E:
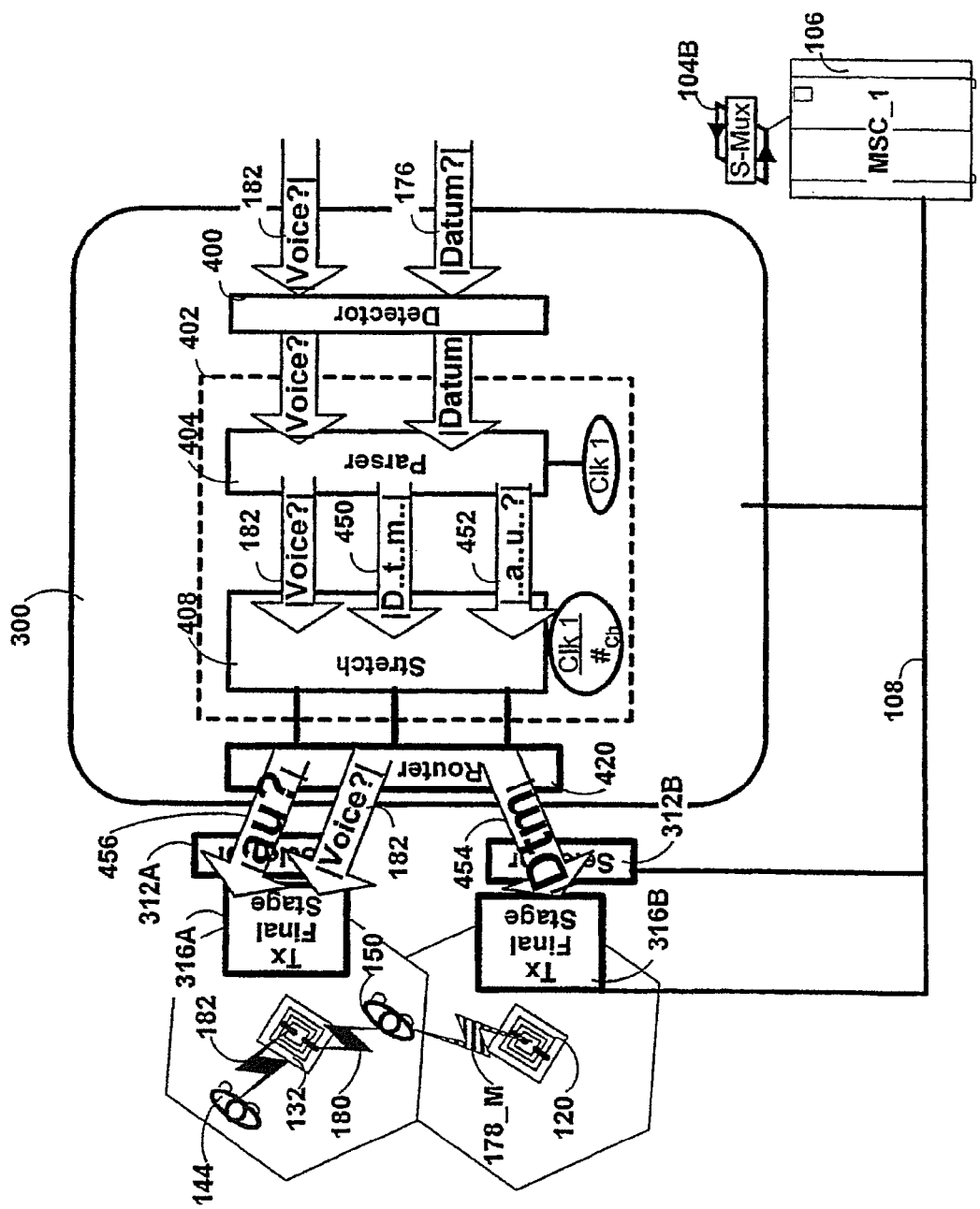

FIG. 4E shows an embodiment of the invention identical to that described and discussed above in connection with FIG. 4D. Router 420 re-routes one of the substreams 454-456 of the spatially processed datastream(s) 176 to form a multi-base spatial transmission configuration. That determination to re-route, as discussed above, may originate either from signals received from the corresponding one of the subscriber units which is unable to spatially separate the substreams or alternately may result from a determination by the BTS initially implementing single-base transmission that the bit error rate (BER) is unacceptably high. In this example, subscriber unit 144 continues to receive composite datastream(s) 182 from an antenna on BTS 132. The composite signals received by subscriber 150 now, however, originate from a multi-base configuration. The substream 454 has been re-routed by router 420 to BTS 120, so the composite signals 180, 178_M originate from BTSs 132,120, respectively.

As will be obvious to those skilled in the art of the reference, in single or a multi-base spatial transmission, discussion to a substream been transmitted from a single antenna, should not be interpreted as a limitation on the teachings of this invention. A single substream in single or multi-base configuration may be transmitted from more than one antenna, if diversity or beam forming transmit processes are implemented in addition to spatial multiplexing.

FIGS. 4-J show an alternate embodiment of the invention in which the router, as described and discussed above in connection with FIGS. 4A-E, is positioned upstream of the parsing unit rather than downstream of that unit. Consequently, each of the base stations has associated with it a corresponding parsing unit. FIGS. 4F-G and FIGS. 4I-J show a partial handoff.

Figure 4F:
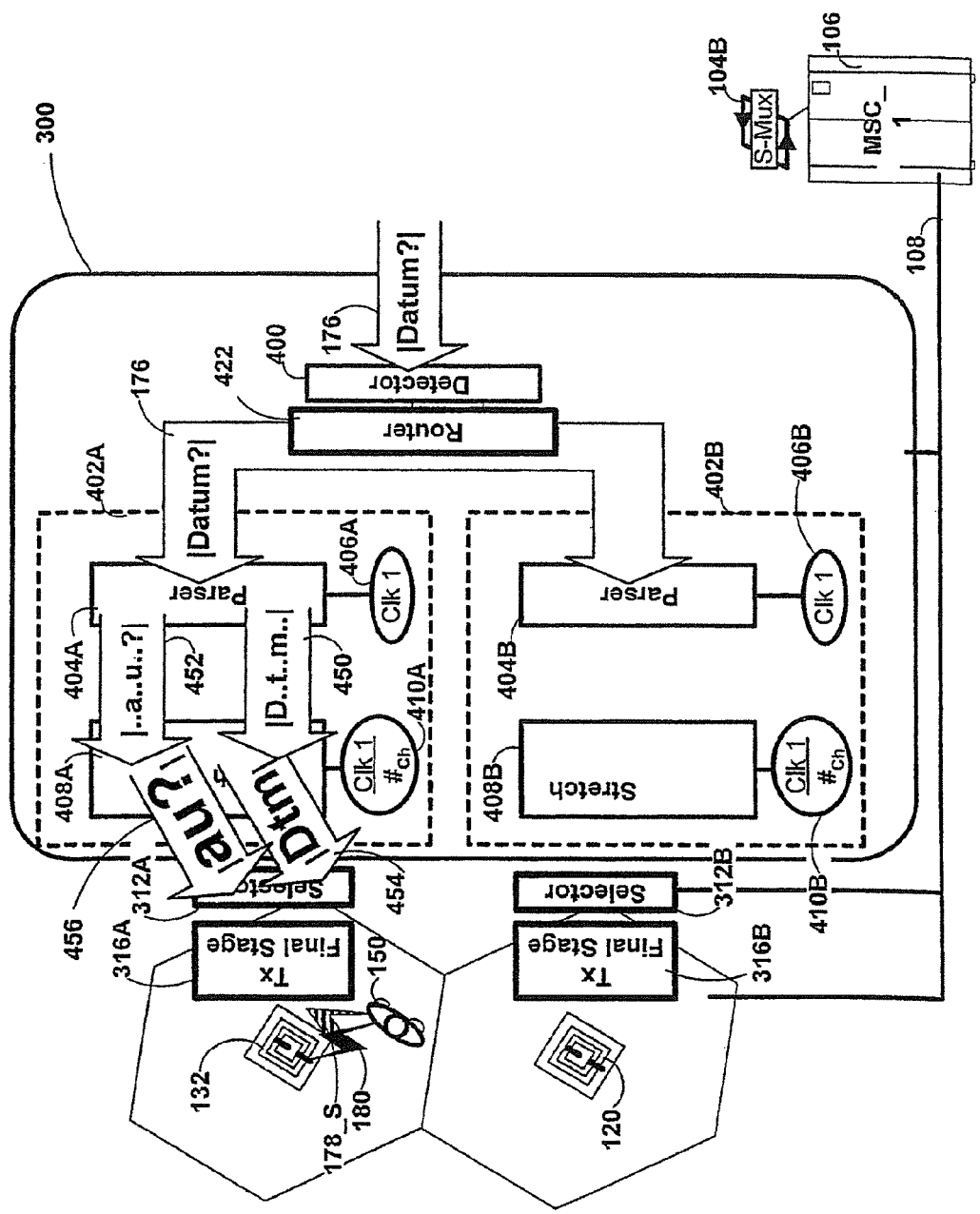

FIG. 4F shows MSC 106, BTSs 120 and 132 and the upstream processes/logic 300. Each of the base stations 120 and 132 includes selectors and final transmission stages. Within the upstream processes/logic 300, the detector 400 communicates directly to the router 422. The router, in turn, communicates directly with the parsing units 402A-B associated with BTSs 132 and 120, respectively. Single-base spatial processing of subscriber datastream(s) 176 is shown. The subscriber datastream(s) 176 is received by the detector 400. The detector determines that the mode of the datastream(s) is spatial and that information is passed to the router 422. The router routes the datastream(s) 176 to the appropriate parsing unit 402A. The parsing module 404A of that unit parses the datastream(s) into substreams, e.g. substreams 450-452. Those substreams are passed to stretcher 408A which is coupled to selector 312A. The selector places both the stretched substreams 454-456 on the appropriate channel of the selected MA protocol. Those substreams are transmitted by the final transmit stage 316A of the BTS 132. The signals 178_S and 180 are transmitted to subscriber unit 150, along with the control information necessary for that subscriber unit to properly process the incoming communication.

Figure 4G:
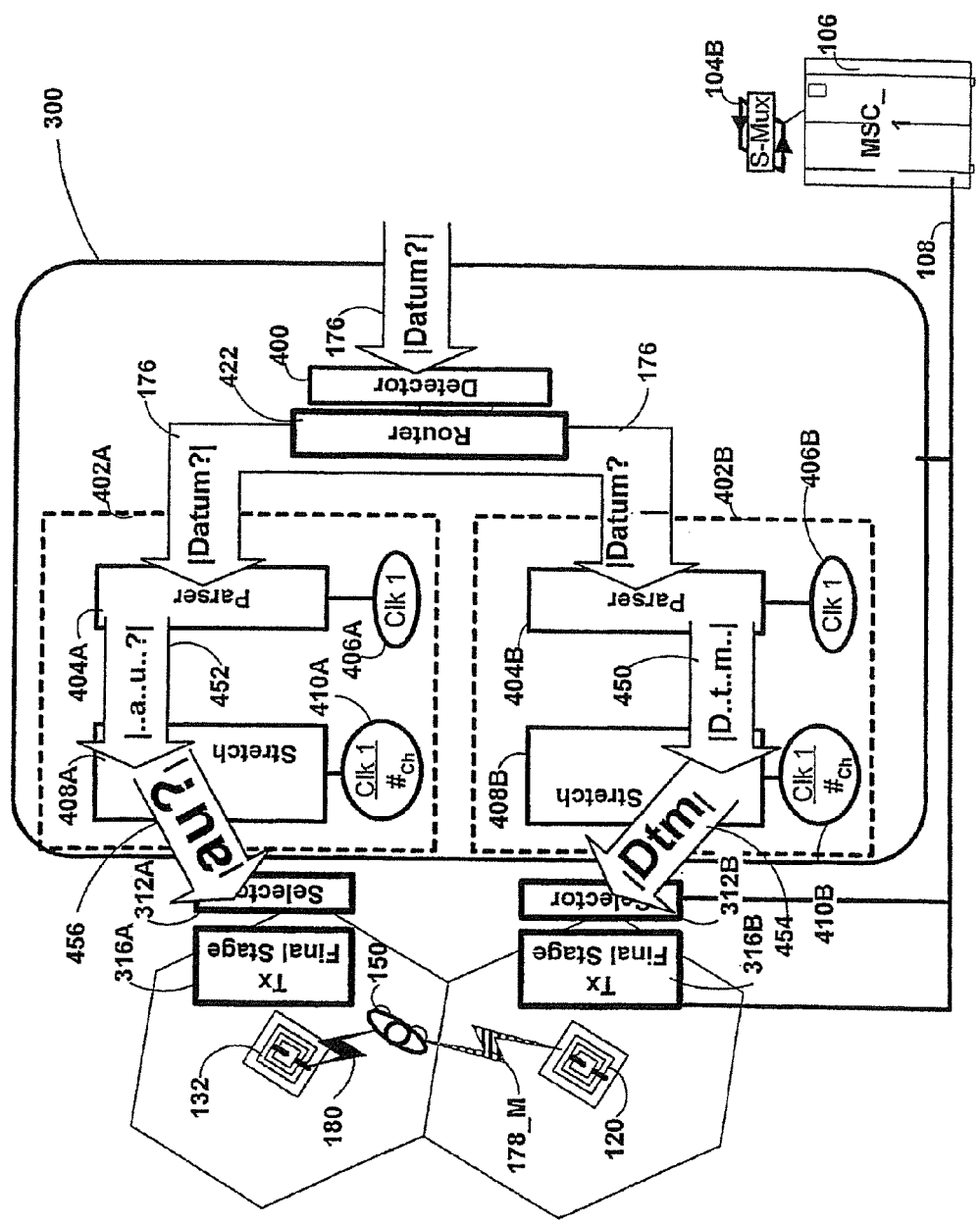

FIG. 4G shows a multi-base implementation of the configuration described and discussed above in connection with FIG. 4F. The detector 400 determines that the datastream(s) 454-456 require spatial processing. Additionally, multi-base transmission is determined to be necessary based, for example, on a subscriber unit signal or on the BER detected by a BTS. The router 422, responsive to that determination, routes the datastream to parsing units 402A-B. Each of the parsing modules 404A-B is presented information, not only that the datastream(s) needs to be parsed, but also which substreams are to be discarded at each parsing unit in order to implement a multi-base spatial transmission. In an embodiment of the invention, those in control instructions are generated by the MSC 106. The parsing module 404A generates substream 452. The parsing module 404B generates substream 450. Collectively, substreams 450-452 contain all the information from the original datastream(s) 176 from which they were parsed. The selected substreams are passed to the corresponding stretching modules 408A-B. These stretching modules in turn pass the substreams with a reduced bit rate or in bursts as substreams 456-454 to the corresponding selectors 312A-B of the associated BTSs 132 and 120. The substreams are placed on the same channels of the multiple access protocol implemented by each BTS. These substreams are transmitted by the corresponding final transmissions stages 316A-B. Signal 180 corresponding to substream 456 is transmitted by at least an antenna on BTS 132 to subscriber unit 150. Signal 178_M corresponding to substream 454 is transmitted by at least an antenna of BTS 120 to subscriber unit 150. The inclusion of both single-base and multi-base spatial transmission capabilities in the system allows consistent QoS to be delivered to the subscribers.

Figure 4H:
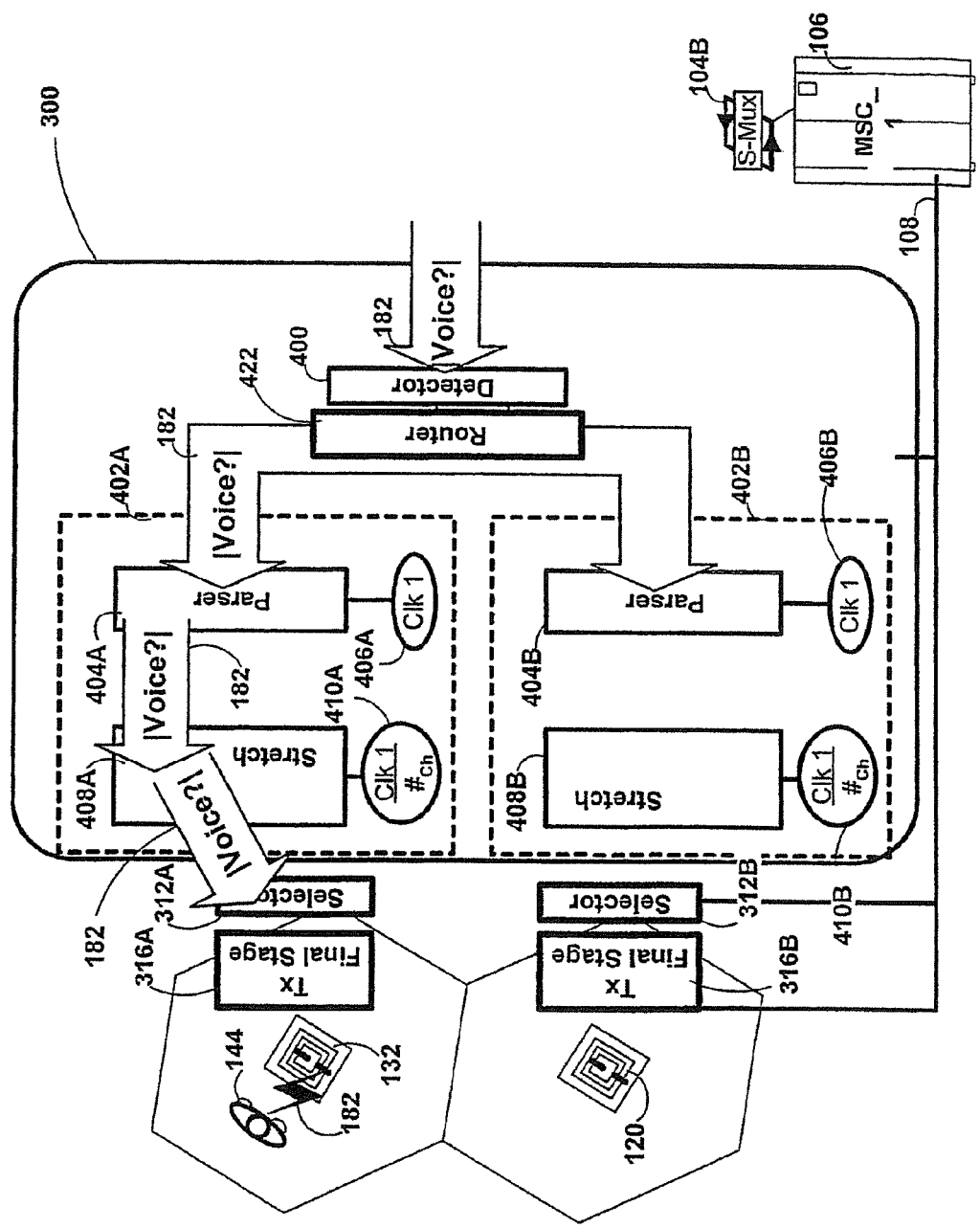

FIG. 4H shows an implementation of the current invention in which the detector 400 includes the capability of distinguishing the mode of the datastream(s), e.g. traditional mode and spatial mode. The detector 400, upon determining that datastream(s) 182 can be processed in traditional mode, passes that information to the router 422. The router passes the datastream(s) 182 to the appropriate parsing unit 402. The parser unit 402A and specifically parser module 404A thereof avoids parsing the datastream(s) and passes it to the corresponding selector 312A associated with BTS 132. In the manner described and discussed above, the channel and antenna on which that datastream(s) is to be transmitted from BTS 132 is determined by the processes/logic 104, e.g. at the MSC. The associated signal 182 is passed from the BTS to the subscriber unit 144.

Figure 4I:
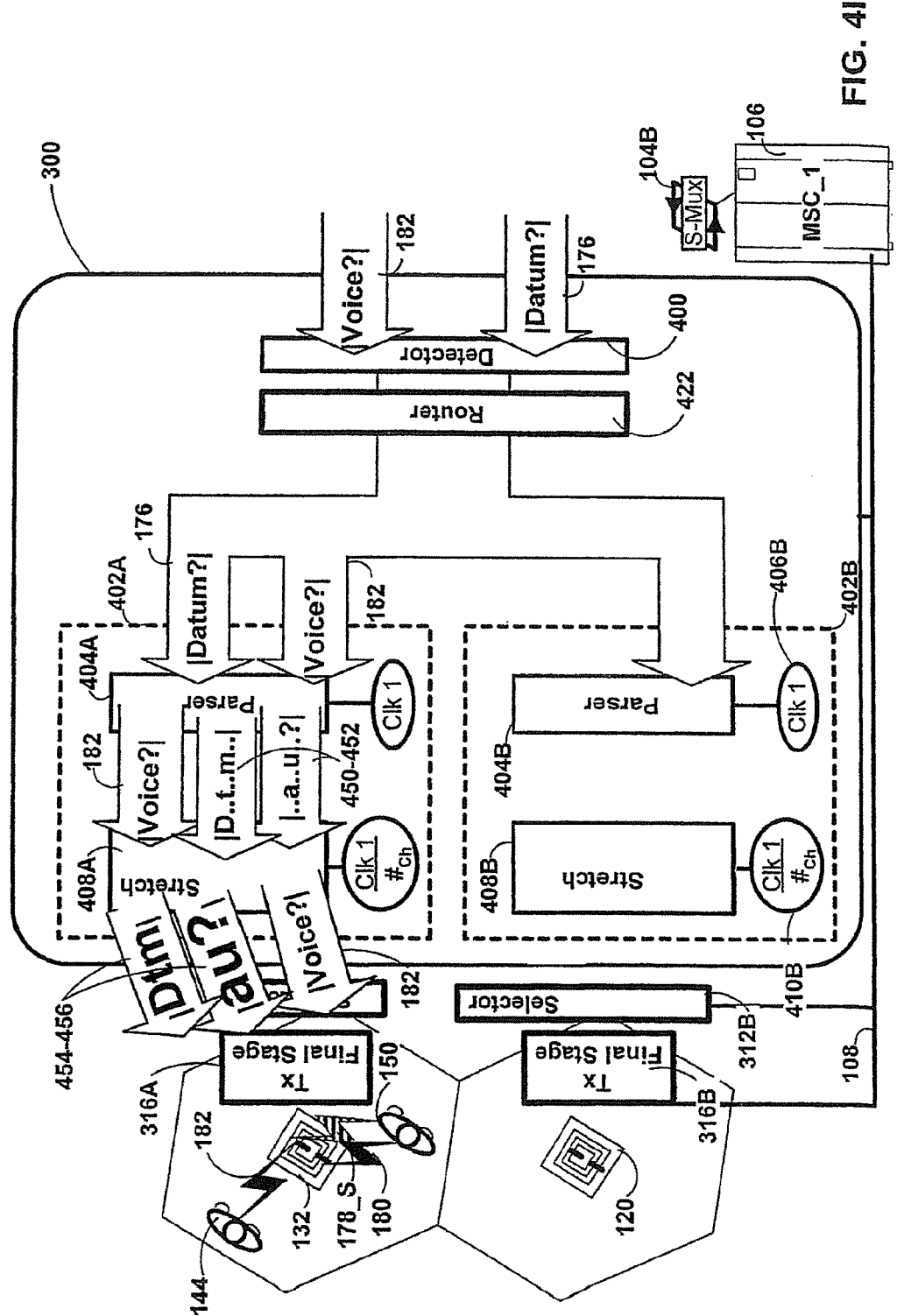

FIG. 4I shows the introduction of multiple subscriber datastream(s), i.e. datastream(s) 176 and 182 into the embodiment described and discussed above in connection with FIGS. 4F-H. The detector 400 determines that datastream(s) 182 may be processed in the traditional mode while datastream(s) 176 may be processed in the spatial mode. In this example, both the datastream(s) are routed by router 422 to a single BTS for, respectively, non-spatial and spatial transmission. Stretched datastream(s) 454-456 derived from substreams 450-452 of datastream(s) 176 are presented to the selector associated with BTS 132. Signals 178_S and 180 are transmitted to subscriber unit 150 on the same channel of the MA protocol implemented by the BTS. Traditional mode datastream(s) may be transmitted on the same or another channel.

Figure 4J:
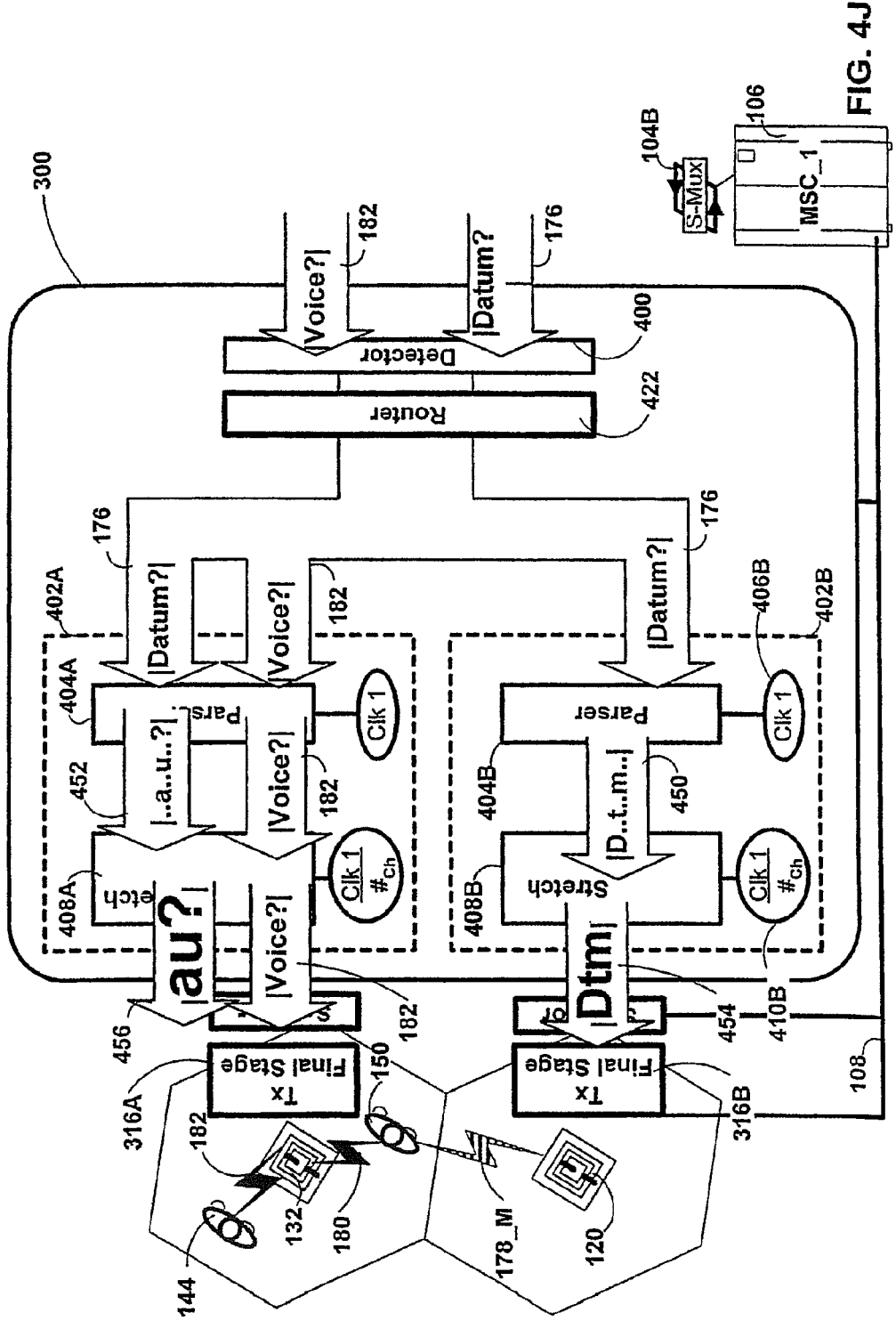

FIG. 4J shows a multi-base spatial transmission of the datastream(s) 176 discussed above in connection with FIG. 4I. A change from single to multi-base transmission is initiated by the processes/logic 104_in response to, for example, a degradation in the bit error rate or to signals from subscriber unit 150 which indicate that a change in spatial configuration is required. This might include changing the antenna selection on the array of a single BTS. The selection might involve a reduction/increase in the number of transmitting antennas. Alternately, in the example shown, a partial handoff is implemented. To implement the partial handoff, router 422 routes the datastream(s) 176 to both parsing units 402A-B. Control information, indicating which of the substreams generated by the respective parsing unit is to be passed on to the associated BTS, may also be generated. Responsive to that information, the parsing modules 404A-B each generate only one of the substreams which can be generated from the datastream(s) 176. Each selected substream is stretched by the corresponding stretcher and passed to the corresponding BTS. BTS 132 continues to transmit the traditional mode datastream(s) 182 and the signal corresponding thereto to subscriber unit 144. BTS 132 transmits one of the stretched substreams 456 in the form of signal 180 to subscriber unit 150. The other of the substreams 454 is passed to the subscriber unit 150 as signal 178_M from the BTS 120.

As will be obvious to those skilled in the art, the above-mentioned arrangements of detector, router and parsing units represent only some of the possible configurations of these modules/logic which may be utilized to implement the current invention. In an embodiment of the invention, the wireless network may not support both traditional and spatial transmission together. In that embodiment, the detector may not be required, since all datastream(s) will be handled by spatially transmitting them. In still another embodiment of the invention, multi-base operation may not be implemented, allowing only for single-base SM. In still another embodiment of the invention, the routing may be accomplished by a single BTS which uses in/out of band channels to wirelessly relay one or more substreams to other BTSs for re-transmissions on the assigned channel.

Figure 5A:
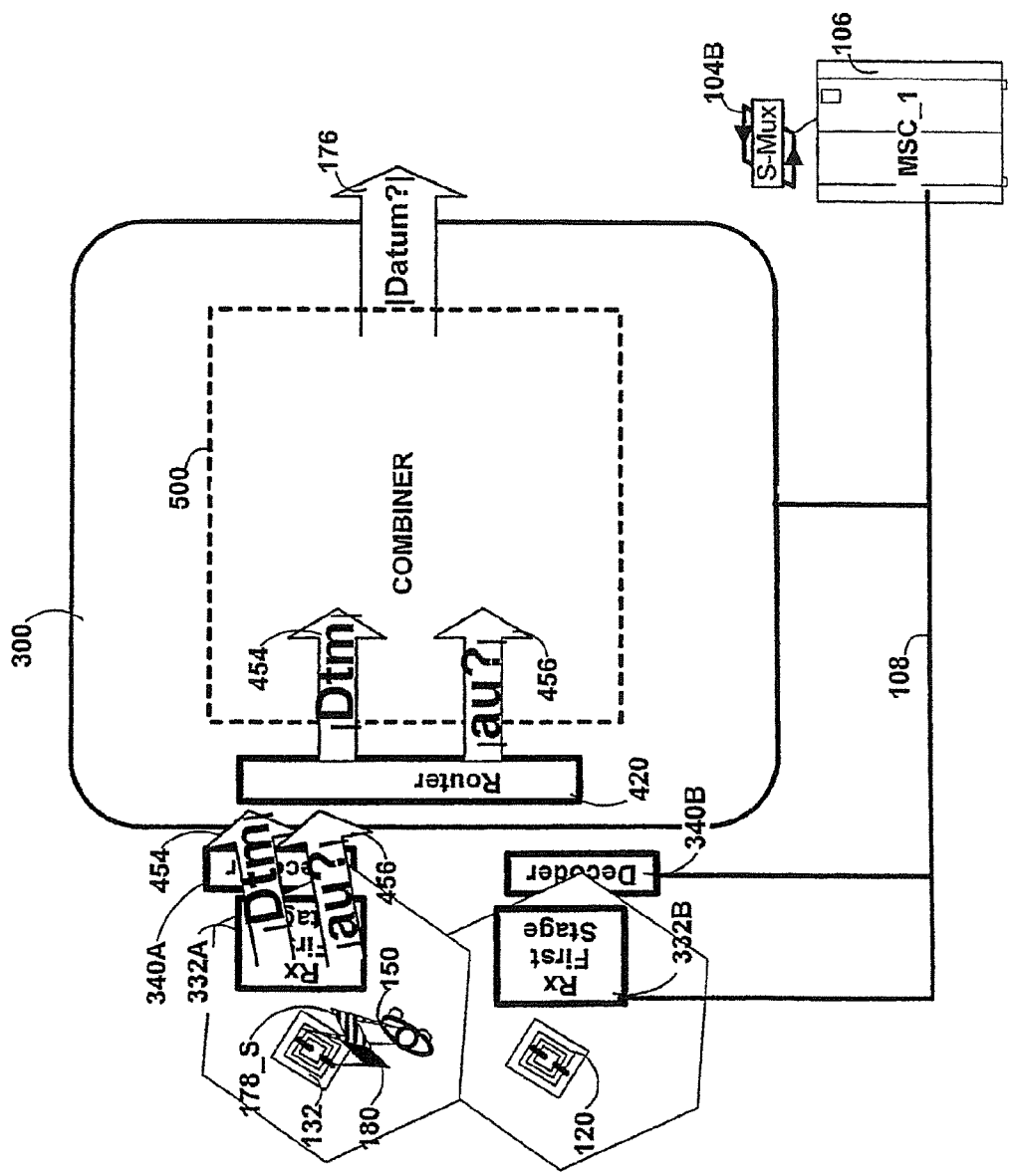
FIGS. 5A-B show detailed hardware block diagrams of the hardware associated with the receipt of multiple subscriber datastream(s) at the base stations of the wireless network of the current invention.
Figure 5B:
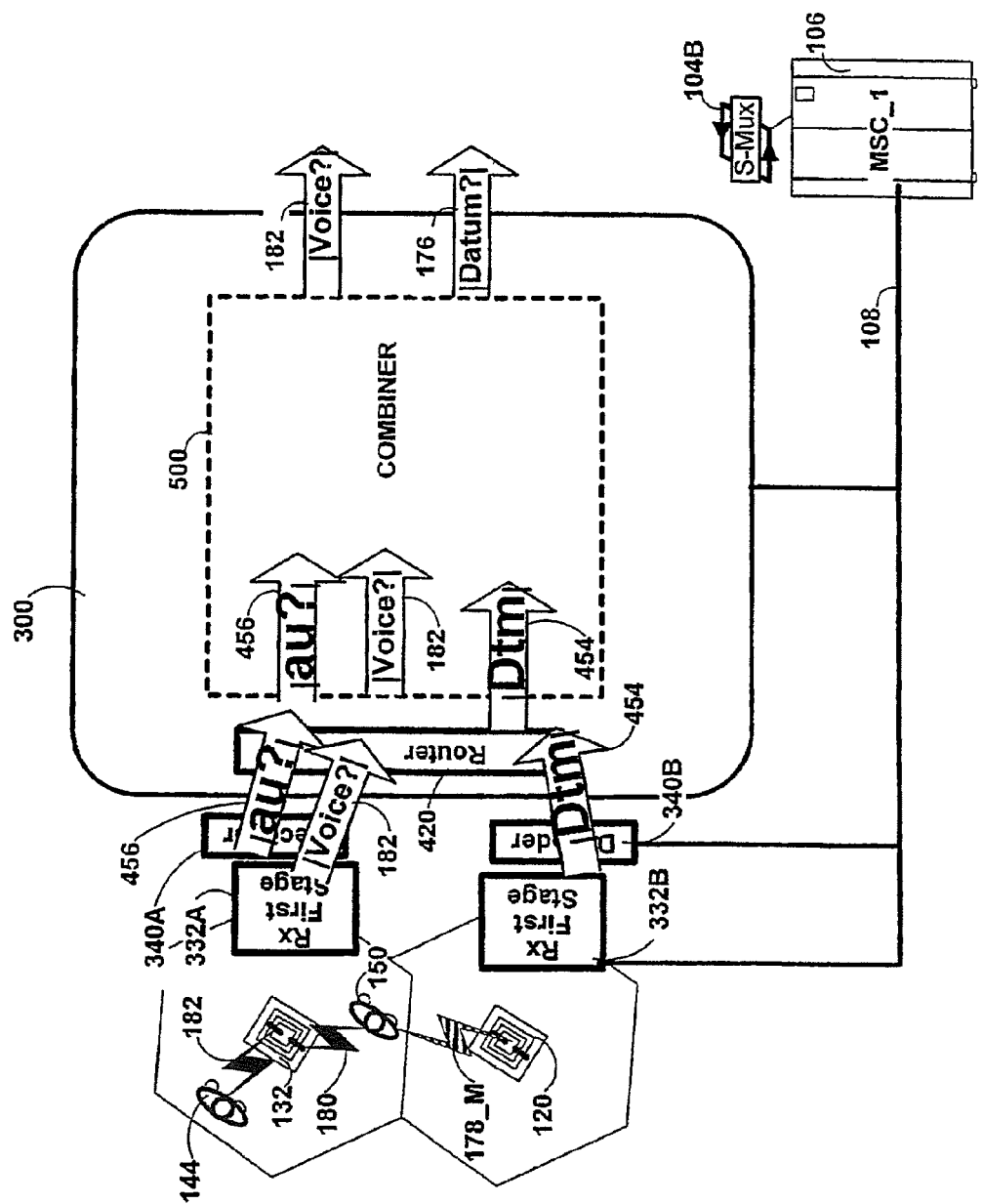

FIGS. 5A-B show the upstream modules associated with the processing of datastream(s) and substreams received by the BTSs. That information may be destined for another subscriber unit or for the network 100 (see FIG. 1A).

FIG. 5A shows the base stations 120,132, the upstream processes/logic 300 and the MSC 106. In the example shown, single-base SM is implemented. The subscriber unit 150 is shown transmitting signals 178_S and 180. These are received by BTS 132 and processed by the associated modules of its configurable SM receiver 330 (see FIG. 3). From the decoder 340A, substreams 454-456 are passed to the upstream processes/logic 300. The upstream module includes a router 420 and a combiner 500. The combiner 500 operates in reverse of the manner described and discussed above in connection with the parsing unit 402. The router 420 passes the substreams 454-456 to the combiner 500. The output of the combiner is the subscriber datastream(s) 176.

FIG. 5B shows the modules discussed above in connection with FIG. 5A during the reception of multi-base spatial transmissions from the subscriber unit 150 as well as the single-base transmission from subscriber unit 144. BTS 132 and the associated receiver module 330, have their spatial processor configured to generate a single one of the substreams 456 that can be derived from the composite signals 178_M and 180 of subscriber unit 150. The other substream 454 is generated by corresponding modules associated with BTS 120. Additionally, on the same/different channel, BTS 132 with the receiver 330 is configured to generate a single datastream(s) 182 from the composite signal 182 transmitted by the subscriber unit 144. The datastream(s) 182 of the associated decoder of that BTS, i.e. decoder 340A is passed to the router 420. The combiner is configured to combine substreams 454-456 into datastream 176 and to pass datastream(s) 182 along without combining.

Thus, in an embodiment of the invention, the method and apparatus of the current invention may be used to implement SM_MA both on the down/up link. As will be obvious to those skilled in the art, SM may be asymmetrically implemented as well, on either the down/up link selectively, without departing from the scope of this invention.

Figure 6:
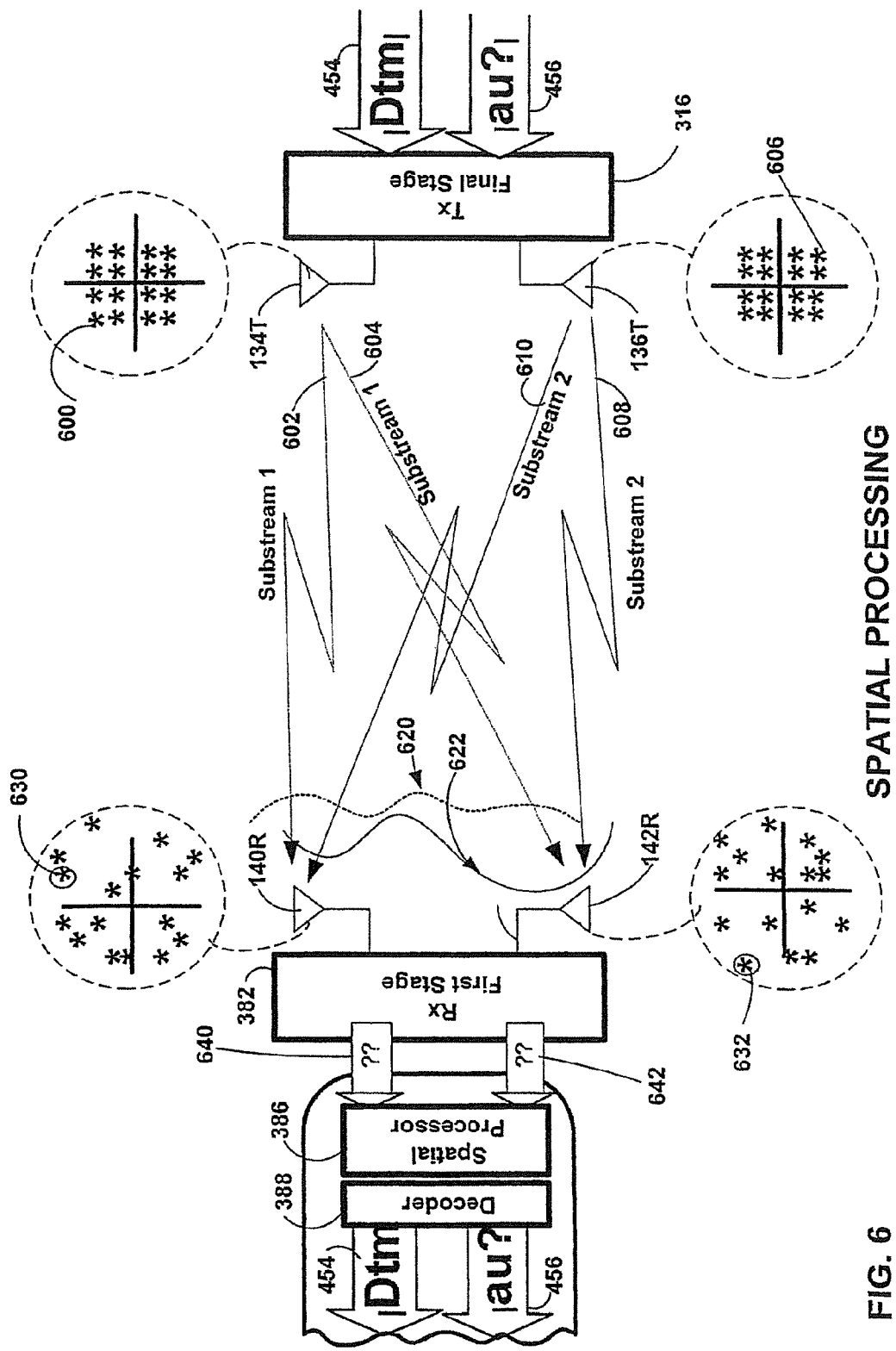
FIG. 6 shows a detailed view of the signals and the symbols associated with the transmission and receipt of spatially multiplexed signals according to an embodiment of the current invention.

FIG. 6 shows an antenna array of BTS transmitter 132 and the antenna array of the subscriber unit receiver 138 (see FIG. 3). The antenna array of the final transmissions stage 316 includes antennas 134T-136T. The antenna array of the first receiver stage 382 includes antennas 140R-142R. The first receiver stage passes the composite signals 640-642 to the space/space-time processor 386. The output of the processor is presented to the decoder 388 from which, as output, the substreams 454-456 are generated.

As will be obvious to those skilled in the art, the transmission of data through a wireless medium may involve modulation of an information signal derived from a datastream(s) or substream on a carrier signal. Information may, for example, be contained in the phase and/or amplitude relationship of the signal modulating the carrier. Each specific phase and/or amplitude relationship that is utilized is referred to as a "symbol". The set of all symbols is referred to as the "constellation". The greater the number of symbols in a constellation, the more binary bits of information may be encoded in each symbol in a given constellation. Current communication protocols allow for constellations with over 1024 symbols, each encoding for one of ten bit combinations. Antenna 134T is shown transmitting a symbol 600 within a signal constellation. This corresponds to an associated group of the bits corresponding to the data from a portion of substream 454. Antenna 136T is shown transmitting symbol 606 which corresponds to a different bit sequence derived directly from substream 456. The transmission of substream 454 by antenna 134 results in at least two signals 602-604. The transmission of the symbol 606 by antenna 136 generates at least two signals 608-610. Additional signals are likely in a multipath environment with numerous scattering objects, such as buildings, etc. For the sake of simplicity, signals 602 and 610 transmitted from respectively antennas 134T-136T are both received by antenna 140R as a single composite signal. The corresponding signals 604 and 608 are received by antenna 142R as a single composite signal. In order for the spatial receiver of the subscriber unit to resolve the composite signals into the estimated subscriber datastream/substreams, the spatial processor 386 must include information about the spatial signatures 620-622 of the transmissions from each of the antennas 134-136. These spatial signatures may be determined using either blind and or non-blind training methods in the manner described and discussed above. By placing the decoder 388 downstream from the space/space-time processor 386, the appropriate symbols may then be derived from the substream and converted into a corresponding binary sequence from which the corresponding portions of the substreams 454-456 may be generated.

As will be obvious to those skilled in the art, any of a number of other modulation techniques may be used to implement the current invention including: continuous phase modulation (CPM), continuous frequency modulation (CFM), phase shift keying (PSK), offset phase shift keying, amplitude shift keying (ASK), pulse position modulation (PPM), pulse width modulation (PWM), etc., without departing from the scope of this invention.

Figure 7A:
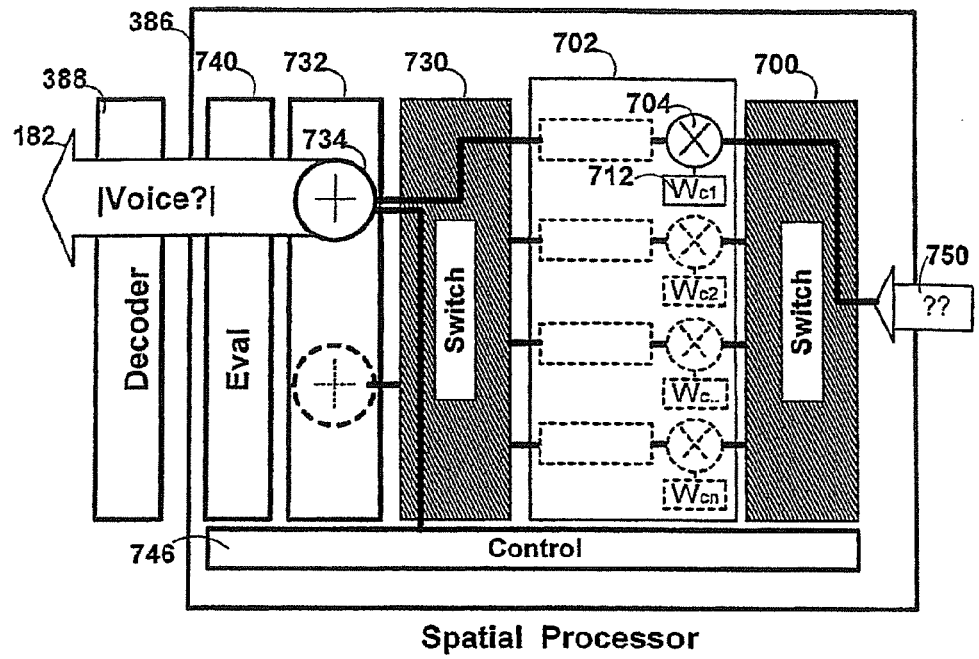
FIGS. 7A-B show detailed hardware block diagrams of the configurable spatial processor associated with the receiver circuitry receiver, according to an embodiment of the current invention.
Figure 7B:
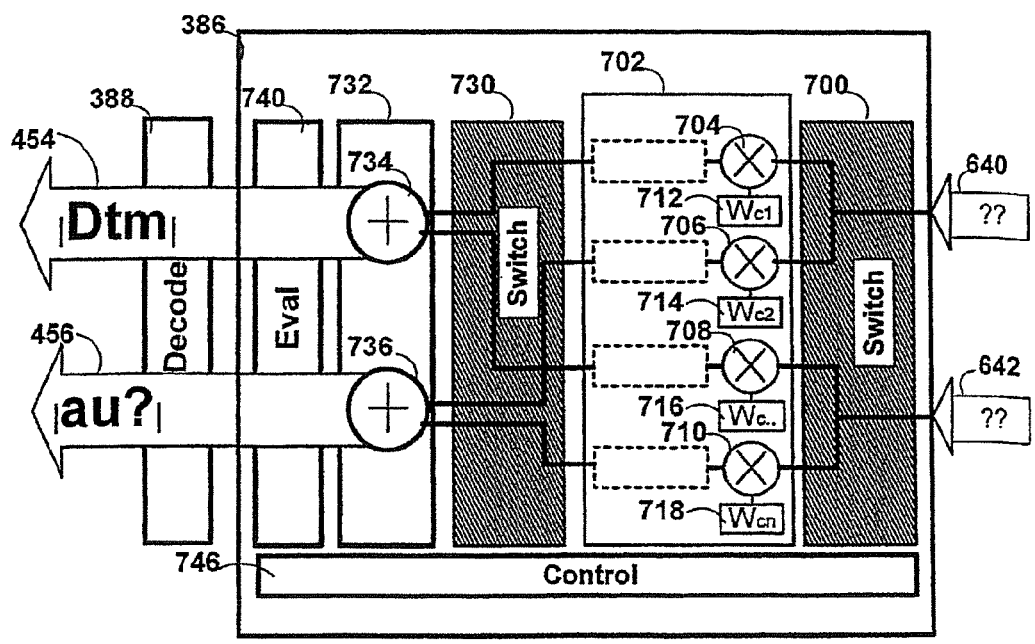

FIGS. 7A-B show an embodiment of the invention in which the spatial processor 386 is configured for both traditional and spatial mode signal reception. Additionally, in the spatial mode, the spatial processor is configurable to generate a variable number of substreams to correspond to the number transmitted. Spatial processor 386 and the decoder 388 are shown. The spatial processor 386 includes: first fabric switch 700, first configurable logic 702, second fabric switch 730, second configurable logic 732, an evaluator 740, and a controller 746.

The spatial processor 386 is coupled via the receive processes 384 to the receiver first stage 380 of the subscriber unit, as discussed above in connection with FIG. 3. Similar design applies to the spatial processor 338 in the BTS (see FIG. 3). The composite signal(s) detected by the first stage receiver is passed to the fabric switch 700 of the spatial processor. Responsive to signals generated by the control unit 746, the first fabric switch passes the composite signal/signals to one or more of the sub-modules within first logic unit 702. In the embodiment shown, a sub-module includes a multiplier 704 and a weight register 712. The multiplier generates an output signal which is a product of the weight stored in weight register 712 multiplied by the incoming composite signal. The weights in this register and the register of other sub-modules may be derived using non-blind or blind training methods as discussed above. In the example shown in FIG. 7A, a composite signal 750 is presented to fabric switch 700. This switch has been configured utilizing in/out of band control signals to process a single composite signal. The output of the multiplier is presented to the second fabric switch 730. This fabric switch also is configurable by means of the control unit 746. The fabric switch 730 presents the signals from the first logic module in variable configurations to one or more of the summers, e.g. summer 734 which is part of the second configurable logic in this embodiment of the invention. Because a single composite signal is being processed in the embodiment shown in FIG. 7A, only one summer is utilized. The input to that summer is the output of the multiplier 704 and the zero input provided by the control unit 746. The output of the summer 734 is passed to the evaluator 740 (optional). The evaluator determines when signals that are spatially transmitted are not separable, and if separable, the quality of each link. The quality of each link may be evaluated using, for example, Signal to Interference Noise Ratio (SINR). The resultant traditional mode datastream(s) 182 is passed through the decoder. In the decoder the conversion from symbols to associated bit sequences is implemented. As shown above in FIG. 3, the output of the decoder is passed to an associated combiner. The configuration of the configurable spatial processor under the control of control unit 746 takes place as a result of in/out of band control signals. These signals may be generated during call setup or during an actual call session by SM_MA processes/logic 104.

In FIG. 7B, the configurable nature of the spatial processor is evident by comparison to FIG. 7A. Composite signals 640-642 are presented to the first fabric switch 700. Responsive to signals from the control unit 746, the first fabric switch generates output signals for each of the composite input signals. Composite signal 640 is passed to a first pair of logic sub-modules within the first logic unit 702. Composite signal 642 is passed to a second pair of logic sub-modules within the first logic unit 702. The first pair of logic sub-modules include: multiplier 704 together with associated weight register 712, and multiplier 706 together with associated weight register 714. The second pair of logic sub-modules include: multiplier 708 together with associated weight register 716, and multiplier 710 together with associated weight register 718. Multipliers 704-706 receive as inputs the composite signal 640. Multipliers 708-710 receive as inputs the composite signal 642. The weight registers may contain weights obtained during transmission of a training sequence which allow training sequences to be separated. These are multiplied by the corresponding composite signal inputs and the four products are cross-coupled to summers 734-736 of the second logic unit 732 by the second fabric switch. The output of summers 734-736 is, respectively, the estimated substreams 454-456. In the embodiment shown, these are passed through an evaluator 740 to the decoder 388. Subsequently, the estimated substreams are combined into the original datastream 176 (not shown). The decoder 388 performs the above-mentioned function of mapping the summer output into symbols and from the symbols, into the appropriate binary sequences. In an alternate embodiment of the invention, the evaluator may be placed downstream of the decoder and perform a similar function at that location.

The evaluator monitors the estimated substreams to determine if they are appropriately separated, and if separable, the quality of the link(s). This determination might, for example, be made during the transmission of a training sequence. When the evaluator determines it is no longer possible to spatially separate the corresponding substreams, that determination may be passed to the upstream processes/logic 104, e.g. the MSC 106 (see FIG. 1). This results in an alteration of the spatial configuration of the transmission. A change in spatial transmission may be implemented in any number of ways. These include: a change in the antenna selection and/or number at a single base, a change from traditional to spatial mode broadcasting at a single base, a change from single-base to multi-base transmission. Similarly, when the evaluator determines that the substreams are separable, it may pass on the link quality parameters to the upstream processes/logic 104, e.g. the MSC 106. This can help the BTS/MSC/CO side of the processes/logic 104_choose the modulation rate (bits per symbol) of each substream, and carry out parsing accordingly.

Figure 7D:
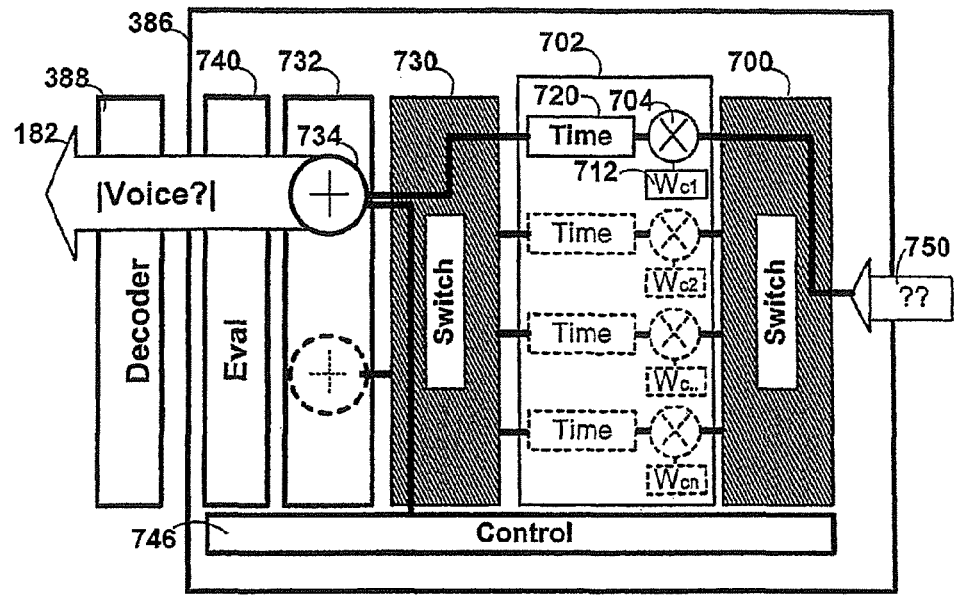
Figure 7D:
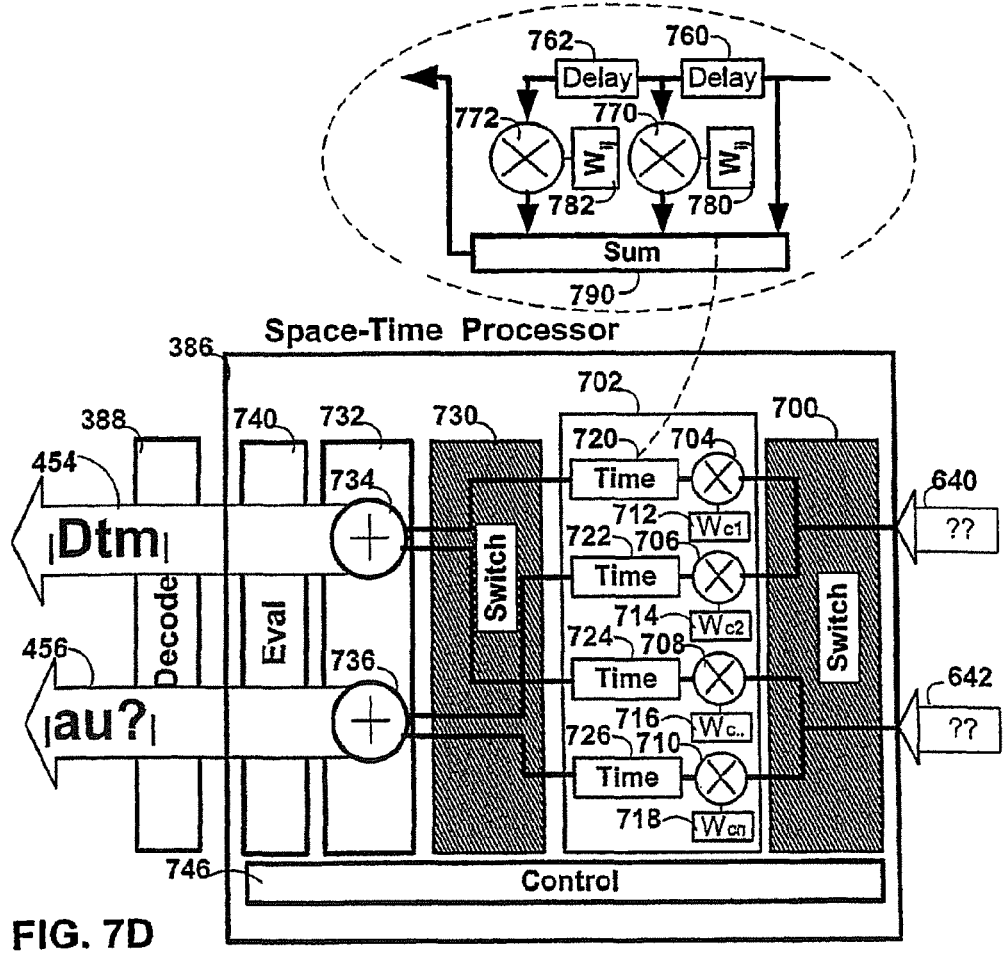

FIGS. 7C-D show an embodiment of space-time processor. To the capabilities of the above-discussed spatial processor is added the ability to remove the interference in the composite signal caused by the delayed versions of the composite signal over time. To account for these perturbations, one or more delay elements may be introduced into the signal paths in the first logic unit to account for these effects. An exploded view of an embodiment of a time logic sub-module is shown in FIG. 7D. In the embodiment shown, each time sub-module is coupled to the output of a corresponding multiplier in the first logic unit. Time sub-modules 720-726 are coupled to the outputs of multipliers 704-710, respectively. Each time module may consist of a plurality of delay elements. In the exploded view, a sub-module includes delay modules 760-762; multipliers 770-772 together with associated weight registers 780-782, as well as a summer 790. The output of multiplier 704 is an input both to delay module 760 and summer 790. The output of delay module 760 is an input both to delay module 762 and to multiplier 770. The output of delay module 762 is an input to multiplier 772. The outputs of the multipliers provide additional inputs to the summer 790. The output of the summer is presented to the second fabric switch 730. Each time module may include additional multipliers with associative delay units and weight registers. As was the case in FIGS. 7A-B, the space-time processor in FIGS. 7C-D is configurable. FIG. 7C shows the processor configured for a single input composite signal 750. FIG. 7D shows the space-time processor configured for two composite input signals 640-642.

The spatial/space-time processor of FIGS. 7A-D is configurable; e.g. capable of processing a variable number of composite signals and outputting a corresponding number of estimated subscriber substreams. In another embodiment of the invention, the spatial/space-time processor is not configurable; accepting instead a fixed number of substreams and outputting a corresponding fixed number of estimated subscriber substreams.

As will be obvious to those skilled in the art, any of a number of other processing techniques may be used to implement the current invention, including: space-time, space-frequency, space-code, etc. In turn, these may further utilize any, or a combination of techniques including, but not limited to: linear or non-linear processing, Maximum Likelihood (ML) techniques, Iterative decoding/interference canceling, Multi-user detection (MUD) techniques, etc., without departing from the scope of this invention.

Figure 8:
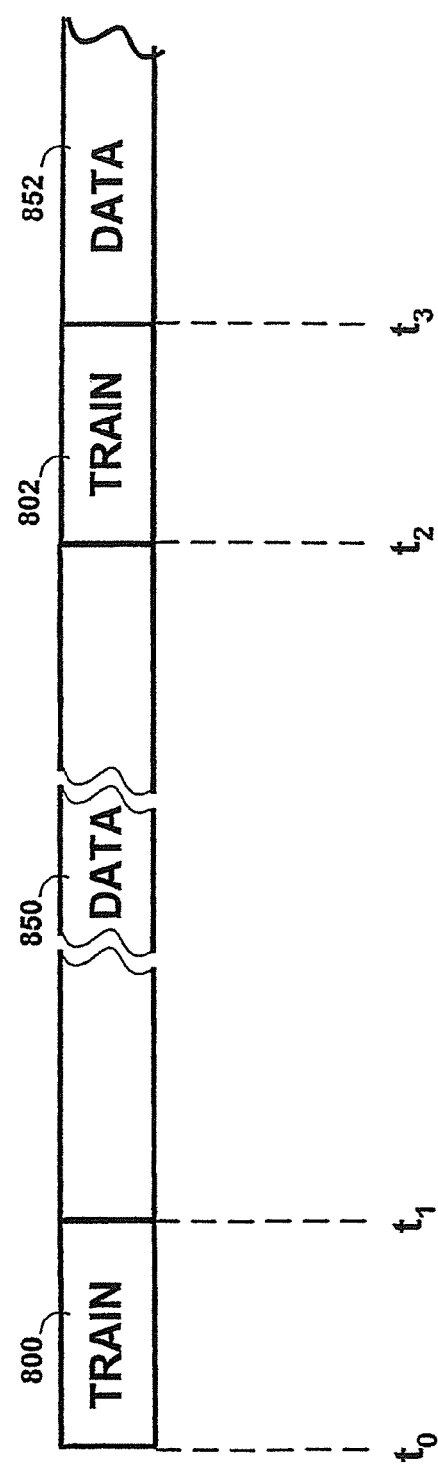
FIG. 8 shows in band training and data signals for calibrating the spatially configurable receiver during the transmission of spatially multiplexed data, according to an embodiment of the current invention.

FIG. 8 shows a datastream interspersed with the training sequences consistent with a non-blind embodiment of the current invention. Training sequences 800-802 and data sequences 850-852 are shown. Suitable training sequences include orthogonal Walsh codes transmitted by the spatially separate antennas. The spatial/space-time processor of the receiver attempts to generate weights which separate the known Walsh code sequences. Those weights are then used in processing the subsequent datastream(s)/substreams. In an embodiment of the invention, the training sequences are inserted into the datastream at frequency/duty cycle, which depend on the mobility of the subscriber unit. In another embodiment of the invention, the training sequences vary in duration and are constant in frequency. The training sequences may be transmitted in/out of band. As the mobility of a subscriber increases, the frequency/duty cycle of the training sequences may be increased. The mobility of the subscriber unit can, as discussed above, be detected by Doppler shift/spread detected by the mobility detector 334 (see FIG. 3) on the receive side of the base station, for example. When the subscriber unit is fixed, training may only be performed at, or before, call setup or at a relatively low frequency/duty cycle during a call/data session. In still other embodiments of the invention, no training sequences would be inserted into the datastream(s)/substreams, instead relying on blind training techniques discussed above.

Figure 9A:
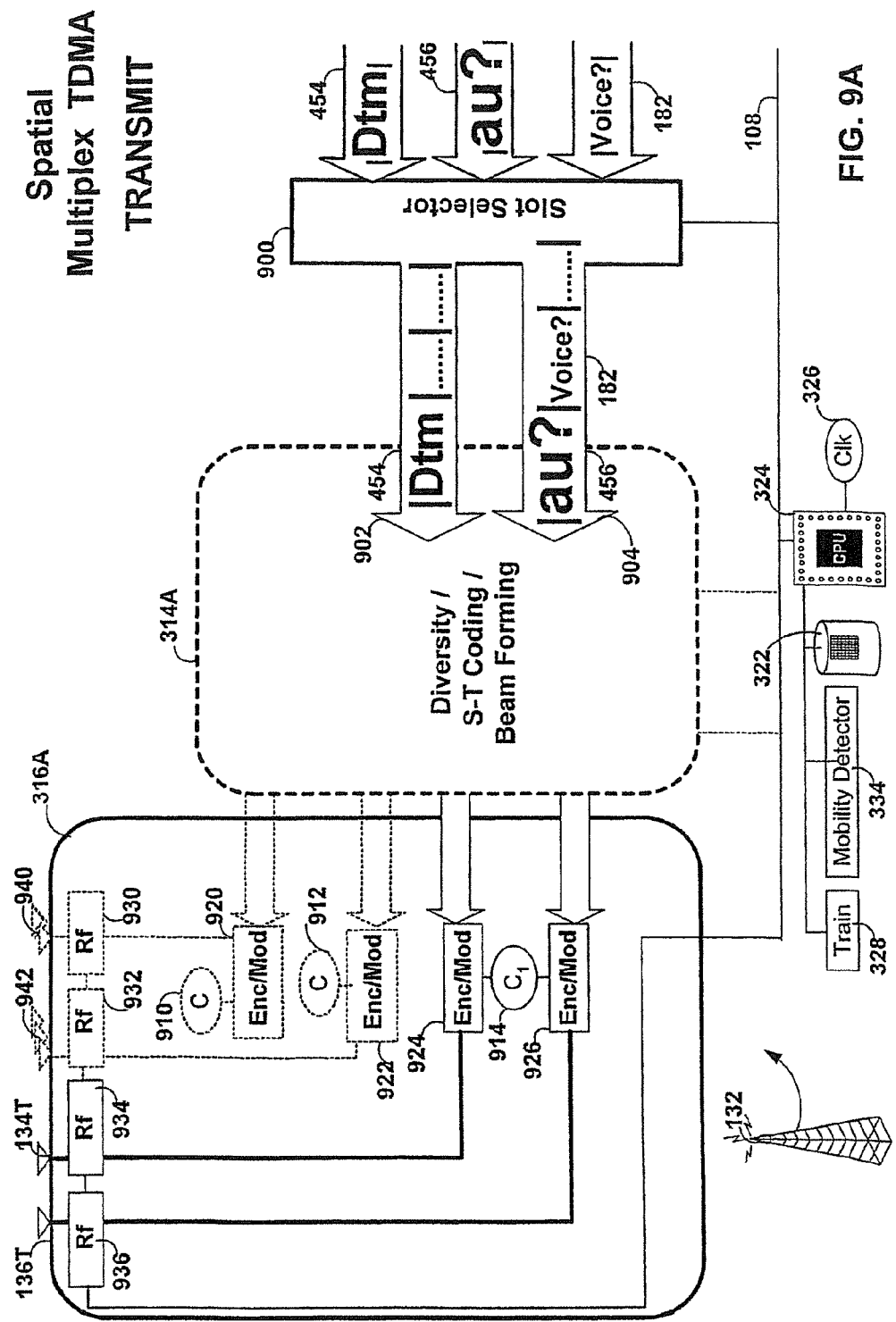
FIGS. 9A-B are respectively detailed hardware block diagrams of a spatially multiplexed transmitter and receiver implementing a time-division multiple access protocol (TDMA), according to an embodiment of the current invention.
Figure 9B:
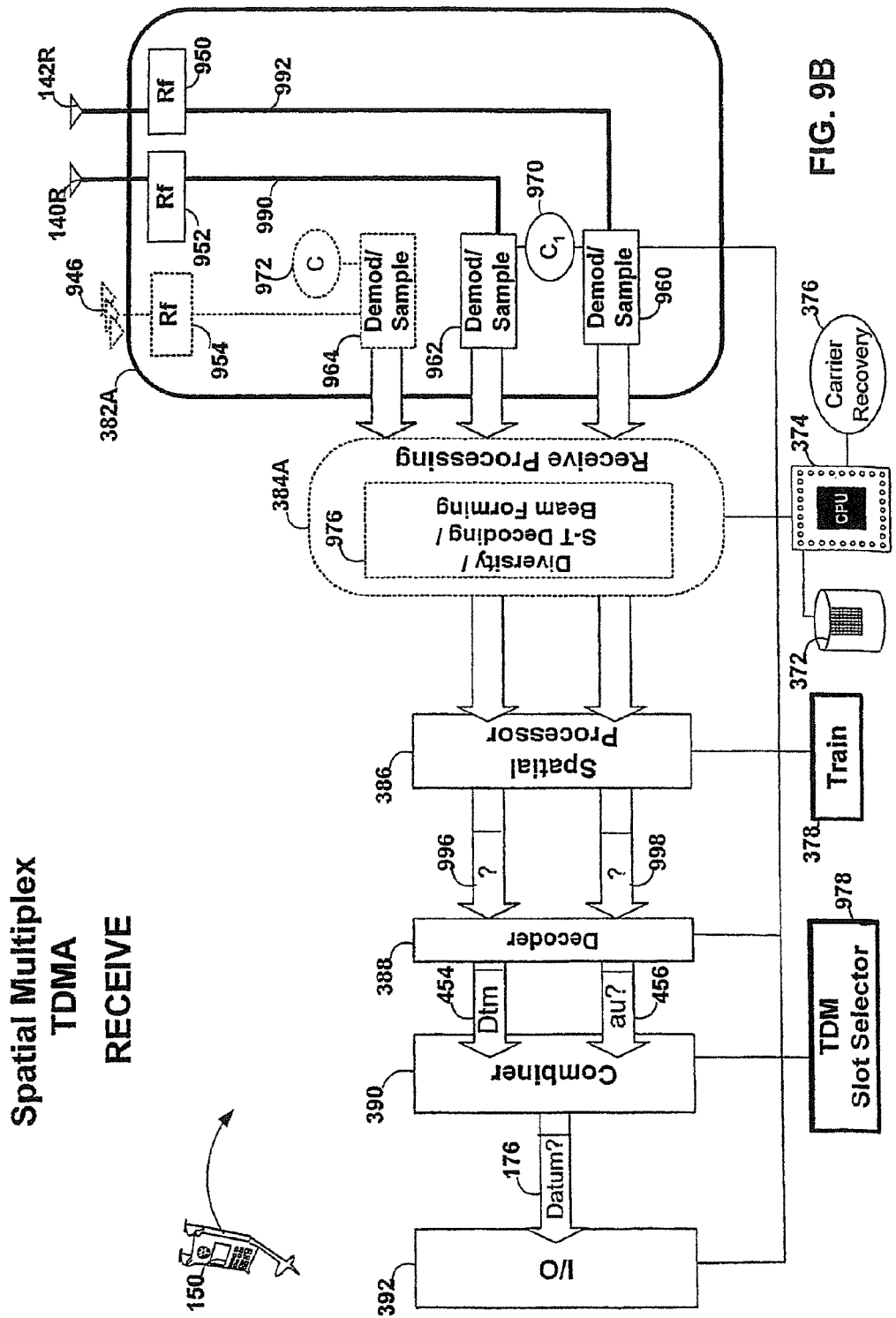
Figure 11A:
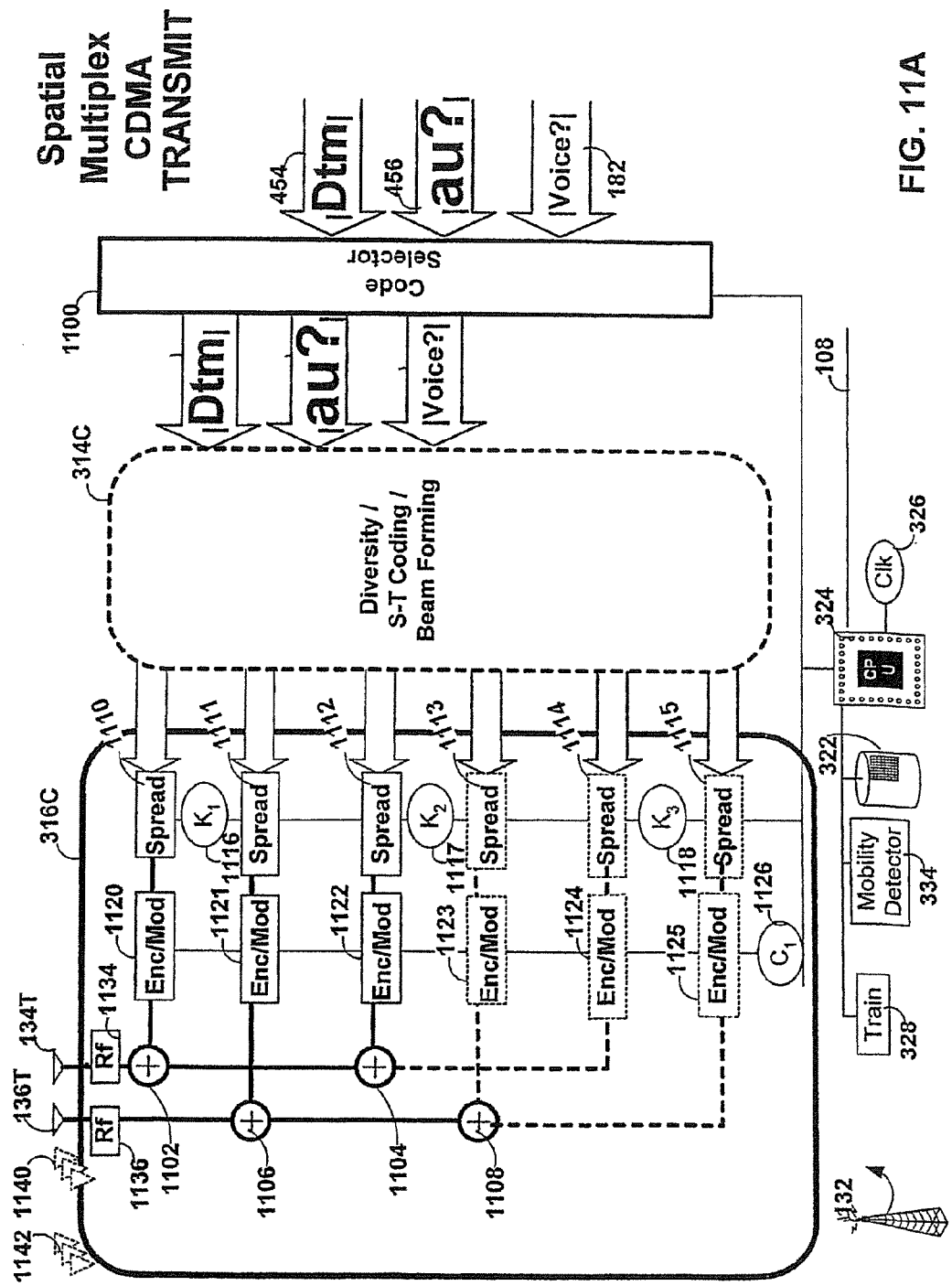
FIGS. 11A-B are respectively detailed hardware block diagrams of a spatially multiplexed transmitter and receiver implementing a code-division multiple access protocol (CDMA), according to an embodiment of the current invention.
Figure 11B:
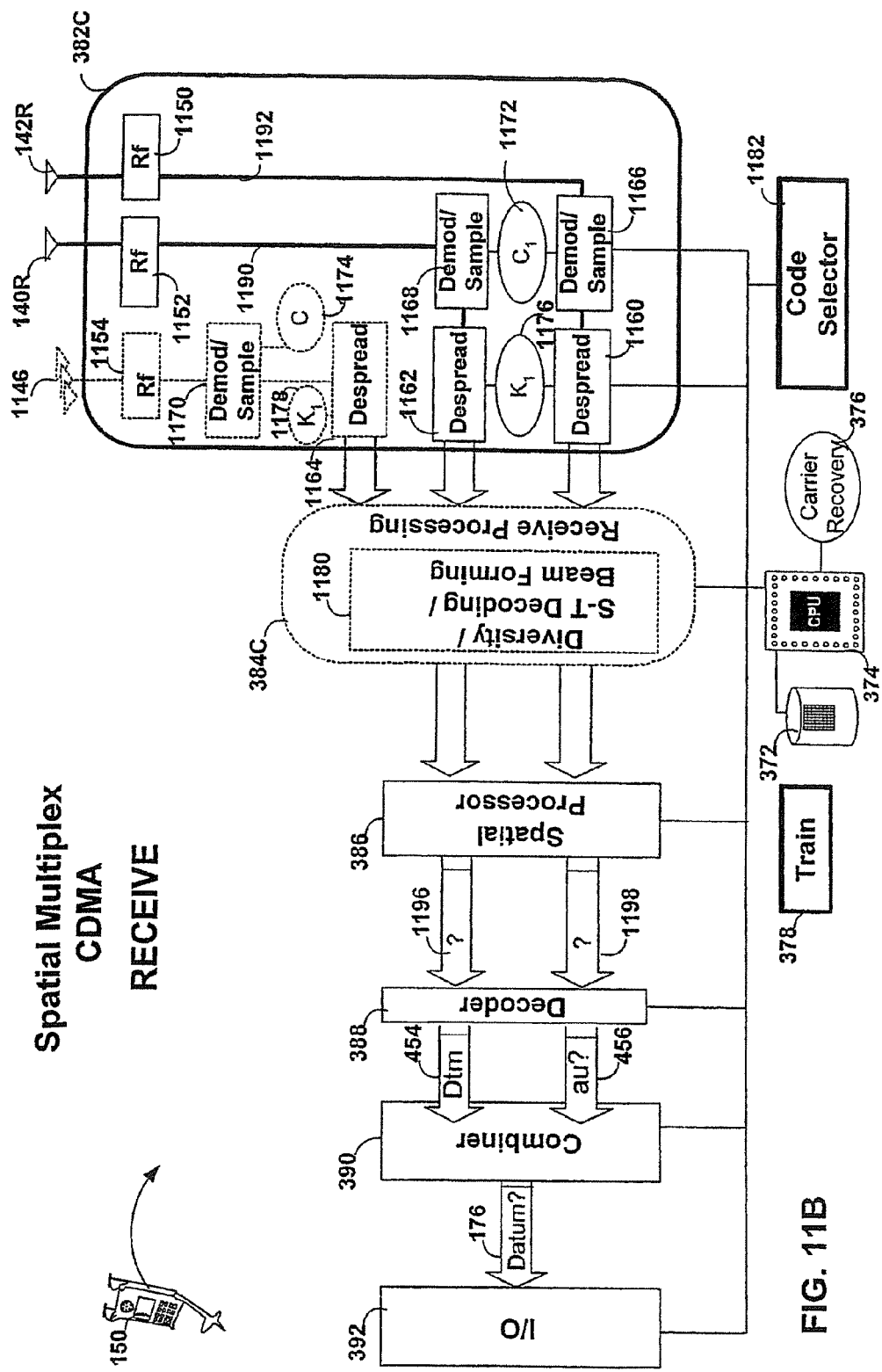
Figure 12A:
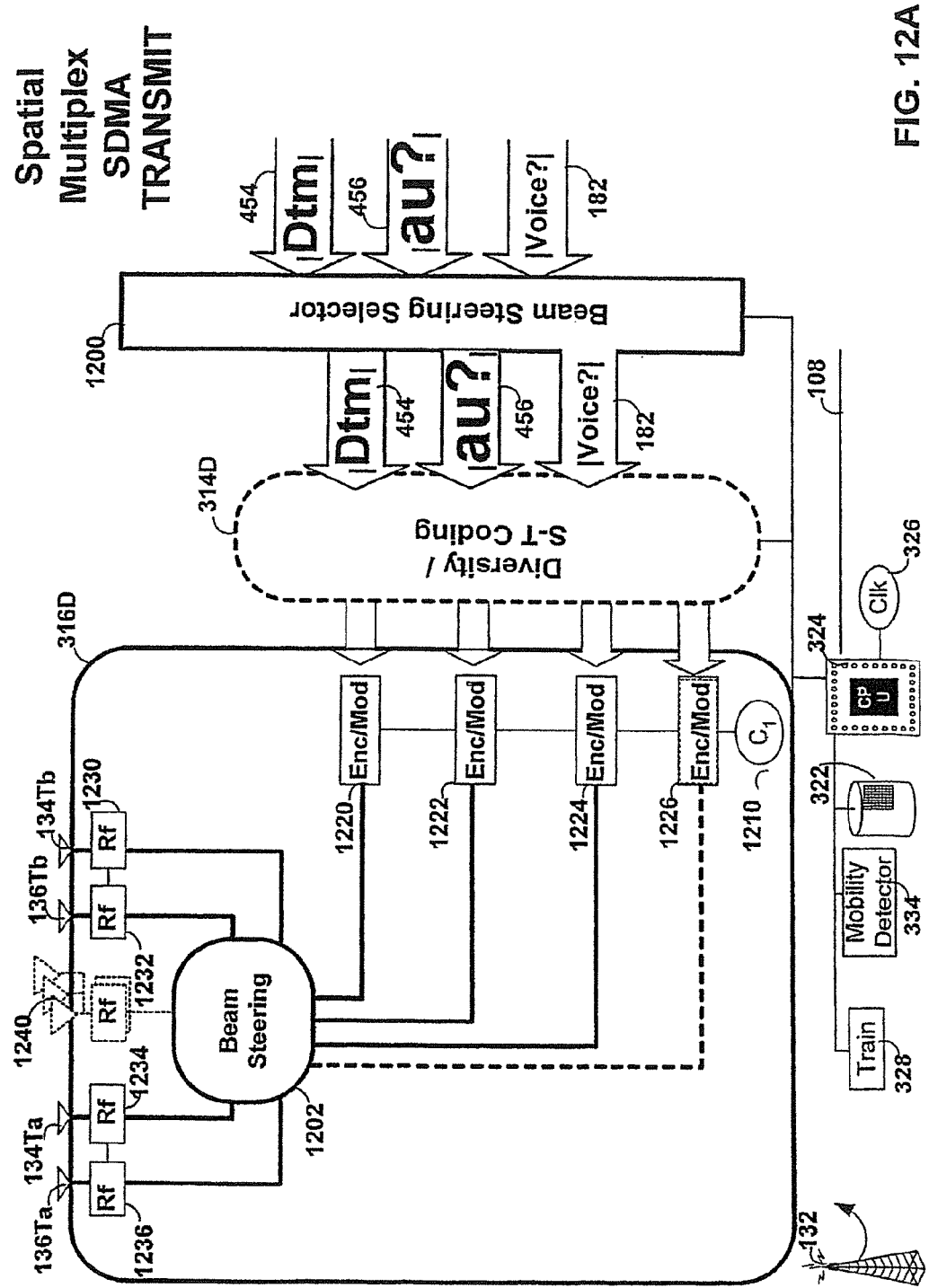

FIGS. 9A-B to 12A-B show various access methodologies utilized to provide multiple access spatial multiplexing in accordance with the current invention. The figures labeled with "A" show the transmit portion of each access method while the figures labeled with "B" show the receive side. FIGS. 9A-B show SM time-division multiple access (TDMA). FIGS. 1A-B show SM frequency-division multiple access (FDMA). FIGS. 11A-B show SM code-division multiple access (CDMA). FIGS. 12A-B show SM space-division multiple access (SDMA). The modules disclosed herein on the upstream side, as well as the subscriber side, may be implemented in hardware/software. They may be implemented on a single chip, e.g. DSP or ASIC. The modules disclosed on the upstream side may be located in the BTS or further upstream, e.g. the MSC/CO. On the subscriber side the modules may be implemented in a single unit.

FIG. 9A shows a slot selector 900, a transmit processor module 314A (optional), and a final transmit stage 316A. In the embodiment shown, these are part of the above-discussed BTS 132 (see FIG. 1A). Each of these modules is coupled to the control elements shown in FIG. 3, i.e. training module 328, mobility detector 334, memory 322, processor 324, and clock 326. These are coupled via signal/control line 108 to the MSC 106. The mobility detector is, in an embodiment of the invention shown in FIG. 3, part of the receive side of the BTS. It is shown in FIG. 9A for purposes of clarity, since it interacts with the training module 328 and CPU 324 to detect and generate training sequences responsive to the mobility of the subscriber unit. Subscriber datastream 182 and substreams 454-456 derived from subscriber datastream 176 (see FIGS. 4A-J) are shown as inputs to the slot selector 900. In TDMA each subscriber session is allocated a specific time segment in which to be transmitted. Time segments are assigned in round-robin fashion. In the traditional public switched telephone network (PSTN), there are twenty-four time slots (a.k.a. channels/D0). The slot selector 900, under the direct/indirect control of processes/logic 104 and implemented at, e.g. the MSC 106, assigns the related substreams 454-456 to identical channels (TDMA slots) within the separate TDMA datastream(s) 902-904, which are output by the slot selector. The traditional mode datastream 182 is assigned to a separate channel/slot within TDMA datastream 904.

Each of the TDMA datastream(s) 902-904 is, in an embodiment of the invention, provided as an input to an optional transmit processing module 314A. That module may implement any one of a number of well known prior art techniques for improving signal quality in a wireless network including: diversity, space-time coding, beam forming, etc.

The transmit processor 314A (optional) includes, in the embodiment shown, diversity processing, space-time coding and beam-forming. Beam-forming exploits channel knowledge to direct transmissions to the location of the corresponding subscriber. Diversity may be implemented in: frequency, time, space, polarization, space/space-time, etc. The outputs of the optional transmit processor 314A are provided as inputs to the final transmit stage 316A. That stage includes encoder modulators 924-926, operating off a common carrier 914 for processing each of the TDMA datastream(s) 902-904. These modulated datastream(s) are passed to respective RF stages 934-936 and associated antennas 134T-136T for spatially separate transmission of the individual substreams that they contain, e.g. 454-456. Additional antenna arrays 940-942, RF stages 930-932, encoder/modulator stages 920-922 are used to implement any of the optional transmit processes.

FIG. 9B shows the receive side of a subscriber unit 150 enabled for spatial multiplexing utilizing TDMA access. That unit includes: first receiver stage 382A, receive processor 384A (optional), spatial/space-time processor 386, decoder 388, combiner 390, I/O module 392, TDMA slot selector 978, processor 374, carrier recovery module 376, memory 372, and training module 378. The first receiver stage includes antennas 140R-142R which are coupled via, respectively, RF stages 952-950 to demodulator/sampling modules 962-960. The demodulator/sampling units operate off a common carrier 970. An additional antenna array 946, RF stage 954, demodulator/sampling module 964, and carrier generator 972 are utilized by the receive processor 384A to implement: diversity processing, space-time decoding, beam-forming, etc.

In operation, the carrier recovery module 376 synchronizes the carriers 970-972 to the carrier frequency of the incoming composite signals 990-992. The TDM slot selector 978 accepts a channel assignment from the BTS(s) and synchronizes the receive processes accordingly. The composite signals from each antenna are demodulated and sampled by the corresponding one of the demodulator/sampling modules 964-960. The outputs of these modules provide inputs to the receive processor 384A. The receive processor implements signal processing techniques which may complement one or more of the optional processes discussed above for the transmit side (see FIG. 9A). Each composite signal output by the receive processes/logic 384A provides inputs to the spatial/space-time processor 386 (see FIGS. 7A-D). That processor, using parameters/weights derived from the above-discussed blind/non-blind training techniques, separates the composite signals into the appropriate number of estimated subscriber substreams, e.g. 996-998. In configurable embodiments of the spatial/space-time processor, information received from the BTS(s) at the start of, or during, a call session configures the processor to generate a number of substreams that correspond to the actual number of substreams transmitted. Next, the estimated subscriber substreams are provided as inputs to a similarly configured decoder 388. The decoder maps symbols utilized during the transmission of the substreams/datastream(s) into their binary equivalent. The decoder outputs the estimated subscriber substreams 454-456 to the combiner 390. The combiner reverses the operation performed on the transmit side by the parser, generating thereby an estimated subscriber datastream 176. This datastream is provided to the I/O module 392 for subsequent presentment to the subscriber as for example, an audio signal, a video signal, a data file, etc.

Figure 10A:
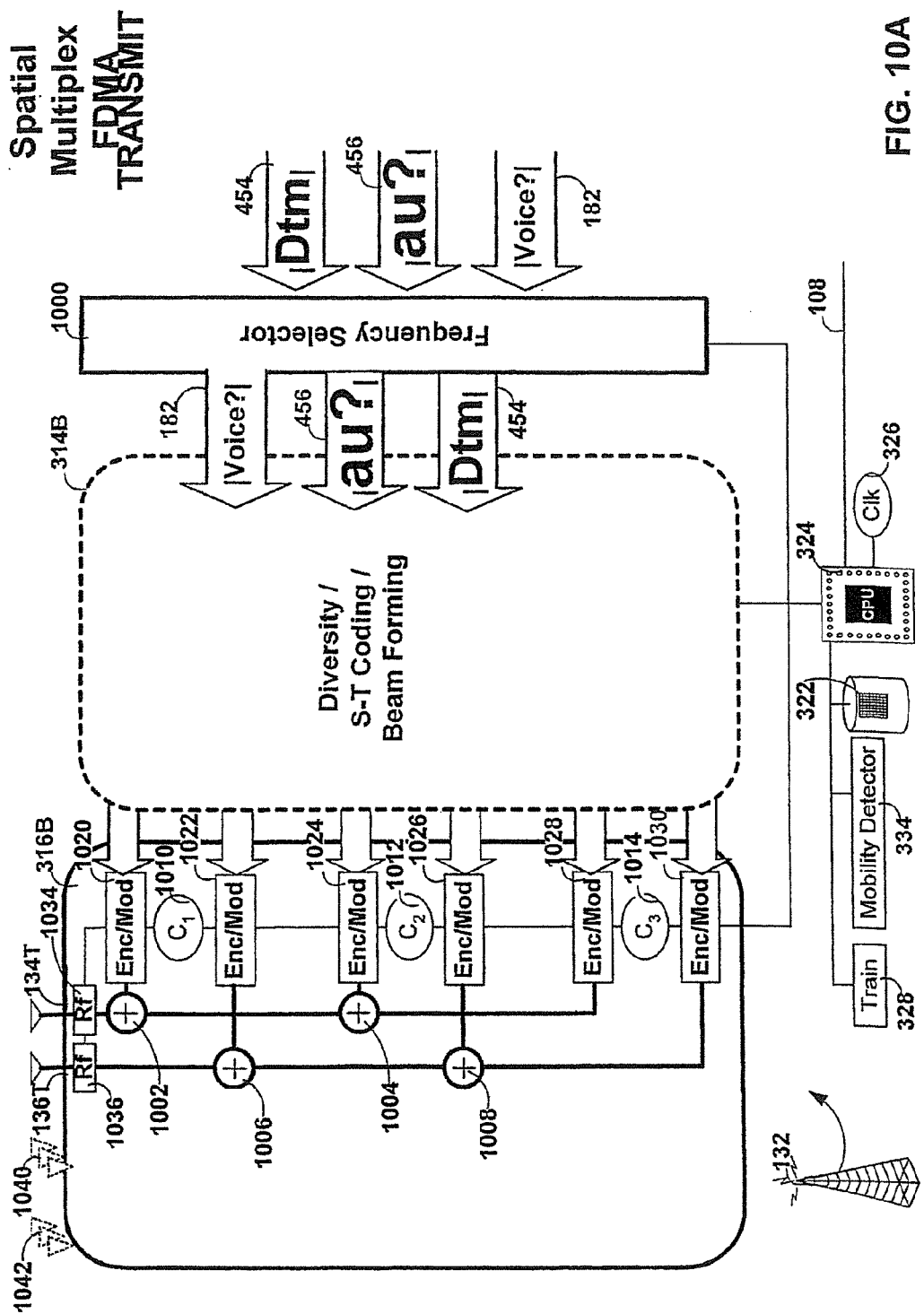
FIGS. 10A-B are respectively detailed hardware block diagrams of a spatially multiplexed transmitter and receiver implementing a frequency-division multiple access protocol (FDMA), according to an embodiment of the current invention.
Figure 10B:
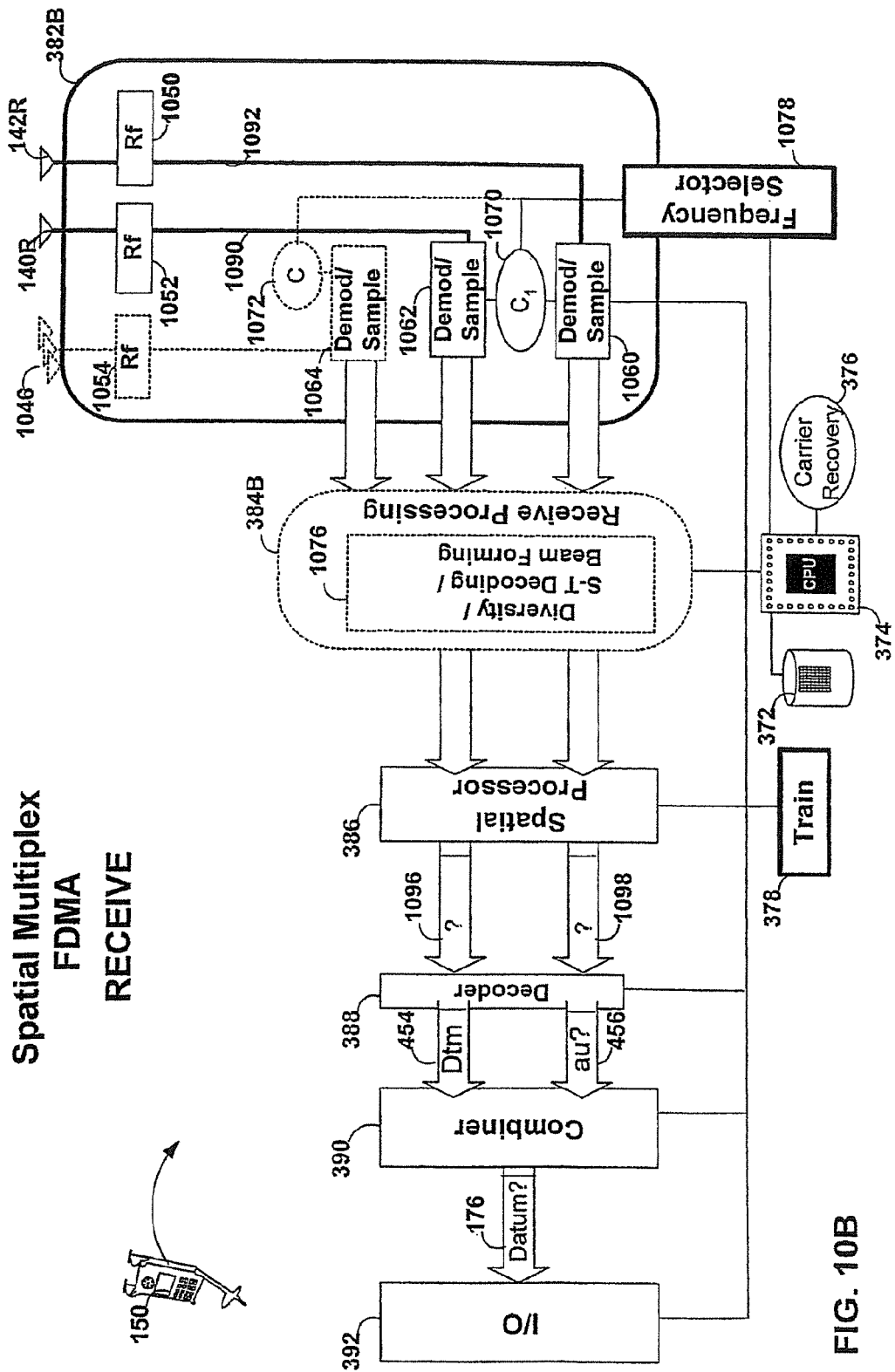

FIGS. 10A-B show a BTS implementing SM frequency-division multiple access (FDMA). In FDMA, each subscriber session, whether traditional or spatially processed, is provided with a single frequency slot within the total bandwidth available for transmission. The BTS includes: a frequency slot selector 1000, a transmit processor module 314B (optional), and a final transmit stage 316B. In the embodiment shown, these are part of the above-discussed BTS 132 (see FIG. 1A). Each of these modules is coupled to the control elements shown in FIG. 3, i.e. training module 328, mobility detector 334, memory 322, processor 324, and clock 326. These are coupled via signal/control line 108 to the MSC 106. Subscriber datastream 182 and substreams 454-456 derived from subscriber datastream 176 (see FIGS. 4A-J) are shown as inputs to the frequency slot selector 900. The selector 1000, under the direct or indirect control of the MSC 106, selects the appropriate frequency slot for the datastream(s)/substreams. This is represented in FIG. 10A by a final transmit stage which includes encoder/modulator clusters (1020-1022), (1024-1026), and (1028-1030), each of which modulates about a unique center frequency as determined by respective associated carriers 1010-1014. Intermediate the frequency selector 1000 and the final transmit stage 316B, is an optional transmit processing unit 314B which may impose on the datastream(s)/substreams additional signal processing utilizing antenna arrays 1040-1042 in conjunction with antennas 134T-136T, as discussed above in connection with FIG. 9A.

Within the final transmit stage two spatially separate antennas 134T-136T are shown. These are coupled via, respectively, RF stages 1034-1036 and summers (1002-1004), (1006-1008), to separate outputs of each of three encoder/modulator clusters. Each encoder/modulator cluster operates about a distinct center frequency. Each cluster contains a number of encoder/modulator outputs at least equivalent to the number of spatially separate antennas in the final transmit stage. Since there are two antennas in the example shown, each cluster contains at least encoding/modulating capability for processing two distinct substreams and for outputting each separately onto a corresponding one of the antennas for spatially separate transmission. The traditional mode datastream 182 is assigned to the first cluster with a center frequency determined by carrier 1010. That datastream is output via summer 1006 on antenna 136T. Each of the substreams 454-456, parsed from a common datastream 176 (see FIGS. 4A-J) is passed to a single cluster for spatially separate transmission on a single center frequency corresponding, in the example shown, to the center frequency determined by carrier 1012. The modules disclosed herein may be implemented in the BTS or further upstream, e.g. the mobile switching center. They may be implemented as hardware or software. They may be implemented on a single chip, e.g. DSP or ASIC.

FIG. 10B shows a subscriber unit 150 enabled for spatial multiplexing utilizing FDMA access methodology. That unit includes: first receiver stage 382B, receive processor 384B (optional), spatial/space-time processor 386, decoder 388, combiner 390, I/O module 392, frequency selector 1078, processor 374, carrier recovery module 376, memory 372, and training module 378. The first receiver stage includes antennas 140R-142R, which are coupled via RF stages 1052-1050, respectively, to demodulator/sampling modules 1062-1060. The demodulator/sampling units operate off a common frequency synthesizer 1070. Additional antenna array 1046, RF unit 1054, demodulator/sampling unit 1064, and frequency synthesizer 1072 are shown. Optionally, these may be utilized by receive processing unit 384B to implement any of the receive processes discussed above in connection with FIG. 9B.

In operation, the carrier recovery module 376 synchronizes the carriers 1070-1072 to the carrier frequency assigned by the BTS for the subscriber session, i.e. the carrier frequency at which the composite signals 1090-1092 are transmitted. The composite signals from each antenna are demodulated and sampled by the corresponding one of the demodulator/sampling modules 1064-1060. The outputs of these modules provide inputs to the receive processor/logic 384B. The receive processor implements signal processing techniques which may complement one or more of those discussed on the transmit side (see FIG. 10A). Each composite signal output by the receive processor/logic 384B provides inputs to the spatial/space-time processor 386 (see FIGS. 7A-D). That processor, using parameters/weights derived using the above-discussed blind/non-blind training techniques, separates the composite signals into the appropriate number of estimated subscriber substreams/datastream(s), e.g. 1096-1098. In configurable embodiments of the spatial/space-time processor, information received from the base stations at the start of, or during a call session, configures the processor to generate a number of substreams/datastream(s) which correspond to the actual number of substreams/datastream(s) transmitted. Next, the estimated subscriber substreams/datastream(s) are provided as inputs to a similarly configured decoder 388. The decoder maps symbols utilized during the transmission of the substreams/datastream(s) into their binary equivalent. The decoder outputs the estimated subscriber substreams in their binary equivalent 454-456 to the combiner 390. The combiner reverses the operation performed on the transmit side by the parser, generating thereby an estimated subscriber datastream 176. This datastream is provided to the I/O module 392 for subsequent presentment to the subscriber as for example, an audio signal, a video signal, a data file, etc. As will be obvious to those skilled in the art, the subscriber unit may be configured to receive more than one channel concurrently.

FIGS. 11A-B show a BTS implementing SM code-division multiple access (CDMA). In CDMA, each subscriber session, whether traditional (unparsed) or spatially processed (parsed), is provided with a distinct code sequence. The datastream/substreams are modulated (spread) onto the distinct code sequence/key code (Kn), and the spread signal is, in turn, modulated onto a common carrier. This has the effect of spreading each session across the entire transmission bandwidth. The BTS includes a key/code selector 1100, a transmit processor module 314C (optional), and a final transmit stage 316C. In the embodiment shown, these are part of the above-discussed BTS 132 (see FIG. 1A). Each of these modules is coupled to the control elements shown in FIG. 3, i.e. training module 328, mobility detector 334, memory 322, processor 324, and clock 326. These are coupled via signal/control line 108 to the MSC 106. Shown here for ease of explanation, the mobility detector, as discussed above, is actually implemented on the receive side of the BTS and interacts with the training module 328 to inject training sequences into the SM_CDMA transmissions.

Subscriber datastream 182 and substreams 454-456 derived from subscriber datastream 176 (see FIGS. 4A-J) are shown as inputs to the key/code selector 1100. The selector 1100, under the direct or indirect control of the MSC 106, selects the appropriate key/code sequence for the datastream(s)/substreams. This is represented in FIG. 11A by a final transmit stage which includes spreader and encoder/modulator clusters, (1110-1111,1120-1121), (1112-1113, 1122-1123), and (1114-1115,1124-1125) each of which modulates over a unique key code, respectively 1116-1118, and all of which modulate on a common carrier 1126. Intermediate the code/key selector 1100 and the final transmit stage 316C is the optional transmit processing unit 314C, which may impose on the datastream(s)/substreams additional signal processing, such as that described and discussed above in connection with FIG. 9A.

Within the final transmit stage, two spatially separate antennas 134T-136T are shown, along with an optional antenna array 1140-1142 associated with transmit processing. These are coupled via, respectively, RF stages 1134-1136 and summers (1102-1104),(1106-1108) to separate outputs of each of three spreader encoder/modulator clusters. Each spreader encoder/modulator cluster operates about a distinct key code. Each cluster contains a number of encoder/modulator outputs at least equivalent to the number of spatially separate antennas in the final transmit stage. Since there are two antennas in the example shown, each cluster contains at least encoding/modulating capability for processing two distinct substreams and for outputting each separately onto a corresponding one of the antennas for spatially separate transmission. The traditional mode datastream 182 is assigned to the second cluster with the key code 1117. That datastream is output via summer 1104 on antenna 134T. Each of the substreams 454-456, parsed from a common datastream 176 (see FIGS. 4A-J), is passed to a single cluster for spatially separate transmission with a single key code 1116.

FIG. 11B shows a subscriber unit 150 enabled for spatial multiplexing utilizing CDMA access methodology. That unit includes: first receiver stage 382C, receive processor 384C (optional), spatial/space-time processor 386, decoder 388, combiner 390, I/O module 392, key/code selector 1182, processor 374, carrier recovery module 376, memory 372, and training module 378. The first receiver stage includes antennas 140R-142R, which are coupled via, respectively, RF stages 1152-1150 to demodulator/sampling modules 1168-1166. Demodulator/sampling modules 1168-1166 operate off a carrier 1172. The output of these is passed to de-spreaders 1162-1160, respectively, which operate off of key code 1176, assigned by the key/code selector 1182 on the basis of control information passed between subscriber unit and base station. Carrier recovery and synchronization may be handled by carrier recovery module 376, operating in conjunction with carrier generator 1172. Additionally, first receiver stage 382C includes optional antenna array 1146, RF stage 1154, demodulator/sampling unit 1170, carrier generator 1174, de-spreader 1164, and key/code generator 1178. These may be utilized in conjunction with the optional receive processor 384C in the manner discussed above in FIGS. 9B and 10B.

In operation, the carrier recovery module 376 synchronizes the carriers 1172-1174 to the carrier assigned by the BTS for the subscriber session, i.e. the carrier at which the composite signals 1190-1192 were transmitted. The composite signals from each antenna are then demodulated and sampled by the corresponding one of the demodulator/sampling modules 1168-1166. Respectively, the outputs of these modules provide inputs to de-spreaders 1162-1160, where they are de-spread using the key code 1176 assigned for the session. The outputs of the de-spreaders provide inputs to the optional receive processor 384C. The receive processor may implement signal processing techniques which complement one or more of those discussed on the transmit side (see FIG. 11A). Each composite signal output by the receive processes/logic 384C provides inputs to the spatial/space-time processor 386 (see FIGS. 7A-D). That processor, using parameters/weights derived using the above-discussed blind/non-blind training techniques, separates the composite signals into the appropriate number of estimated subscriber substreams/datastream(s), e.g. 1196-1198. In configurable embodiments of the spatial/space-time processor, information received from the base stations at the start of, or during, a call session configures the processor to generate a number of substreams/datastream(s) which correspond to the actual number of substreams/datastream(s) transmitted. Next, the estimated subscriber substreams/datastream(s) are provided as inputs to a similarly configured decoder 388. The decoder maps symbols utilized during the transmission of the substreams/datastream(s) into their binary equivalent. The decoder outputs the estimated subscriber substreams 454-456 in their binary equivalent to the combiner 390. The combiner reverses the operation performed on the transmit side by the parser, generating thereby an estimated subscriber datastream 176. This datastream is provided to the I/O module 392 for subsequent presentment to the subscriber as, for example, an audio signal, a video signal, a data file, etc. As will be obvious to those skilled in the art, the subscriber unit may be configured to receive more than one channel concurrently.

FIGS. 12A-B show a BTS implementing space-division multiple access (SDMA). In SDMA, each subscriber session, whether traditional (unparsed) or spatially processed (parsed), is transmitted as a shaped beam; a high gain portion of which is electronically directed using beam forming toward a known subscriber, at a known location, within a cell.

This has the effect of allowing channel re-use within a single cell by beam forming each subscriber session to a separate segment of a cell.

The BTS includes a beam steering selector 1200, a transmit processor module 314D (optional), and a final transmit stage 316D. In the embodiment shown, these are a part of the above-discussed BTS 132 (see FIG. 1A). Each of these modules is coupled to the control elements shown in FIG. 3, i.e. training module 328, mobility detector 334, memory 322, processor 324, and clock 326. These are coupled via signal/control line 108 to the MSC 106. Subscriber datastream 182 and substreams 454-456, derived from subscriber datastream 176 (See FIGS. 4A-J), are shown as inputs to the beam steering selector 1200. The selector 1200, under the direct/indirect control of the MSC 106, selects the appropriate direction in which beam steering is to be carried out for each subscriber session and its associated datastream/substreams. Intermediate the beam steering selector 1200 and the final transmit stage 316D is the optional transmit processing unit 314D, which may impose on the datastream(s)/substreams additional signal processing, such as that described and discussed above in connection with FIG. 9A, with the exception of beam forming.

Within the final transmit stage, two pairs of spatially separate antennas 134TA/B-136TA/B are shown. Additionally, antenna array 1240 associated with transmit processes 314D is shown. The two pairs of antennas are coupled via, respectively, RF stages 1234,1230,1236,1232 to beam steering module 1202. The beam steering module accepts as inputs the separately encoded and modulated outputs from encoder modulators 1220-1226, each of which operated on a common carrier 1210, and each of which handles a different substream/datastream. The steering of datastream 182 to subscriber 144 (see FIG. 1B), and of substreams 454-456 to subscriber 150, is accomplished by beam steering unit 1202. That unit, operating with a known location/channel for each subscriber, steers the output beams from the antennas so that they interfere in a manner which maximizes the gain appropriately. At the location of subscriber 144, beam steering results in the composite signal corresponding to datastream 182 reaching a relative maximum, while the gain of the composite signals corresponding to the substreams 454-456 at that location is minimized. Beam steering also accomplishes the opposite effect at the location of subscriber unit 150.

FIG. 12B shows a subscriber unit 150 enabled for spatial multiplexing utilizing SDMA access methodology. That unit includes: first receiver stage 382D, receive processor 384D (optional), spatial/space-time processor 386, decoder 388, combiner 390, I/O module 392, processor 374, carrier recovery module 376, memory 372, and training module 378. The first receiver stage includes antennas 140R-142R, which are respectively coupled via RF stages 1252-1250 to demodulator/sampling modules 1262-1260. Demodulator/sampling modules 1262-1260 operate off of a common carrier 1270. Carrier recovery and synchronization may be handled by carrier recovery module 376 operating in conjunction with carrier generator 1270. Additionally, the first receiver stage may also include: an antenna array 1246, coupled via RF stage 1254 to a demodulator/sampler 1264, and associated carrier module 1272. These operate under the control of receive processes 384D to implement any of the receive processes discussed above in connection with FIGS. 9B, 10B and 11B.

In operation, the carrier recovery module 376 synchronizes the carriers 1270-1272 to the carrier at which beam forming is conducted by the BTS(s). The composite signals from each antenna are then demodulated and sampled by the corresponding one of the demodulator/sampling modules 1268-1266. The outputs of these modules provide inputs to the receive processor 384D. Each composite signal output by the receive processes/logic 384B provides inputs to the spatial/space-time processor 386 (see FIGS. 7A-D). That processor, using parameters/weights derived using the above-discussed blind/non-blind training techniques, separates the composite signals into the appropriate number of estimated subscriber substreams/datastream(s), e.g. 1296-1298. In configurable embodiments of the spatial/space-time processor, information received from the base stations at the start of, or during, a call session configures the processor to generate a number of substreams/datastream(s) that correspond to the actual number of substreams/datastream(s) transmitted. Next, the estimated subscriber substreams/datastream(s) are provided as inputs to a similarly configured decoder 388. The decoder maps symbols utilized during the transmission of the substreams/datastream(s) into their binary equivalent. The decoder outputs the estimated subscriber substreams in their binary equivalent 454-456 to the combiner 390. The combiner reverses the operation performed on the transmit side by the parser, generating thereby an estimated subscriber datastream 176. This datastream is provided to the I/O module 392 for subsequent presentment to the subscriber as, for example, an audio signal, a video signal, a data file, etc. As will be obvious to those skilled in the art, the subscriber unit may be configured to receive more than one channel concurrently.

Although FIGS. 9-12 show four distinct multiple access methods, it will be obvious to those skilled in the art that each of these may be combined with one or more of the others without departing from the scope of this invention, as well as with such multiple access methods as: orthogonal frequency division multiple access (OFDMA), wavelength division multiple access (WDMA), wavelet division multiple access, or any other orthogonal division multiple access/quasi-orthogonal division multiple access (ODMA) techniques.

Figure 13A:
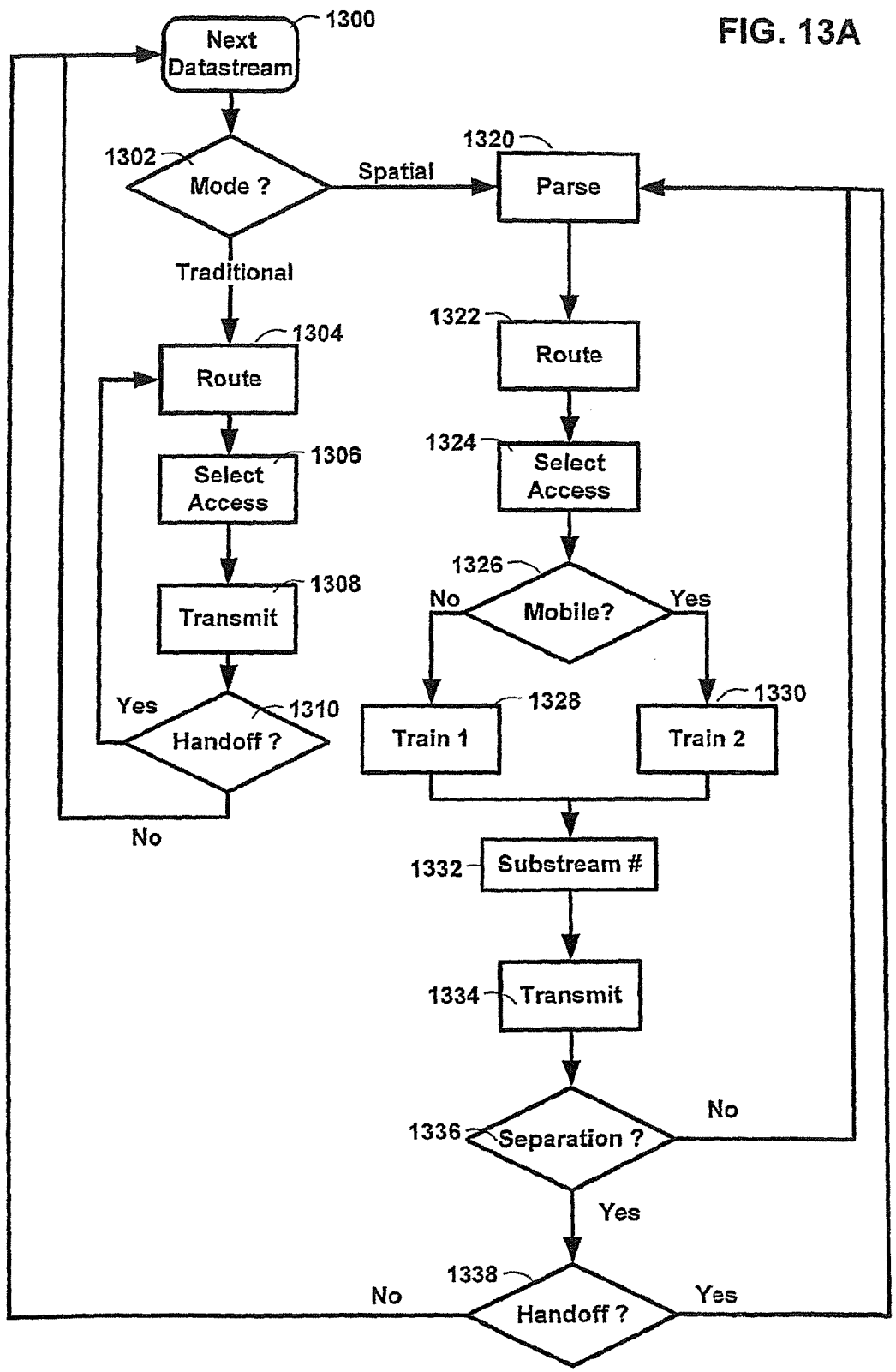
FIGS. 13A-B are process flow diagrams showing the acts associated with respectively the spatially multiplexed transmission and reception of datastream(s) in any one of a number of multiple access protocols, according to an embodiment of the invention.
Figure 13B:
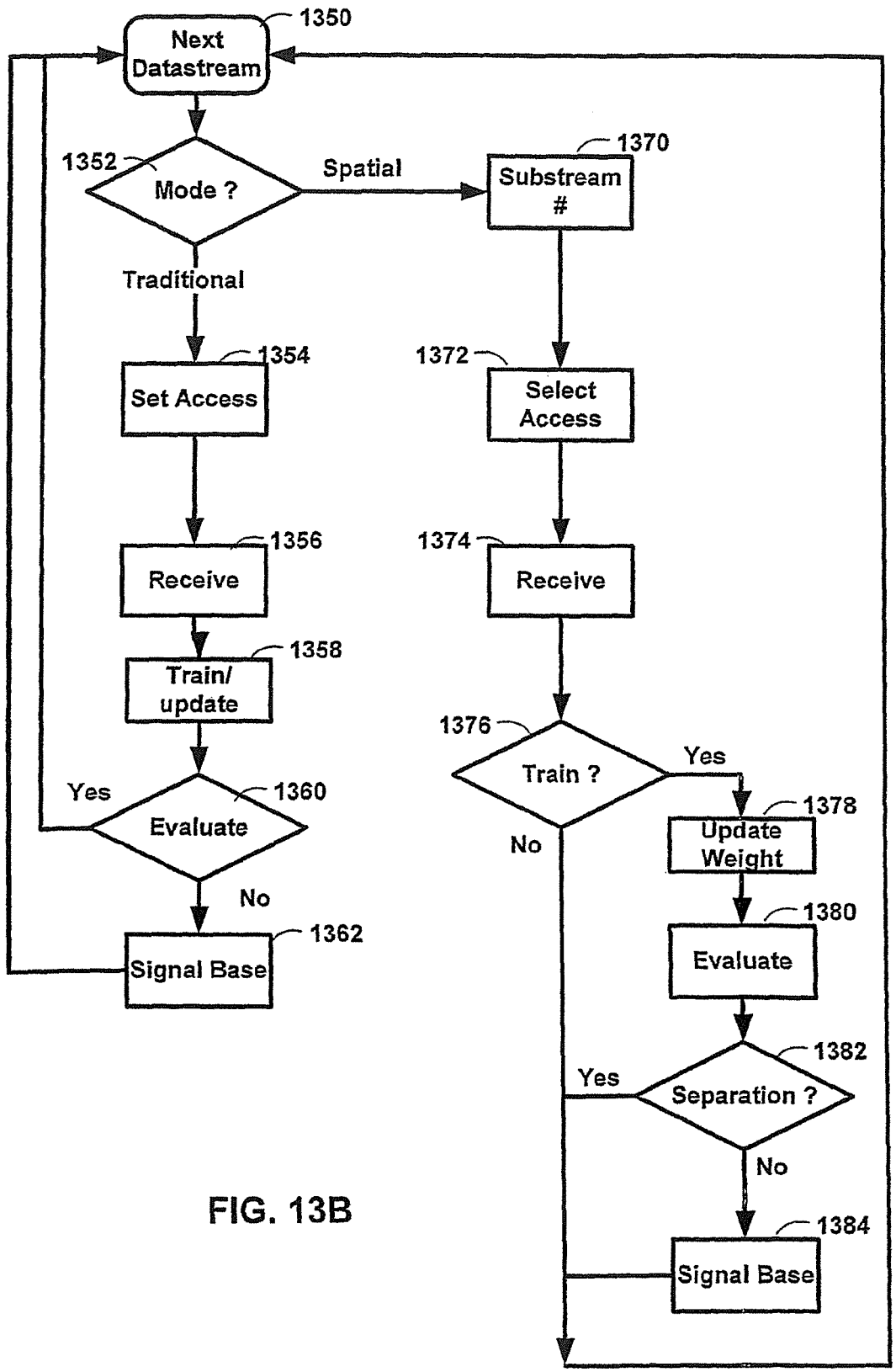

FIGS. 13A-B show the process flow for transmit and receive processing/logic 104_associated with an embodiment of the current invention. These processes/logic may be carried out across multiple datastreams, either in parallel, serially, or both. Processing begins at process block 1300 in which the next datastream is detected. Control then passes to decision process 1302. In decision process 1302 a determination is made as to the mode of the datastream. As discussed above, the mode determination may distinguish traditional/spatial, quality of service, bit rate, etc. as well as various combinations thereof. If a determination is made that the mode is traditional, control passes to process 1304. In process 1304 a routing determination is made for the datastream. The routing decision may involve the MSC directing the datastream to an appropriate one of the base stations for transmission. Control then passes to process 1306. In process 1306, the datastream is placed on the appropriate channel within the access protocol implemented on the wireless network. Channel assignment may also be made by the MSC. Control then passes to process 1308 in which the subscriber datastream is transmitted. Next, in decision process 1310, a determination is made as to whether any handoff from one BTS to another is appropriate. If this determination is in the affirmative, control returns to process 1304 for re-routing of the datastream. Alternately, if a negative determination is made in process 1310 that the subscriber is fixed, or still within the cell associated with the transmitting BTS, then control returns to process 1300 for the processing of the next datastream.

If, alternately, in decision process 1302 the mode of the next datastream is determined to be spatial, control passes to process 1320. In process 1320 the datastream is split into a configurable number of substreams. Control is then passed to process 1322. In process 1322 the individual substreams are routed and to one or more base stations for transmission to the subscriber. Control then passes to process 1324. In process 1324, under the direct or indirect control the MSC (see FIG. 1A), the access channel on which to transmit the substreams is selected. That information is communicated to the BTS(s) which are involved in the transmission of the substreams. Control then passes to decision process 1326. In decision process 1326 a determination is made as to whether the intended subscriber is mobile or fixed. If a negative determination is reached, i.e. that the subscriber is fixed, control passes to process 1328. In process 1328, a training sequence either at set-up or during a call session is generated provided non-blind training protocols are being utilized. The receipt of these training sequences by the subscriber unit allows that unit to derive appropriate weight parameters in the first logic unit of the spatial/space-time processor for separating the composite signals into individual estimated substreams (see FIGS. 7A-D). Alternately, if in decision process 1326 an affirmative determination is reached, i.e. that the subscriber is mobile, then control is passed to process 1330. In process 1330, the frequency or duration of the training sequences inserted into the datastream is increased appropriately. This allows the subscriber unit to continually re-train its spatial/space-time parameters to account for possible changes in the spatial environment brought about by its motion. Control is then passed to process 1332. In process 1332 a determination is made as to the number of substreams that are to be transmitted. The subscriber unit is then signaled as to the number of substreams for which it should configure its spatial/space-time processor and other modules. Control is then passed to process 1334. In process 1334 the selected BTS(s) transmit the selected substreams to the corresponding subscriber unit. Control is then passed to decision process 1336.

In decision process 1336, a decision is made as to whether signal separation at the subscriber unit is adequate. As discussed above, this determination may, for example, be based on feedback from the subscriber unit by monitoring the received signal stream from the subscriber unit, or by monitoring bit error rate (BER) at the transmitting BTS(s). Numerous other methods will be evident to those skilled in the art for making this determination. If this decision is in the negative, i.e. that the subscriber unit is unable to separate the substreams, control returns to process 1320. The process 1320 may now parse the data stream into lesser number of substreams than before, or may do parsing as before, then pass the control to process 1322 for re-routing of the datastream's substreams. Re-routing might, for example, include a change of spatial configuration on a single BTS, or a changeover from single-base to multi-base transmission, as discussed above in connection with FIGS. 4A-J. Alternately, if in decision process 1336 an affirmative determination is reached that the subscriber unit is able to separate the substreams, control passes to decision process 1338. In decision process 1338 a determination is made as to whether a handoff is required. This may result in a partial or full handoff. If that determination is in the negative, e.g. the subscriber unit is fixed, or still within the cell and is capable of separating the substreams, then control returns to process 1300 for the interception of the next datastream. Alternately, if that decision is in the affirmative, control returns to process 1320. The process 1320 parses the datastreams as before, and passes the control to process 1322 for re-routing of the substreams to one or more base stations.

FIG. 13B shows the receive processes/logic of a subscriber unit associated with an embodiment of the invention. Processing begins at process 1350, in which the next datastream in his detected. Control is then passed to decision process 1352. In decision process 1352, a control signal from the BTS is received indicating the mode of the transmitted signal, e.g. traditional/spatial, and in the latter case, the number of substreams to be generated from the composite signals received. If the composite signals are to be treated as carrying a traditional datastream, control is passed to process 1354. In process 1354 the appropriate channel on which to receive the composite signal is assigned. Channel assignment may occur: during call setup, during a change in spatial configuration, or during a change from single-base to multi-base transmission, for example. Control is then passed to process 1356. In process 1356 the composite signals are received and appropriately processed by the associated modules of the subscriber unit (see FIG. 3). Control is then passed to decision process 1358. In decision process 1358, any training sequences and update of signal processing parameters that may be required are performed. Control is then passed to decision process 1360 for a determination as to whether signal quality and/or strength is adequate. If an affirmative determination is reached, e.g. that quality and/or strength is adequate, then control returns to process 1350 for the processing of the next datastream. Alternately, if a negative determination is reached, then control is passed to process 1362. In process 1362 signaling of the BTS(s) that signal strength or quality is not acceptable is accomplished. In an embodiment of the invention, the subscriber unit signals the BTS that signal strength is no longer suitable for reception, or that signal separation, in the case of spatial transmissions, is no longer adequate. Control then returns to process 1350 for the processing of the next datastream.

If, alternately, in decision process 1352 the control signal from the BTS indicates that the mode of the incoming composite signals is spatial, control is passed to process 1370. In process 1370, control information received by the subscriber unit indicates the number of substreams for which the spatial processor, and other modules of the receive portion of the subscriber unit, are to be configured. Control is then passed to process 1372. In process 1372 access parameters, e.g. channel, for the transmission from the BTS(s) to the subscriber unit are passed to the subscriber unit. Control then passes to process 1374. In process 1374 the composite signals are received and processed into corresponding estimated subscriber substreams. Control then passes to decision process 1376. In decision process 1376 a determination is made as to whether any training sequence is present in the datastream. This embodiment of the invention therefore implements non-blind training. Other embodiments of the invention implementing blind training methods need not implement this particular act. If, in decision process 1376 a negative determination is reached, i.e. that no training sequences are present, control returns to process 1350. Alternately, if in decision process 1376 an affirmative determination is reached, i.e. that a training sequence is present, then control is passed to process 1378. In process 1378, evaluation of the training sequence is performed and new weights registered within the spatial/space-time processor for separating the training sequences. Control is then passed to decision process 1380 for evaluation of the training sequences, then passed to decision process 1382 for a determination of whether the training sequences can be separated adequately. If an affirmative decision is reached, then control returns to decision process 1350. Alternately, if the separation is not adequate, then control passes to process 1384. In process 1384, a control signal is sent to the BTS indicating that a change in spatial configuration is required. The BTS(s) might respond by changing spatial configuration from single to multi-base, by changing the number or spatial configuration of the antennas utilized at a single base, by changing a channel, etc. Control then returns to process 1350 for processing of the next datastream.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

It should also be apparent that the described subscriber units may be used in a wide variety of other applications without departing from the scope of the present invention. One such application contemplates the use of the described subscriber units in network access units that are used provision extend or otherwise supplement the range of existing high speed telephone or cable networks. By way of example, a hybrid DSL/wireless link is diagrammatically illustrated in FIG. 14. As is well known in the telecommunications art, in conventional high speed xDSL networks, high speed communications are made between a head end DSL modem (typically located at a central office (CO) or optical network unit (ONU)) and a remote DSL modem located on a customer's premises. The link between the central and remote modems is made on ordinary twisted pair wires. Thus xDSL system have the strong advantage of allowing high speed communications using existing wiring infrastructure. However, twisted pair wiring has significant signal attenuation and therefore, it is typically difficult or impossible to provide DSL service to customers who are located too far (e.g. more than 2 or 3 miles) from the central office/ONU. Further, even among customers within the coverage area, the loading coils and the bridge taps which are used around the binders of twisted pair wires that connect the modems, as well as other potential obstacles may make DSL technology difficult to implement in many circumstances.

Figure 14:
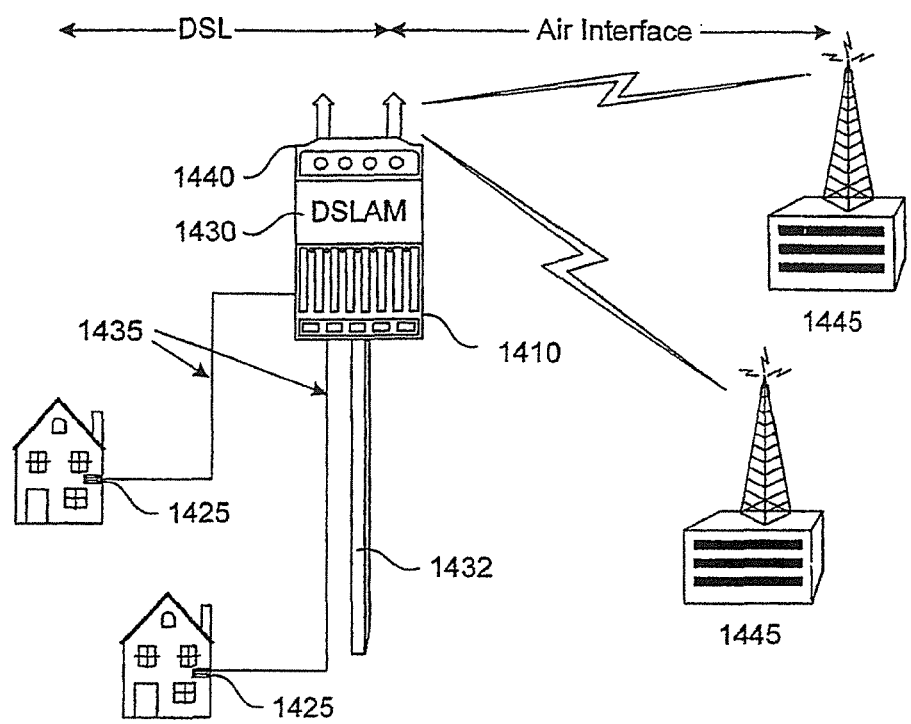
FIG. 14 is a diagrammatic illustration of a hybrid DSL/wireless link that incorporates a spatially multiplexed remote wireless device.

In the embodiment illustrated in FIG. 14, the range and/or accessibility of the DSL network is extended by placing a head end DSL modem 1430 in proximity to the remote DSL modem 1425. A suitable xDSL protocol (such as ADSL, VDSL, etc.) and modulation technique (such as DMT, DWMT, CAPs, etc.) is used to communicate between the remote DSL modem 1425 located at the customer premises and the head end DSL modem 1430 located at an appropriate location that is within range of the customer premises. By way of example, the head end DSL modem 1430 may be located at the terminal server 1410 on a nearby telephone pole 1432 from which the twisted pair drop 1435 originates that serves the customer premises. The head end DSL modem 1430 then provides the raw input data stream to the network access unit (subscriber unit) 1440 that communicates with appropriate BTSs 1445 as described above. Of course, in embodiments where a plurality of different remote DSL modems within the same neighborhood are being serviced, the head end DSL modem may multiplex the data streams from the various xDSL connections.

It is noted that the location of the described network access units may be widely varied based on the needs of a particular system. One advantage to placing the network access units at the terminal servers is that it provides a readily accessible location where installation is relatively easy. Also, terminal servers are often located on a telephone pole as illustrated in FIG. 14. This may be advantageous in that top telephone poles are relatively higher as compared to many other potential deployment locations, which may provide a clearer path between the network access unit 1440 and the BTS transceiver. This, of course may result in increased data speeds. It should be appreciated that the described arrangements can bring DSL service to a wide variety of locations using the POTS (plain old telephone service) infrastructure.

Figure 15:
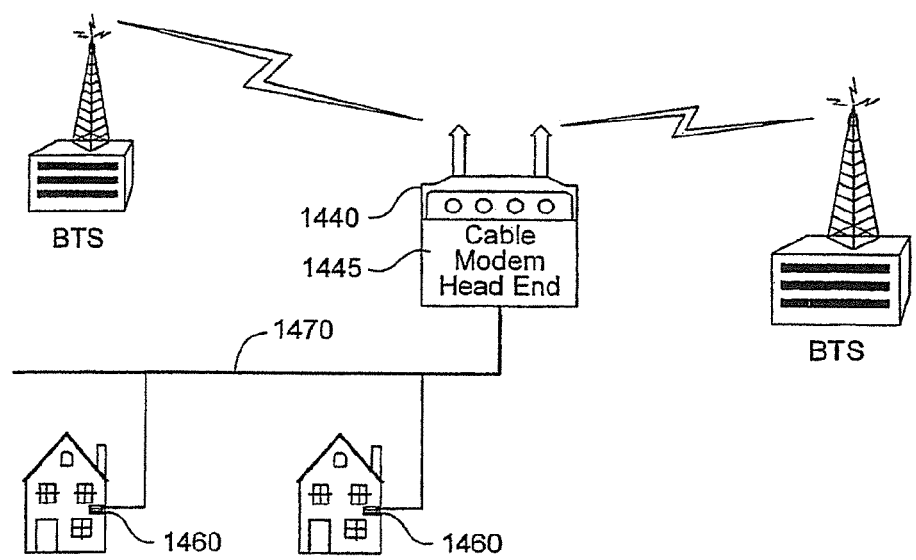
FIG. 15 is a diagrammatic illustration of a hybrid cable/wireless link that incorporates a spatially multiplexed remote wireless device in a network access unit.

Referring next to FIG. 15 another embodiment of the present invention is illustrated. In this embodiment, the network access unit 1440 is connected to a plurality of cable modems 1460 via an appropriate cable 1470. Any suitable cable including hybrid fiber co-axial (HFC) cables, co-axial cables or fiber cables may be used as cable 1470. Like the previously described hybrid DSL link, the illustrated hybrid cable link provides the possibility of expanding the range of high speed data communications using existing infrastructure.

As suggested above, the described subscriber unit can be used as a node in virtually any network to facilitate communications between that network and other devices and/or networks. For example, with the growing popularity of home networks, a subscriber unit can be used as a node in a home network. Alternatively, a subscriber can be used in office networks and/or any other type of local area, wide area, or other networks.

Another networking concept that has attracted some attention lately is vehicle based networking. For example, people have contemplated wiring carriers such as buses, airplanes, ships and other vehicles with networks that provide multiple nodes within the vehicle for use by passengers. The described spatial multiplexing based subscriber units which take advantage of a wireless link are particularly well adapted to providing high speed access for any vehicle based network.

Figure 16:
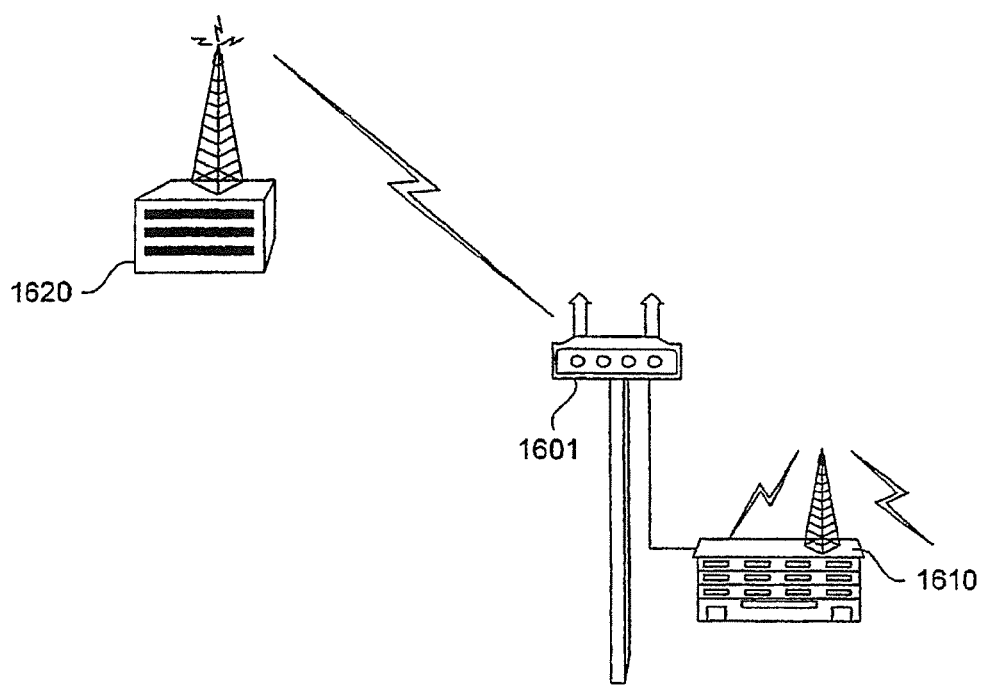
FIG. 16 is a diagrammatic illustration of a repeater BTS that utilizes a spatially multiplexed remote wireless device.

Referring next to FIG. 16, yet another deployment possibility for the subscriber units will be described. In the embodiment illustrated in FIG. 16, the subscriber unit 1601 is utilized as a wireless interface for a repeater BTS 1610 in a cellular network. Various parties have proposed and implemented the concept of using repeater BTSs in cellular networks. Generally, a repeater BTS 1610 is designed to extend the coverage area of a master BTS 1620 and/or cover dead spots in the master BTSs coverage area. The repeater BTS simply repeats the signals being transmitted by the master BTS. The link between the master BTS and the repeater link can be either a wireless link or a wired link. Given the high data rates that are possible using the spatial multiplexing based subscriber units, it should be apparent that the described subscriber units are particularly well suited for use in repeater BTSs.

Although a few specific deployments have been described, it should be appreciated that the described spatial multiplexing based subscriber units may be deployed in a wide variety of other situations as well.

What is claimed is:

1. A base station of a wireless network for transmitting subscriber datastreams to corresponding ones among a plurality of remote stations located within the network, the base station comprising:
    spatially separate transmitters to transmit selected substreams of each subscriber datastream to corresponding ones among the plurality of remote stations on an assigned channel of a multiple access protocol;
    logic to assign an available channel on which to transmit each subscriber datastream;
    a mobility detector to determine a mobility of each of the plurality of remote stations and to generate a mobility signal; and
    a training module responsive to the mobility signal for varying at least one of an injection interval and a duration of a training sequence into the transmissions of the spatially separable transmitters.

2. The base station of claim 1, wherein the mobility detector monitors signals received from remote stations for Doppler shift and correlates the determined mobility to the Doppler shift.

3. The base station of claim 1, wherein the mobility detector generates a signal to initiate a handoff of a remote station to a different base station based on the determined mobility.

4. The base station of claim 1, wherein the training module uses blind training based on the mobility signal when a respective remote station is fixed.

5. The base station of claim 1, wherein the logic is further to route at least a substream of each datastream to at least a selected one of the spatially separate transmitters and to generate control signals to configure the base station, to transmit the selected substreams to a corresponding one among the plurality of remote stations on the assigned channel.

6. The base station of claim 1, wherein the logic is further to change a spatial transmission configuration of the spatially separate transmitters for a selected datatstream from a first transmitting configuration to a second configuration responsive to a determination that a change of a transmitting configuration will improve reception at a corresponding one among the plurality of remote stations.

7. The base station of claim 1, wherein the logic further comprises a parser to parse each datastream into a variable number of substreams or to avoid parsing of each datastream in response to a mode signal.

8. The base station of claim 7, wherein the logic further comprises a detector arranged to detect modes of the subscriber datastreams and to generate a mode signal corresponding to each of the subscriber datastreams.

9. The base station of claim 7, wherein the modes of the datastreams include voice mode and data mode and wherein the parser is further arranged to avoid parsing of the datastream in response to a voice mode signal, and to parse the datastream into a variable number of in response to a data mode signal.

10. The base station of claim 7, wherein the modes of the datastreams include a low Quality of Service (QoS) mode and a high QoS mode and wherein the parser is further arranged to avoid parsing of the datastream in response to a low QoS mode signal, and to parse the datastream into a variable number of in response to a high QoS mode signal.

11. The base station of claim 1, wherein the spatially separate transmitter transit according to a multiple access protocol that is selected from at least one of a group of multiple access protocols consisting of: code-division multiple access, frequency-division multiple access, time-division multiple access, space-division multiple access, orthogonal frequency division multiple access OFDMA, wavelength division multiple access WDMA, wavelet division multiple access, orthogonal division multiple access ODMA and quasi-orthogonal division multiple access ODMA techniques.

12. The base station of claim 1, further comprising a receiver to receive a control signal from the a remote station and wherein the logic varies the number of applied substreams to the respective remote station in response to the control signal.

13. A method for transmitting subscriber datastreams from a base station of a wireless network to corresponding ones among a plurality of remote stations located within the network, the method comprising:
    transmitting selected substreams of each subscriber datastream to corresponding ones among the plurality of remote stations on an assigned channel of a multiple access protocol through spatially separate transmitters;
    assigning an available channel on which to transmit each subscriber datastream;
    determining a mobility of each of the plurality of remote stations in a mobility detector and generating a mobility signal; and
    varying at least one of an injection interval and a duration of a training sequence into the transmissions of the spatially separable transmitters responsive to the mobility signal.

14. The method of claim 13, wherein generating a mobility signal comprises monitoring signals received from remote stations for Doppler shift and correlating the determined mobility to the Doppler shift.

15. The method of claim 13, further comprising generating a signal to initiate a handoff of a remote station to a different base station based on the determined mobility.

16. The method of claim 13, further comprising using blind training based on the mobility signal when a respective remote station is fixed.

17. The method of claim 13, further comprising changing a spatial transmission configuration of the spatially separate transmitters for a selected datatstream from a first transmitting configuration to a second configuration responsive to a determination that a change of a transmitting configuration will improve reception at a corresponding one among the plurality of remote stations.

18. The method of claim 13, further comprising parsing each datastream into a variable number of substreams or avoiding parsing of each datastream in response to a mode signal.

19. The method of claim 13, wherein the modes of the datastreams include one or more of voice mode, data mode, low Quality of Service (QoS) mode, a high QoS mode, low bit rate mode, and high bit rate mode.

20. The method of claim 13, further comprising receiving a control signal from the station and wherein the logic varies the number of applied substreams to the respective remote station in response to the control signal.

* * * * *